United States Patent
Tsao

(10) Patent No.: US 9,341,854 B2
(45) Date of Patent: May 17, 2016

(54) SLIM AND COMPACT VOLUMETRIC 3D DISPLAY SYSTEMS BASED ON MOVING DISPLAY SURFACE

(71) Applicant: Che-Chih Tsao, Hsinchu (TW)

(72) Inventor: Che-Chih Tsao, Hsinchu (TW)

(*) Notice: Subject to any disclaimer, the term of this patent is extended or adjusted under 35 U.S.C. 154(b) by 273 days.

(21) Appl. No.: 13/740,158

(22) Filed: Jan. 12, 2013

(65) Prior Publication Data

US 2014/0198383 A1   Jul. 17, 2014

(51) Int. Cl.
*G02B 27/22* (2006.01)
*G02B 5/32* (2006.01)
*G03H 1/22* (2006.01)

(52) U.S. Cl.
CPC .................. *G02B 27/2285* (2013.01)

(58) Field of Classification Search
CPC . G02B 27/22; H04N 9/3129; H04N 13/0402; H04N 13/0459; H04N 9/3135; G06T 15/08; G06T 15/00
USPC ........... 359/478, 15, 18, 17, 32; 345/419, 424
See application file for complete search history.

(56) References Cited

U.S. PATENT DOCUMENTS

| 5,754,147 A * | 5/1998 | Tsao et al. | 345/6 |
| 7,692,605 B2 * | 4/2010 | Tsao | 345/6 |

FOREIGN PATENT DOCUMENTS

JP    S56-123533    9/1981

* cited by examiner

*Primary Examiner* — Jade R Chwasz

(57) ABSTRACT

This invention relates to volumetric 3D display systems based on a rotary reciprocating display surface. Layout of mechanical components and optical path are arranged to provide maximal viewing angle and minimal view-blocking, while keeping the whole system size compact and slim. Motion mechanisms, mechanical relief mechanism and 2-direction dynamic balancing are design to give smooth and quiet motion, while keeping the design simple and cost low. Backing structures and supporting frames for the display surface are designed to minimize deformation and stress in the display surface, while still satisfying requirements in optics and display. Mechanical and optical layout also considers the need for converting among multiple display modes. Image presentation methods for display occlusion effect and black and dark images are devised.

19 Claims, 31 Drawing Sheets

(a)        (b)

Fig. 8
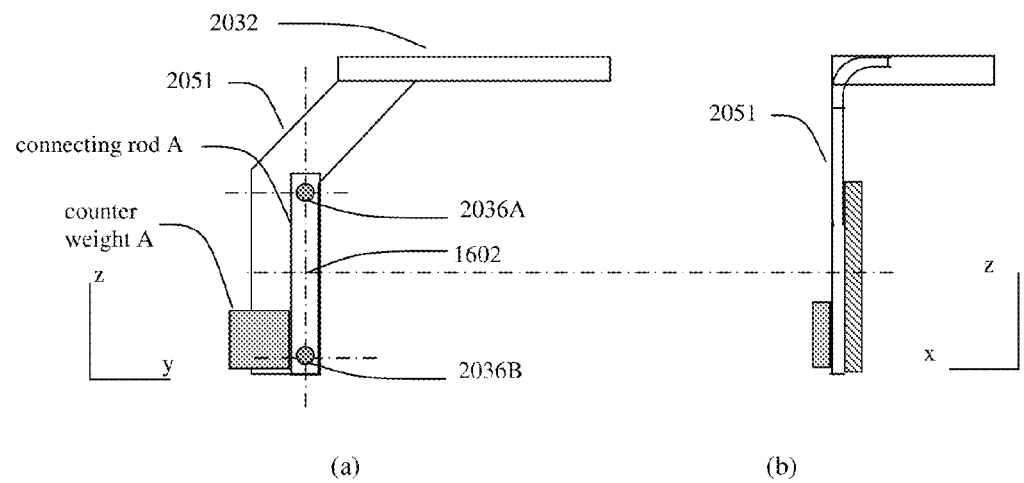
(a)  (b)
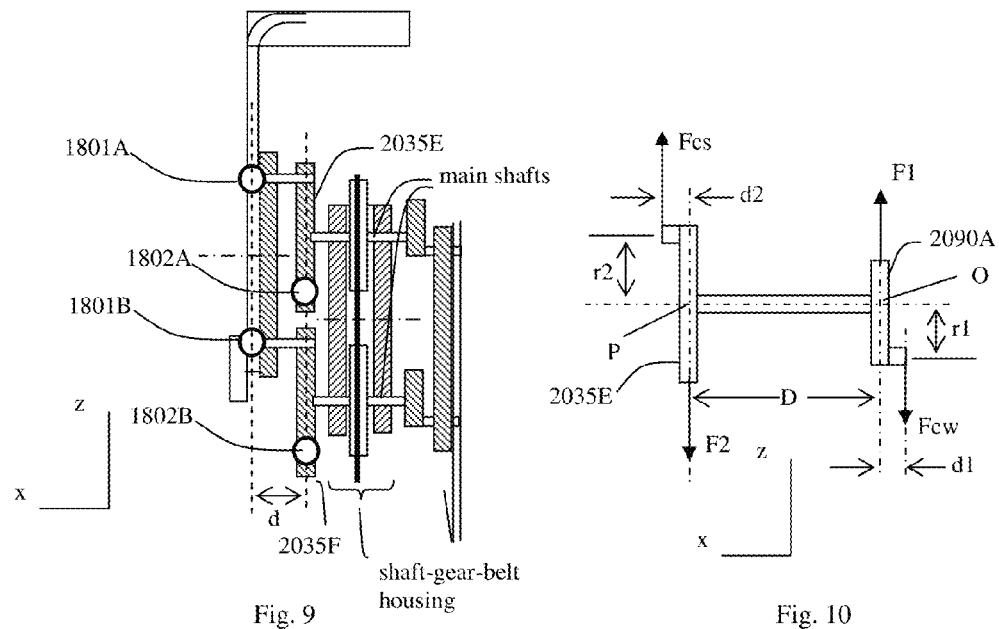
Fig. 9
Fig. 10

Fig. 15
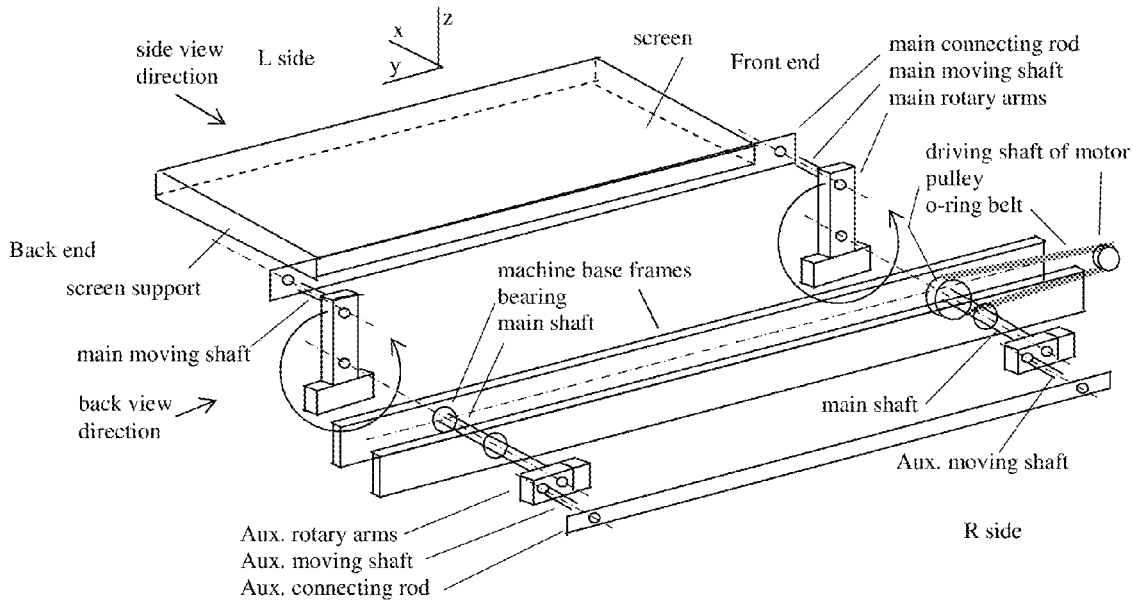
(a) (Exploded view) Mechanism of Rotary-Reciprocating screen, bearings on main moving shafts and aux. moving shafts not shown, motor not shown
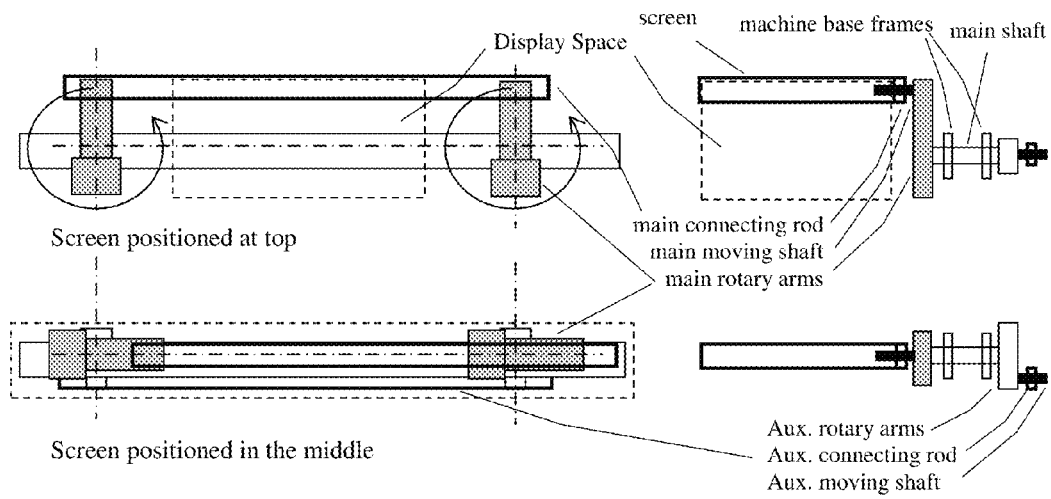
(b) (Side view) When Screen is positioned in the middle, the mechanism can be folded down to a slim form factor.
(c) (Back view)

Fig. 22
If projection path is too long, then we can do multiple folds.

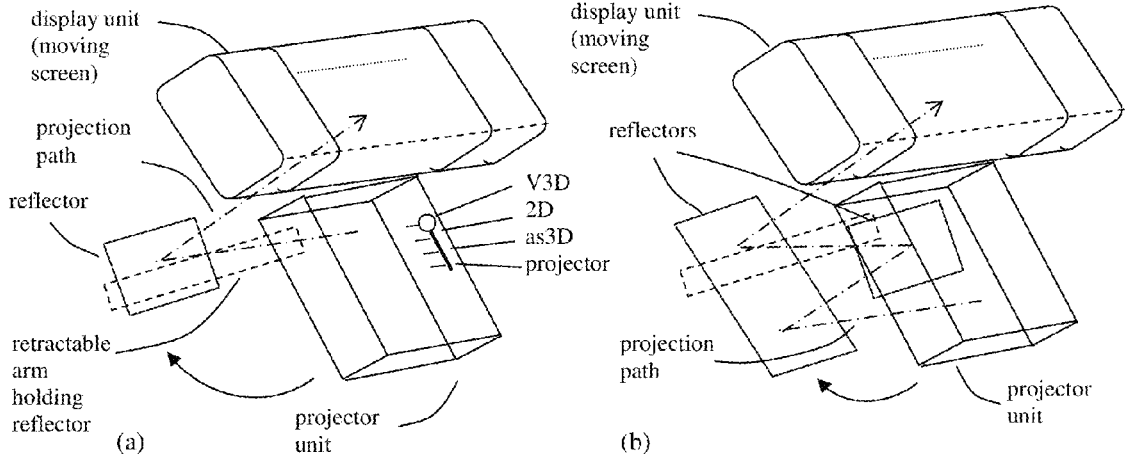

Fig. 23

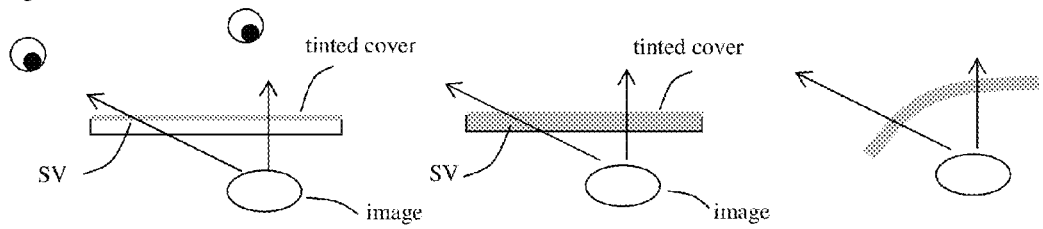

At shallow view angle (SV), light passes through more tinted material than at high angle, resulting in reduced brightness.

Curved cover provides more even tint effect to wider view angle

Fig. 24

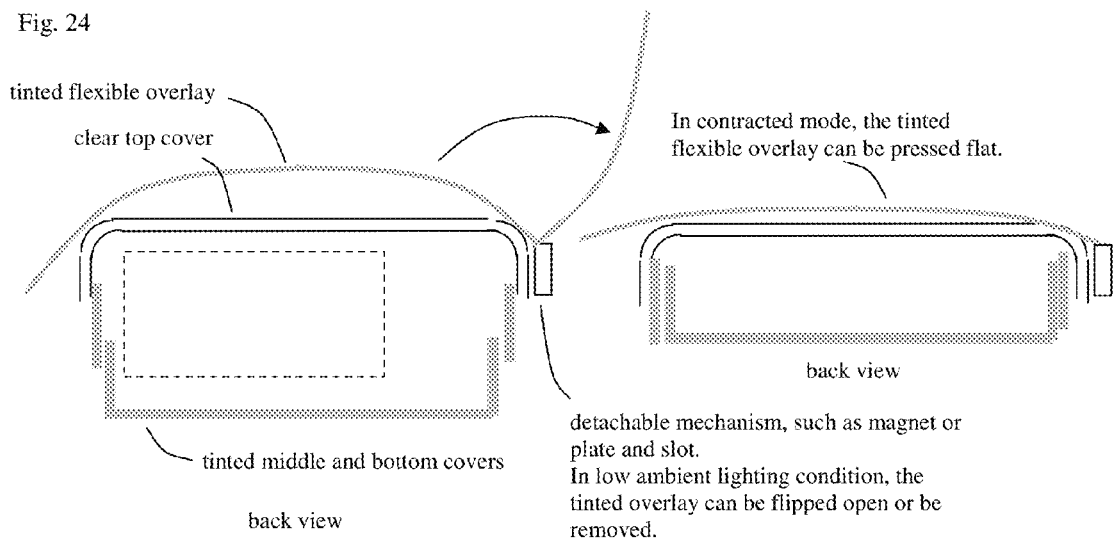

In contracted mode, the tinted flexible overlay can be pressed flat.

back view detachable mechanism, such as magnet or plate and slot.
In low ambient lighting condition, the tinted overlay can be flipped open or be removed.

Fig. 25
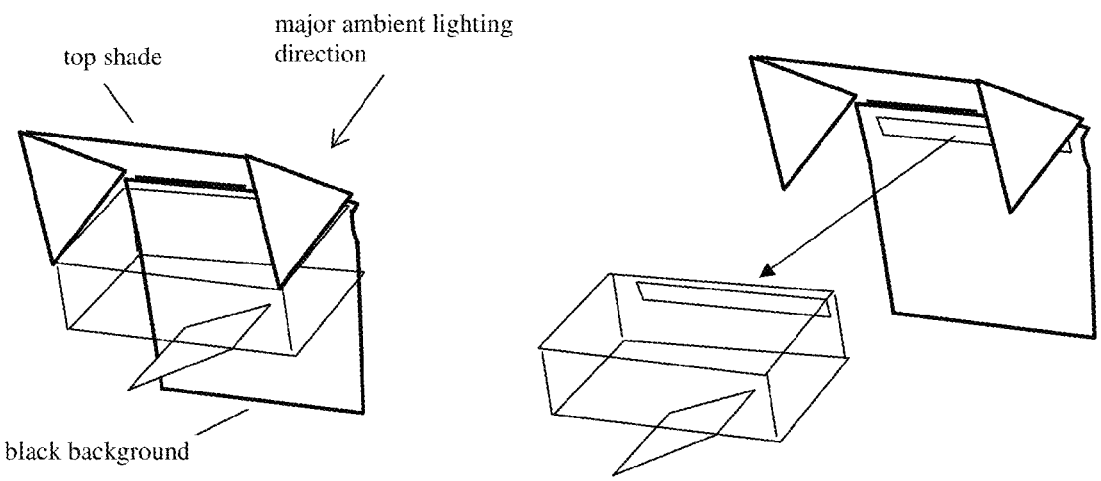
Fig. 26 (Exploded view)
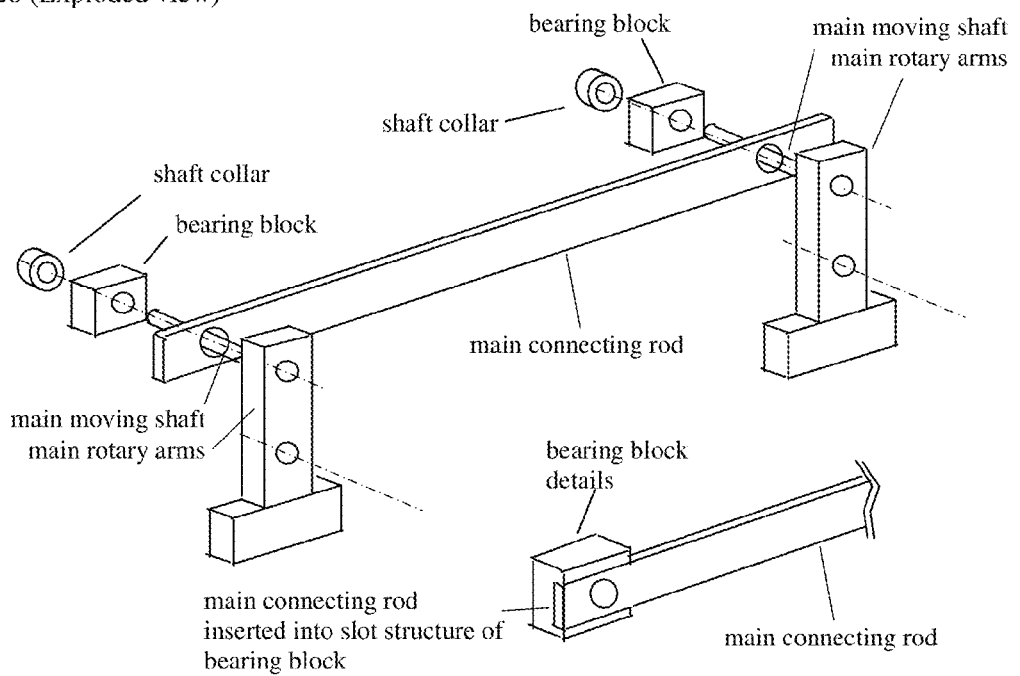

(a)

(b)

Example design of a 3DS - V3D display coupling (a)  (b)

(a)  (b)

Fig. 44
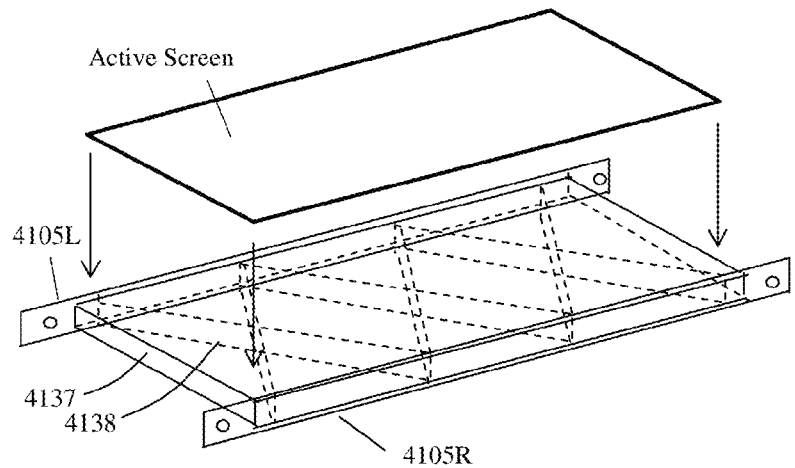
Fig. 45
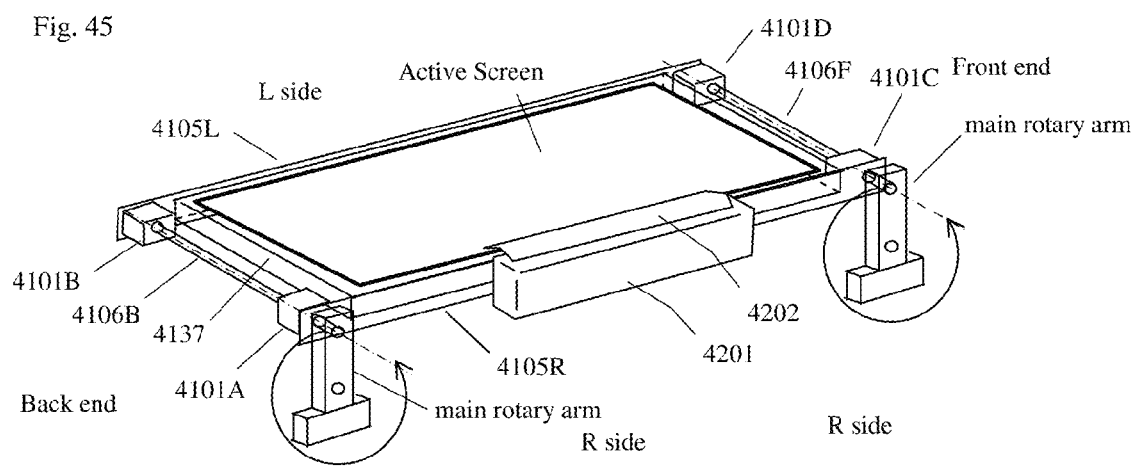
(a)
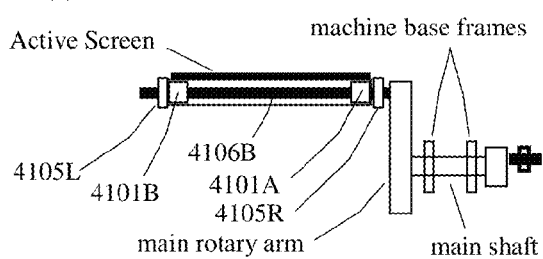
(b) viewing from Back end
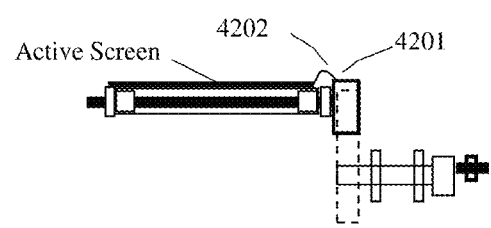
(c) viewing from Back end (a) side view (b) end view (c)

Fig. 51
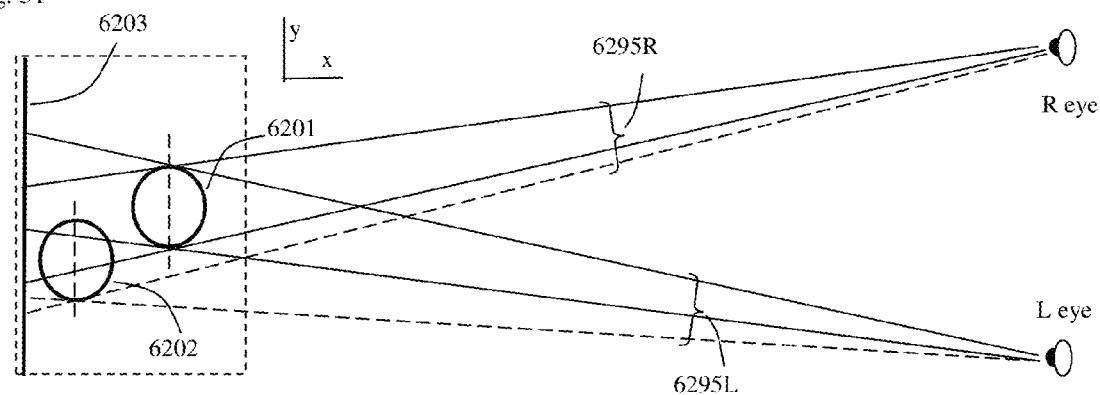
(a)
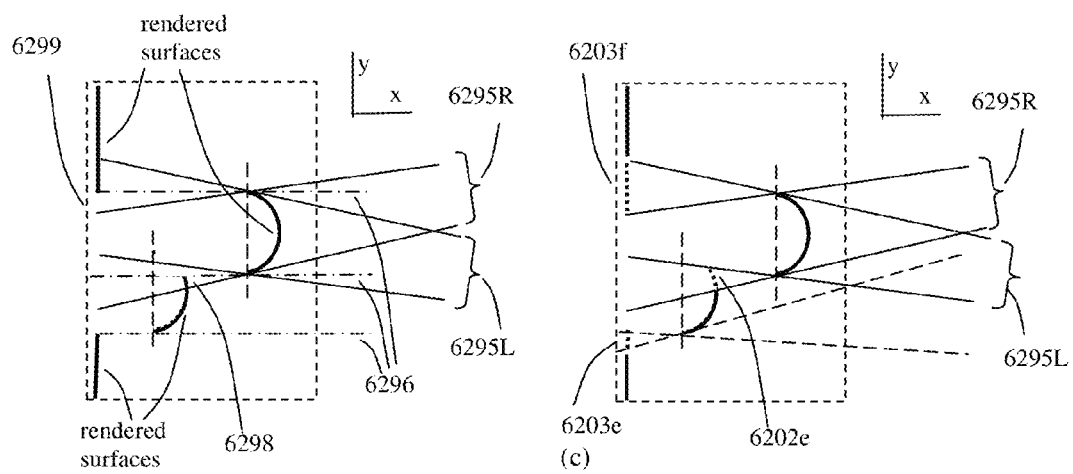
(b)  (c)
Fig. 52
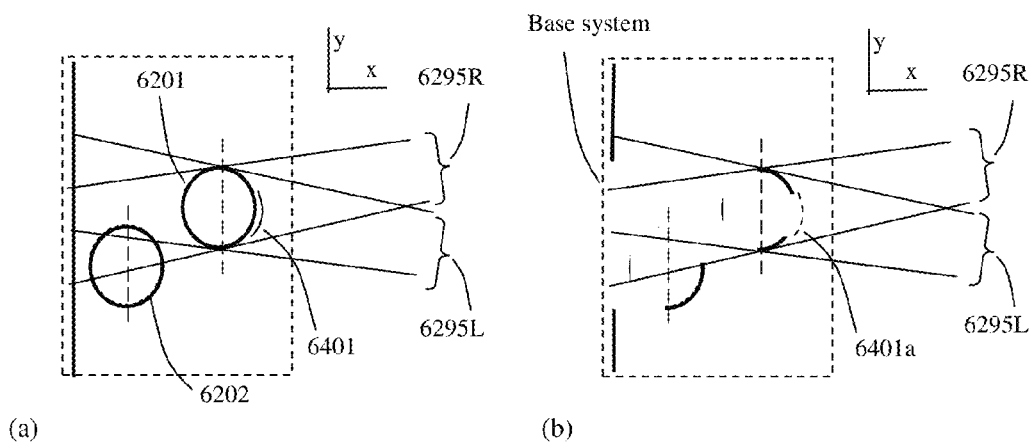
(a)  (b)

Fig. 56
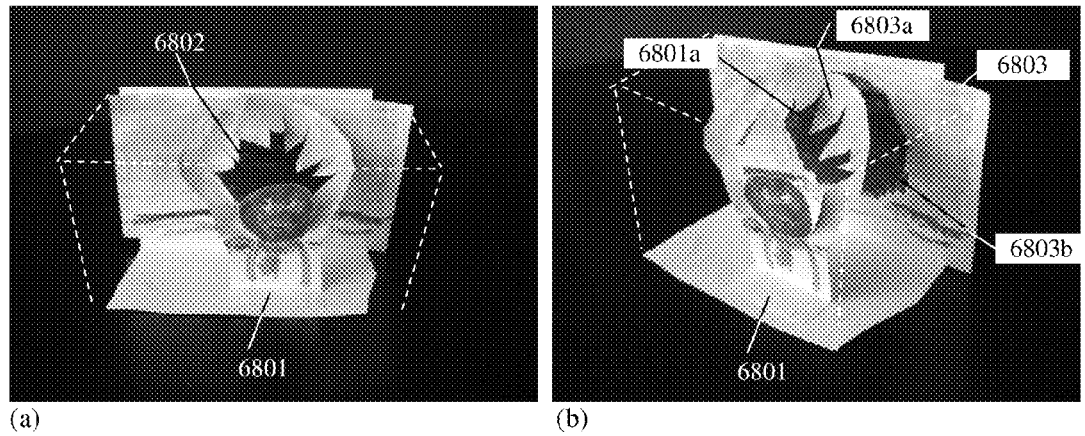
(a)  (b)
Fig. 57 (Prior art: Tsao US App. No. 13/271,701)
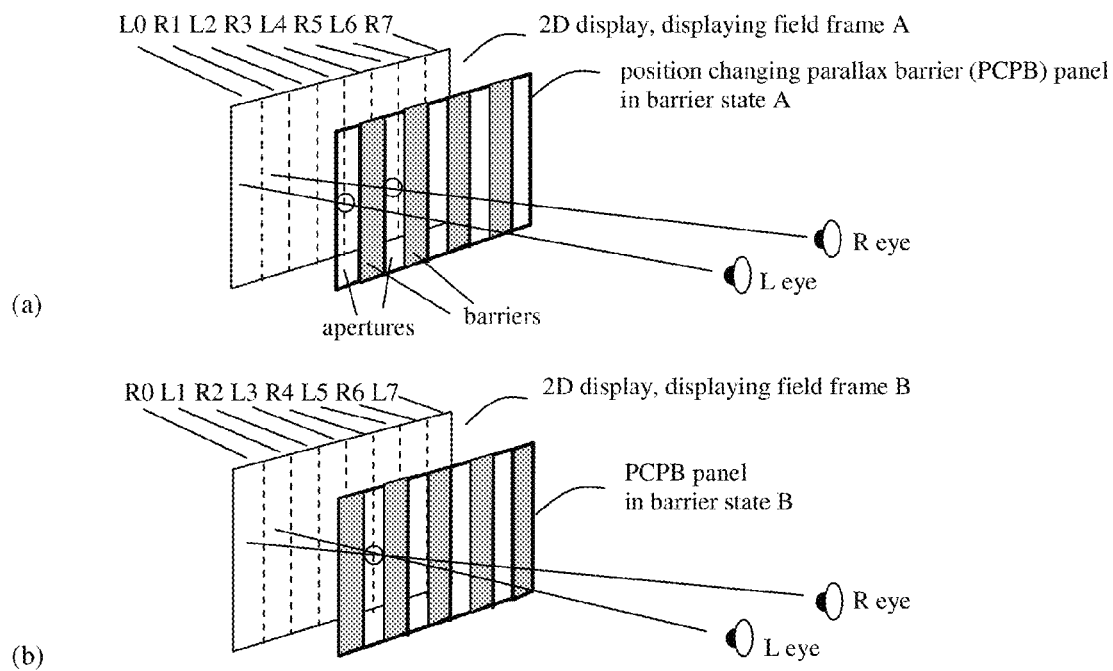

2D display field frame A
(a)

2D display field frame B
(b)

photo sensor signal

PCPB panel state-changing triggering signal for 2 barrier-states state-changing triggering signal for 3 barrier-states (c)

$h(i) = i\ d = R \sin(\theta(i))$ (a)

(b)

US 9,341,854 B2

SLIM AND COMPACT VOLUMETRIC 3D DISPLAY SYSTEMS BASED ON MOVING DISPLAY SURFACE

CROSS-REFERENCE TO RELATED APPLICATIONS AND OTHER DOCUMENTS

This application claims the benefit of prior U.S. provisional application No. 61/585,999 filed 12 Jan. 2012, the contents of which are incorporated herein by reference.

This invention is related to the following documents:
U.S. Pat. Nos. 6,765,566, 6,961,045, 7,701,455, 7,804,500,
8,022,895, 7,933,056, U.S. application Ser. No. 13/271,701 (US14) and
U.S. Provisional App. No. 61/392,595 (PP12), and
U.S. Provisional App. No. 61/522,246 (PP13).

The above documents are incorporated herein by reference.

BACKGROUND OF THE INVENTION

This invention relates in general to volumetric 3D (V3D) display systems based on a moving display surface. Specifically, this invention relates to V3D display systems based on a rotary reciprocating display surface. More specifically, this invention relates to V3D systems with slim and. compact system layout and package, smooth and quiet motion mechanisms and image display method. Conversion among different display modes and modular system design are also considered in the compact and slimness design.

One category of V3D display creates images by projecting successive picture frames onto a moving 2D screen, or by displaying successive picture frames on a moving 2D display surface, such as a light-emitting 2D display panel. Due to the after-image effect of human eye, the set of spatially distributed picture frames displayed on the moving screen form V3D images.

Tsao U.S. Pat. No. 6,765,566 (FIG. 20) describes a system with a screen that reciprocates by a rotary motion, as illustrated in FIG. 1. In principle, this is to revolve the screen 2031 about an axis 2000 and sweep the screen across a volume 2040 while keeping the screen surface always facing a fixed direction. For convenience, this is called "Rotary Reciprocating mechanism". The advantage of Rotary Reciprocating mechanism is that a motion equivalent to reciprocation can be generated by smooth rotary motion without the need of linear bearings, which in general have higher cost, higher noise and shorter life than rotary bearings. Iwahara Japan patent application publication S56-123533, incorporated herein by reference, describes a similar motion using different mechanical details.

In practical operation, Iwahara's system has the following problems: (according to his drawing)

(1) The screen 1 is elevated above the level of the moving shafts (3, 4 of Iwahara) by a framework (2 of Iwahara). Therefore, the mass center of the screen+framework assembly is also elevated above the level of the moving shafts. In actual rotation, this can create a torque, which in turn induces forces exerted to the rotary arms in opposite directions, as illustrated in FIG. 2. This affects the smoothness of the rotation, especially at "mid-crossing" position. "Mid-crossing" is when the moving centerline (moving CL) passes the plane defined by the two main centerlines (main CL). (A main centerline is the line connecting the rotating center of the two arms on the same side. A moving centerline is the line connecting the centers of the two moving shafts on the same side.) At mid-crossing, positions of the arms and the screen-framework assembly are not definitely fixed in terms of kinetics. The only mechanism to hold the components in position is the timing belt (18 of Iwahara) and gears (17, 19 of Iwahara). However, a flexible timing belt has unavoidable elasticity. At or near mid-crossing, the two moving shafts, suddenly loosing kinetic constraint, are pushed by the torque mentioned above to opposite directions, resulting in a "jump" of the screen-framework and associated noise. This has been observed in our tests.

(2) Iwahara's screen-framework assembly appears to be a rigid structure. Therefore, the center distance between the bearing holes on the frame must match the center distance between the two moving shafts (3, 4 of Iwahara) (and between the main shafts (5, 6 of Iwahara)) to a very high precision. Although this is not impossible, for machine of certain size, such precise tolerance can be costly, because errors become larger by leverage and accumulation on machines of larger size.

(3) Iwahara's system has a timing belt-gear mechanism on one side only. In principle, the two moving shafts (3, 4) can be rigidly connected to the arms on both sides and make the whole moving portion a rigid body. But in practice, especially when the machine has certain size, the deformation of materials and the clearance in bearings on the main shafts may not guarantee the synchronization of motion on both sides. Coupled with problems from (1) and (2), the actual motion cannot be smooth and quiet.

(4) The two long moving shafts (3, 4 or Iwahara) take significant space when they rotate. This is undesirable in making a compact system.

Therefore, a purpose of this invention is to develop mechanisms for a Rotary Reciprocating display surface for volumetric 3D display purpose to achieve smooth and quiet motion. The display surface, either a projection screen or a display panel, needs to be well supported against significant deformation and stress while the mechanism is in motion. And the system needs to be compact and cost-effective in order to become a viable product.

Another issue in designing a slim portable system is the size and structure of the mechanical mechanism for driving the screen motion. The rotary arms, the driving components (gears and belts) and the housings that accommodate the axes of the rotary arms require certain size (thickness). For example, FIG. 3 illustrates a sectional view of a example driving mechanism. The shaft-gear-belt mechanisms of the rotary arms are placed on both side of the screen 2032, because the projection beam 399 must pass from under the screen along projection centerline 303. The shaft-gear-belt housing has a two-wall structure, with the gear in between, so that the shaft can be held at definite position. On both sides, these structures and components occupy some space. If the moving screen size is large, then the space occupied by the mechanism is comparably insignificant. However, if the screen size is small, such as in the case of a hand-held system, then the space occupied by the mechanism becomes comparably significant. This is not desirable for a hand-held system.

Another issue is to project images to the screen and keep the image in focus. Tsao U.S. Pat. No. 7,933,056 describes a rapid focusing system using a moving thin wedge prism to compensate projection focal distance. In a slim portable system with multiple display modes, such a rapid focusing system needs to be incorporated into the display system without affecting the functionality of multi-mode conversion, while keeping the whole system slim.

Tsao U.S. patent application Ser. No. 13/271,701 describes a volumetric 3D display system capable of multiple display modes, including 2D front projection, 2D rear projection, and as 3D display. Such a multi-functional projection system has potential commercial attractiveness. Therefore, it is also preferred that the design of layout for slimness and compactness accommodates the restrictions imposed from functional requirements for multiple display modes. The mechanical and opto-mechanical parts of the system must be able to be converted among different display modes easily and also be able to be positioned to a slim and compact status when needed.

The purpose of this invention further includes designs of electronic systems that are convertible for different display modes.

BRIEF SUMMARY OF THE INVENTION

The first preferred mechanical layout is a "one-side one-end" layout. "One-end" means that the driving mechanism is placed to one end of the moving display surface along the y-direction to clear the space for projection beam. "One-side" means that the display surface is held at only one side and is driven from only one side so that the system can be kept slim.

The system is dynamically balanced so that vibration is minimized. This includes balance the balance of the rotating assembly. The rotating assembly includes the main rotary arms and the second pair of rotary arms, the screen group driven by the main rotary arms, and the optional moving wedge prism (or reflector) group driven by the second pair of rotary aims. That is, everything that moves is included and balanced as a whole. Balance is made in two directions. In the radial direction of rotation, all centrifugal forces are balanced (i.e. cancelled each other) about the rotation axes. In the axial direction of the rotation axes, the sum of moments of all centrifugal forces is zero about any point on the rotation axes.

In the case for image focusing compensation, a rapid focusing system (i.e. a moving thin wedge prism (or reflector)) and the moving screen are driven by an integrated and synchronized driving mechanism.

The second preferred layout is called "one-side two-end" layout". The display surface is also held at only one side and is driven from only one side. But the driving rotary arms are placed at two ends of the display surface. Further, the rotary arms supports the display surface at locations close the display surface. As a result, when the display surface is positioned in the middle, the mechanism can be folded down to a slim form factor. Balance is also made in the two directions as the case of "one-end one-side layout".

In general, the first and the second layout have slim packages for small size systems. The slimness is made possible by a combination of the following novel features: a layout of mechanical components with respect to the projection path, a mechanism for driving a rotary reciprocating screen (or generally, display surface) from only one side, and a force/torque balancing arrangement to reduce vibration.

This invention also includes a contractible cover with a safety switch for the system in order to obtain an overall slimness. The cover system also has a compact but effective means for enhancing image contrast.

The third preferred layout applies to larger systems in general. This invention resolves the issue of jumping/noise at mid-crossing by devising mechanisms and designs of the following features:

(1) Balanced screen and support structure that eliminates undesirable torque effect.

(2) Mechanical relief mechanisms that accommodate possible variation of center distance caused by inevitable dimensional or assembly error.

(3) Associated with (1) and (2), an integral balance and mechanical relief design of the screen and support structure, called "parallel relief and balancing mechanism".

(4) A moving screen mechanism that requires no long moving shafts, thereby providing more usable space under the screen, enabling the design of compact display systems.

(5) Synchronization mechanisms on both sides and driving at both sides.

The result is a compact, smooth and quiet moving screen (or display surface) system.

The mechanical designs of the preferred layouts can be applied to volumetric 3D display of passive display surface (i.e. screen) or active display surface (i.e. surface containing active light emitting elements).

The mechanical designs further include method and structure design for supporting the display surface. The display surface is either passive or active, of large or small sizes.

In the case where the display surface is an Active Screen, this invention includes a new low-profile design of multi-channel optical link data interfacing system.

In addition, under the background of the aforementioned features, designs of conversion means for multiple operation modes are described, including projection path, projection optics layout, optics convertible mechanism, and contractible cover. These mechanical and Opto-mechanical parts can be converted among different display modes easily and also can be positioned to a slim and compact status when needed.

Convertible mechanism also includes electronic systems that can be switched between different operational modes, and modular electronics system that allows the V3D display system become an accessory of a hosting computing device or an extension of a projection system.

Image presentation methods are devised to solve image display issues in volumetric 3D display. Hidden feature removal schemes are developed to give occlusion visual effect, when approximate eye location of a viewer is known. Further, a combination of hidden feature removal, object outline traces presentation and a technique of "background image parallel shifting" allows a volumetric 3D display to display black or dark images.

BRIEF DESCRIPTION OF THE DRAWINGS

FIG. 8 illustrates construction of the screen (display surface) group of the functional model of FIG. 6.

FIG. 9 and FIG. 10 illustrate balancing considerations of the "one-end one-side" layout, when the phase difference between the moving prism and the screen group is 180.degree.

FIG. 15 illustrates a "one-side two-end" layout of this invention.

FIGS. 22(a) and 22(b) illustrate the 2nd preferred projection path arrangement for the "one-side two-end" layout.

FIG. 23 and FIG. 24 illustrate a design of curved tinted flexible sheet for contrast improvement of this invention.

FIG. 25 illustrates a top shade and black background sheet for improving image visibility under high ambient lighting condition.

FIG. 26 illustrates details of main arms+main moving shafts+bearing blocks+main connecting rod assembly of the system of FIG. 15. Assembly on the Aux. arms and Aux. connecting rods etc. is similar.

FIG. 44 illustrates a configuration of display surface group for a rotary reciprocating Active Screen V3D system, including a supporting frame of integrated truss structure under the active screen.

FIG. 45 illustrates the 1st preferred driving configuration for the display surface group of FIG. 44: driving at one side, but using long moving shafts for supporting at two sides.

FIG. 50 and FIG. 51 illustrate schemes of removing or suppressing occluded voxels in this invention.

FIG. 52, FIG. 53 and FIG. 54 illustrate schemes of displaying black or dark V3D images.

FIG. 55 and FIG. 56 show photographs of paper model tests of schemes of FIG. 52-54.

FIG. 57 illustrates the principle of auto-stereoscopic 3D display by Position Changing Parallax Barrier method disclosed in Tsao U.S. application Ser. No. 13/271,701.

DETAILED DESCRIPTION

1. Slim System by One-Side One-End Layout

Figure 4:
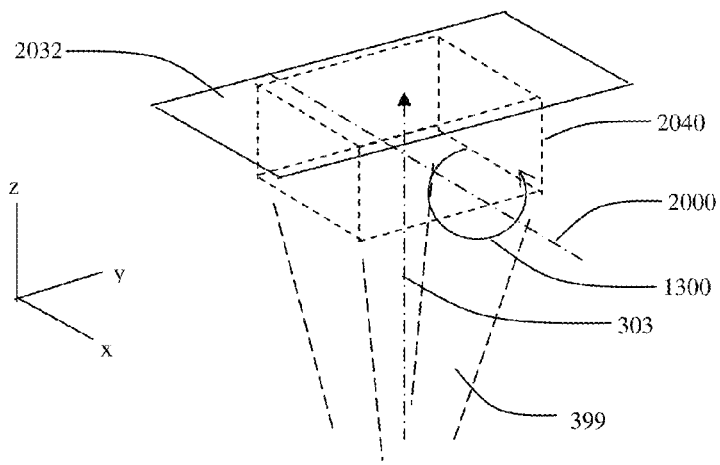
FIG. 4 illustrates a screen moving in the "Rotary Reciprocating" motion in perspective view, without showing the rotary arms.

The first preferred layout of components is now described. FIG. 4 illustrates a screen 2032 moving in the "Rotary Reciprocating" motion in perspective view, without showing the rotary arms. Arrow 1300 indicates the rotational motion track of the screen. The screen's long edges are aligned in the y-directions. The screen's lateral motion is also along the y-direction. For convenience, four directions with respect to the screen are defined. The direction toward y+ direction is called the "front end", and y-direction, the "rear end". The direction toward x+ direction is called the "right (R) side"; and x− direction, the "left (L) side". The first preferred layout is called "one-end one-side layout". "One-end" means that the driving mechanism is placed to one end of the moving screen along the y-direction to clear the space for projection beam 399. "One-side" means that the screen is held at only one side and is driven from only one side so that the system can be kept slim.

Figure 5:
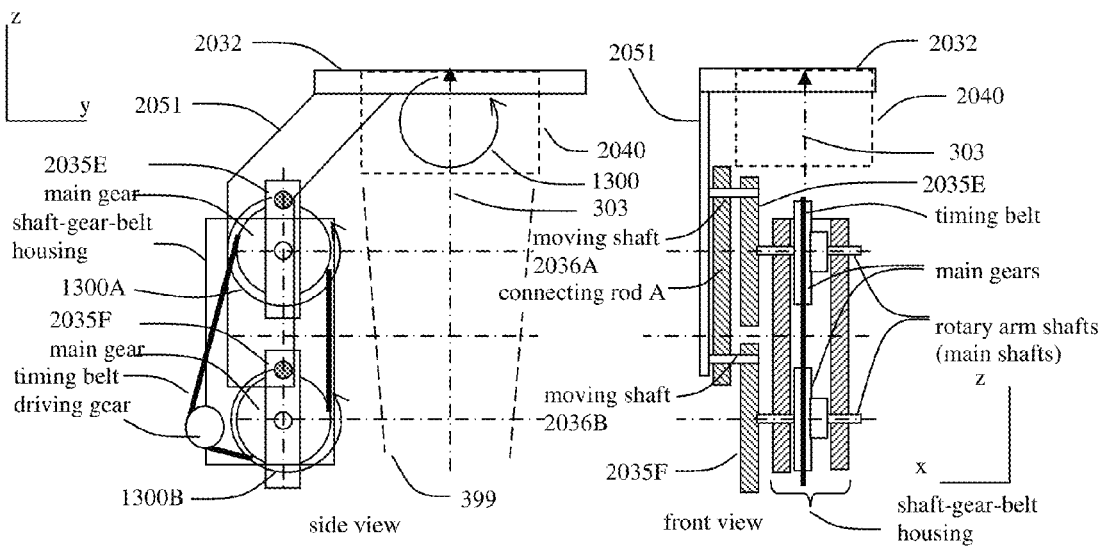
FIG. 5 illustrates a "one-end one-side" layout of this invention.

FIG. 5 illustrates a "one-side one-end" layout in side view (i.e. viewing at y-z plane) and in front view (sectional view) (i.e. viewing at x-z plane). The shaft-gear-belt housing, which contains the driving components, is placed to the rear end beyond the projection beam 399, as shown in the side view. The driving mechanism has only two rotary arms (main arms), 2035E and 2035F, which are placed in vertical alignment with each other. Each rotary arm is connected to a main gear via a rotary shaft. A timing belt connects the two main gears and makes the two rotary arms rotate in synchronization. The two rotary arms drive a support frame 2051 in rotary reciprocating motion, 1300A and 1300B. The support frame 2051 connects to the screen 2032, which thereby moves in rotary reciprocating motion, 1300. The support frame connects to the screen at only one side, as shown in the front view. That is, the driving mechanism drives only at one side of the screen and can be placed within the two side (long) edges of the screen when viewed in front view. Therefore, the layout is called "one-end one-side layout". This layout minimizes the thickness (in x-direction) of the whole system and makes it close to the width of the display volume 2040. It can also be seen that this arrangement provides a very wide view angle around the display volume.

Figure 6:
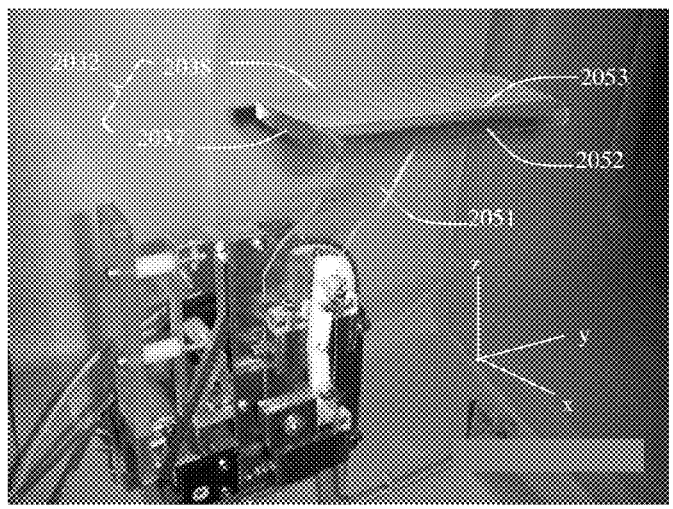
FIG. 6 shows a photograph of a functional model of this invention.

FIG. 6 shows a photograph of a functional model of the system and the structure of the screen group (including the support frame 2051 and the screen 2032). Because the driving mechanism is at rear end of the system, the supporting frame 2051 extends toward y+ direction and connect the screen at only one side (R side). The extended part of the supporting frame 2051 has a near "T" shape cross section. The side portion 2052 of the "T" shape provide vertical support in dynamic operation. The screen's backing structure 2037 is attached to the top portion of the "T" shape 2053. The screen contains a translucent film 2038 attached to the backing structure 2037. The backing structure is made of a thin, transparent plastic sheet and is shaped like a shallow shoe box cover. Such a structure is strong enough and yet light enough so that inertia caused by motion can be supported by the stiffness of the box cover shape to prevent significant deformation. For example, the functional model of FIG. 6 has a box cover shaped backing structure with a dimension of 2.063 inch by 3.75 inch with a height of 5/16 inch. The structure is made of a plastic sheet of 0.004-0.005 inch thickness. Tests show no visible deformation when the structure moves in rotary reciprocating motion at 10-15 revolutions per second.

Figure 7:
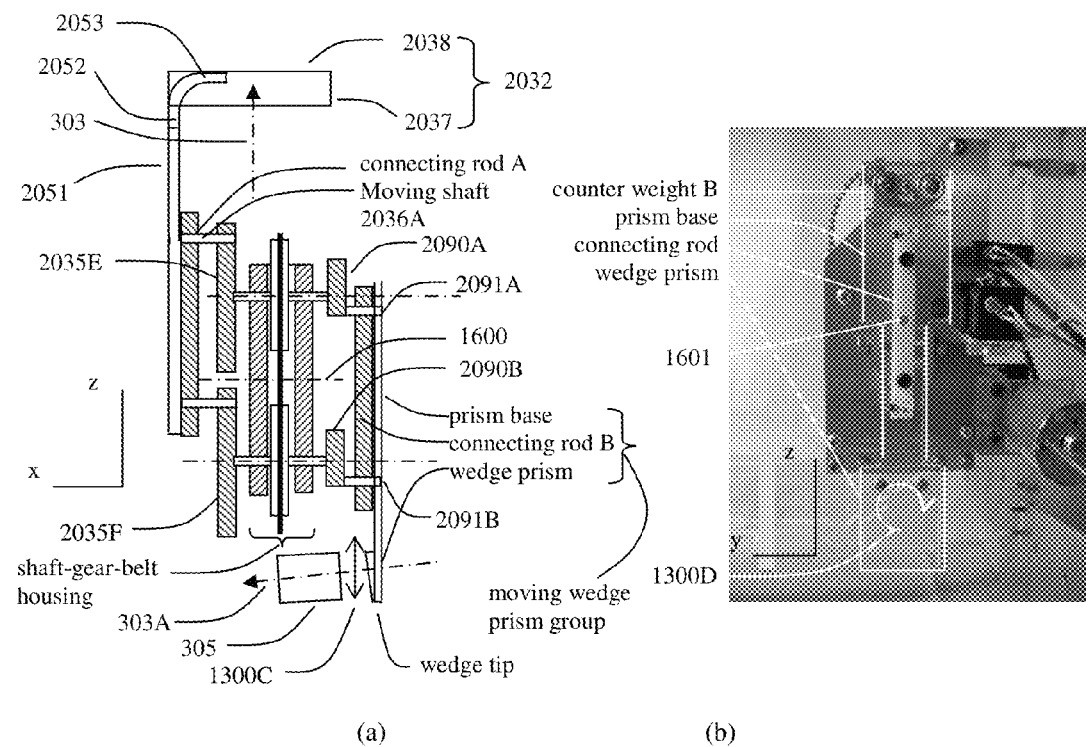
FIG. 7 shows construction of the functional model of FIG. 6.

When a rapid focusing system (Tsao U.S. Pat. No. 7,933,056) is used with the system of FIG. 5, the most compact arrangement is to place the moving prism (or reflector) to the same mechanism that drives the moving screen, instead of using a separate mechanism. FIG. 7a illustrates the arrangement in sectional view. A second pair of rotary arms (auxiliary arms) (2090A and 2090B) is attached to the same shafts used by the main rotary arms (2035E and 2035F) at the opposite side of the shaft-gear-belt housing. In this view, the moving prism (or reflector) reciprocates in vertical direction, as indicated by 1300C. The wedge tip of the prism points toward z− direction. The projection beam centerline 303A and the projection lens 305 are positioned accordingly. The projection beam can be guided by a set of folding mirrors (not shown) to position 303, striking the moving screen.

FIG. 7b shows a photograph of a functional model that has a moving thin wedge prism as the rapid focusing system, in side view. The moving prism and its base are made of transparent plastics and therefore, in the photograph, they are highlighted with white lines for better view. 1300D indicates the motion track of the wedge prism.

In these illustrations, the moving prism and the screen are positioned with a phase difference of 180 degree. That is, when the screen moves to the top position, the wedge prism moves to the lowest position, which provides largest refractive displacement and shortest object distance, so that the image distance is the longest.

The system should be dynamically balanced so that vibration is minimized. This includes balancing in the following categories:

(1) Balance of the moving wedge prism (or reflector) group: As shown in FIGS. 7a and 7b, the moving wedge prism group includes the assembly of the moving wedge prism, the base, the connecting rod B and the counter weight (counter weight B). The assembly is symmetric horizontally (y direction). The purpose of the counter weight B is to position the center of mass of the assembly at the middle point 1601 between the two moving shafts (2091A and 2091B). This way, the load can be distributed evenly to both rotary arms 2090A and 2090B.

(2) Balance of the screen group: The screen group includes the screen 2032, the supporting frame 2051, the connecting rod A, and counter weight (counter weight A), as shown in FIG. 8a. Similarly, the purpose of counter weight A is to position the center of mass of the assembly at the middle point 1602 between the two moving shafts (2036A and 2036B). This way, the load can be distributed evenly to both rotary arms 2035A and 2035B. Because the screen group has an extended part in the y+ direction, counter weight A is best placed toward y− and z− directions (3) Balance of the rotating assembly. The rotating assembly includes the main rotary arms (2035A and 2035B) and the second pair of rotary arms (2090A and 2090B), the screen group driven by the main rotary arms, and the moving wedge prism (or reflector) group driven by the second pair of rotary arms. That is, everything that moves is included and balanced as a whole. Balance must be made in two directions:

(3a) Viewing along the rotation axis (i.e. looking at y-z plane), all centrifugal forces pulling on the main rotary arm shafts should be balanced (i.e. cancel each other) in radial directions.

(3b) The sum of bending moments exerted on the main rotary arm shafts due to all centrifugal forces should be zero.

Balancing category (1) and (2) belong to static balance. That is, the sum of the following quantity $$m\ r = \text{mass } (m) \cdot \text{distance from mass to center of mass } (r)$$

of each part of the structure should be zero.

Balancing category (3a) belongs to dynamic balance of rotation. However, if an assembly satisfies the requirement of static balance, then category (3a) balancing can also be satisfied. This is because in uniform circular motion, centrifugal force is expressed as:

$$Fc = m\ r\omega^2$$

where m is the mass, r is the distance from the mass to the center of rotation, and ω is angular speed. That is, centrifugal force is proportional to the quantity (m r), just as in the case of static balance. In the balance of rotary arms, the screen group (or the wedge prism group) is mounted to one end of each of the rotary arms, counter weights are added to the opposite ends of the rotary arms in order to make the resultant (m r) quantity zero.

Figure 1:
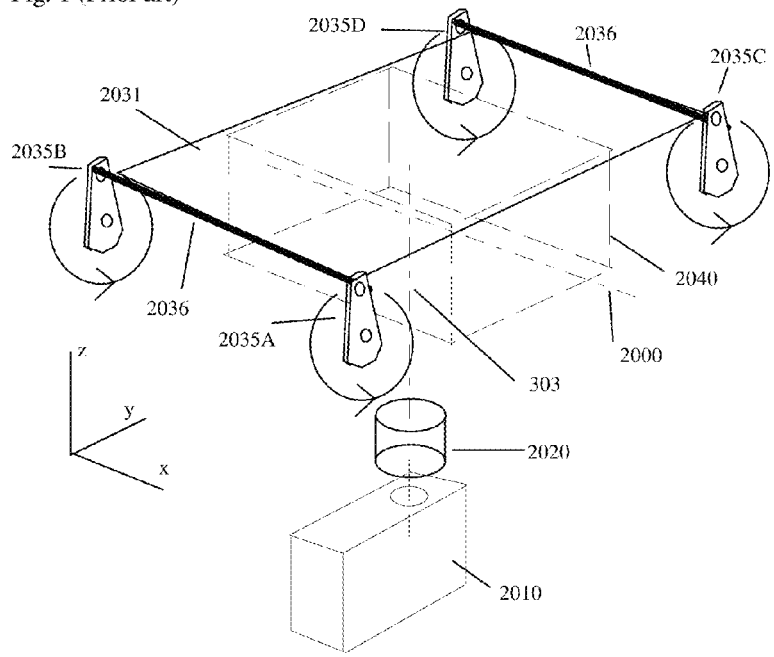
FIG. 1 Basic principle of a V3D display based on Rotary Reciprocating display surface in the prior arts.
Figure 2:
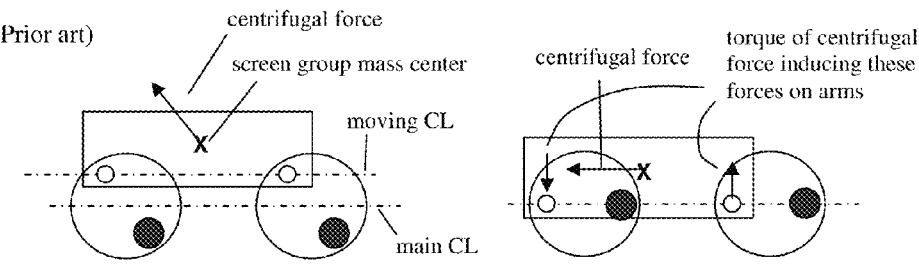
FIG. 2 Screen (display surface) group dynamic instability problem seen in the prior arts.
Figure 3:
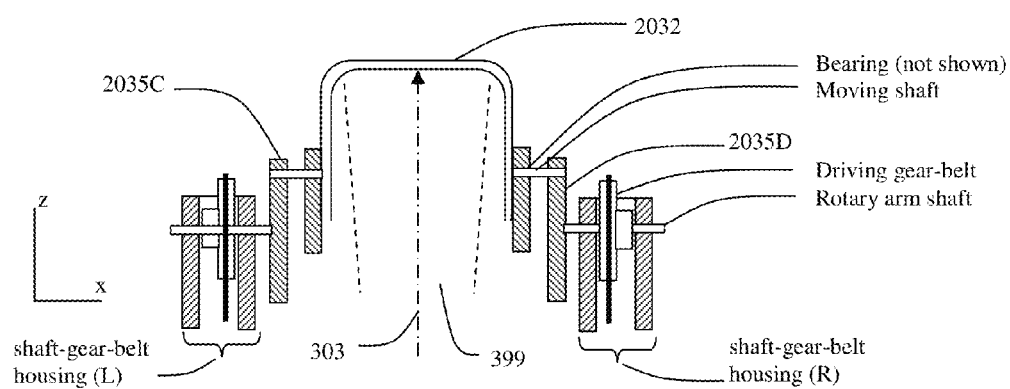
FIG. 3 illustrates a sectional view of an example driving mechanism

Balancing category (3b) requires detailed explanation. Referring to FIGS. 8a and 8b, in general, when the screen group is balanced at 1602 in the y-z plane, the mass center of the assembly is very close to the support frame, when viewed from the front end (FIG. 8b). This is mainly because of the extended shape of the supporting frame 2051 and because the screen is kept as light as possible to minimize inertia. When this screen group is mounted to the main rotary arms, although it can be placed close to the rotary arms, it can not be on the same plane as the rotary arms. In other words, there is always a small distance between the mass center of the screen group and the mass center of the counter weights on the rotary arms. FIG. 9 illustrates the situation. Assuming the mass of the screen group is equally distributed to two locations represented by circles 1801A and 1801B and the counter weights are located at 1802A and 1802B, the plane of the counter weights and the plane of the screen group load are therefore separated by a distance d. Because of this small distance, when the assembly rotates, these two centrifugal forces, one due to the screen group and one due to the counter weights, generate a bending moment that exerts on the rotation axis (main shafts). Even if the screen group and the counter weight are statically balanced, this dynamic bending moment does not disappear. The same is true for the moving wedge group and the second pair of rotary arms. This bending moment of centrifugal forces constantly changes direction as the assembly rotates. For a system with symmetric driving mechanisms on both side of the screen, such as the one shown in FIG. 3, the resultant moment on the whole system is zero. Therefore category (3b) balancing is not a problem, as long as the system structure is rigid enough. But for the "one-end one-side" system, if the bending moment is not balanced (cancelled), the system will vibrate accordingly, which is very undesirable, especially for a handheld system.

The preferred procedure of category (3) balancing (including (3a) and (3b)) can be described with the help of FIG. 10, which illustrates a force diagram of the assembly of rotary arm 2035E, rotary arm 2090A and the shaft (the three are connected as a single rigid body). Arrow Fcw represents the centrifugal force due to the motion of the wedge prism group:

$$Fcw = (m/2) r1 \omega^2 \qquad (5)$$

where m is the mass of the moving wedge prism group (½ of the mass distributed to one arm), r1 is the radius of rotation, and ω is angular speed. Arrow Fcs represents the centrifugal force due to the motion of the screen group:

$$Fcs = (M/2) r2 \omega^2 \qquad (6)$$

where M is the mass of the moving screen group (½ of the mass distributed to one arm), r2 is the radius of rotation, and ω is angular speed. Fcw and Fcs are therefore known quantities. F1 is the net centrifugal force of the rotating arm 2090A with a counter weight. F2 is the net centrifugal force of the rotating arm 2035E with a counter weight. The horizontal distance between Fcw and F1 is d1. The horizontal distance between Fcs and F2 is d2. The distance between the two arms is D. D, d1 and d2 are also known. F1 and F2 are to be determined to balance the force diagram, so that the required amounts and positions of counter weights can be determined.

First, F1 is determined by balancing bending moments due to centrifugal forces along the rotation axis about point P, through which F2 passes:

$$Fcs\, d2 + Fcw(d1+D) = F1\, D. \qquad (7)$$

For simplicity, we assume that each arm balances itself when no counter weight or load is applied. That is, the centrifugal force on an arm is completely due to added counter weight mass. Therefore, $$F1 = M1\, R1\, \omega^2, \qquad (8)$$

where M1 is the mass of added counter weight and R1 is the distance from the center line. (In case the arm itself is not balanced, then M1 and R1 need to be corrected by the non-balanced part of the aim. Such a correction procedure will be known to a person skilled in the art, based on the current teaching.) From eqn. (5), (6) and (8), eqn. (7) becomes:

$$(M/2)r2\, d2\, \omega^2 + (m/2)r1(d1+D)\omega^2 = M1\,R1\,D\,\omega^2$$
$$M1\,R1\,D = (M/2)r2\,d2 + (m/2)r1(d1+D) \qquad (9)$$

By eqn. (9), the counterweight (mass and location, M1 R1) of on rotary arm 2090A can be determined.

Next, F2 is determined by balancing all centrifugal forces on the rotation axis in the radial directions. As described above, this is equivalent to static balancing, as follows:

$$(M/2)\, r2 + M1\ R1 = (m/2)r1 + M2\ R2 \qquad (10)$$

$$\begin{aligned} M2R2 &= (M/2)\, r2 + M1\ R1 - (m/2)\ r1 \\ &= (M/2)\, r2 - (m/2)\ r1 + [(M/2)\ r2\ d2 + (m/2)\ r1\ (d1+D)]/D \end{aligned} \qquad (11)$$

By eqn. (11), the counterweight (mass and location, M2 R2) of on rotary arm 2035E can be determined.

Thus, by applying eqn. (9) and (11), counter weights can be selected to achieve balance categories (3a) and (3b).

Equation (10) (and (11)) guarantees the satisfaction of balance (3a). We can double check if the quantity (M2 R2) obtained from eqn. (11) can satisfy the requirement of balance (3b), for example, by checking the balance of the moments of centrifugal forces along the rotation axis about point O:

$$\begin{aligned} F2\ D &= Fcw\ d1 + Fcs\ (d2+D) \\ M2\ R2\ D &= (m/2)\ r1\ d1 + (M/2)\ r2\ (d2+D) \end{aligned} \qquad (12)$$

By eqn. (11):

$$\begin{aligned} M2\ R2\ D &= (M/2)\ r2\ D - (m/2)\ r1\ D + (M/2)\ r2\ d2 + \\ &\quad (m/2)\ r1\ (d1+D) \\ &= (M/2)\ r2\ D - (m/2)\ r1\ D + (M/2)\ r2\ d2 + (m/2)\ r1\ d1 + \\ &\quad (m/2)\ r1\ D \\ &= (M/2)\ r2\ D + (M/2)\ r2\ d2 + (m/2)\ r1\ d1 \\ &= (m/2)\ r1\ d1 + (M/2)\ r2\ (d2+D) \end{aligned}$$

That is, eqn. (11) and (12) are the same. Bending moments due to centrifugal forces are balanced about point O as well.

Note: In a uniform circular motion (Ref. D. Halliday and R. Resnick, Fundamental of Physics, John Wiley and Sons, 1981, p. 49), the centripetal acceleration:

$$a = v^2/r = r\omega^2$$

$$v = r\omega = r2\pi f$$

$$a = r(2\pi f)^2$$

Centrifugal force: $Fc = m\ a = m\ r\ (2\pi f)^2 = m\ r\ \omega^2$

--> Centrifugal forces of the same rpm: $Fc \propto m\ r$

--> Moment of centrifugal force $T = Fc\ d \propto m\ d\ r$

Figure 11:
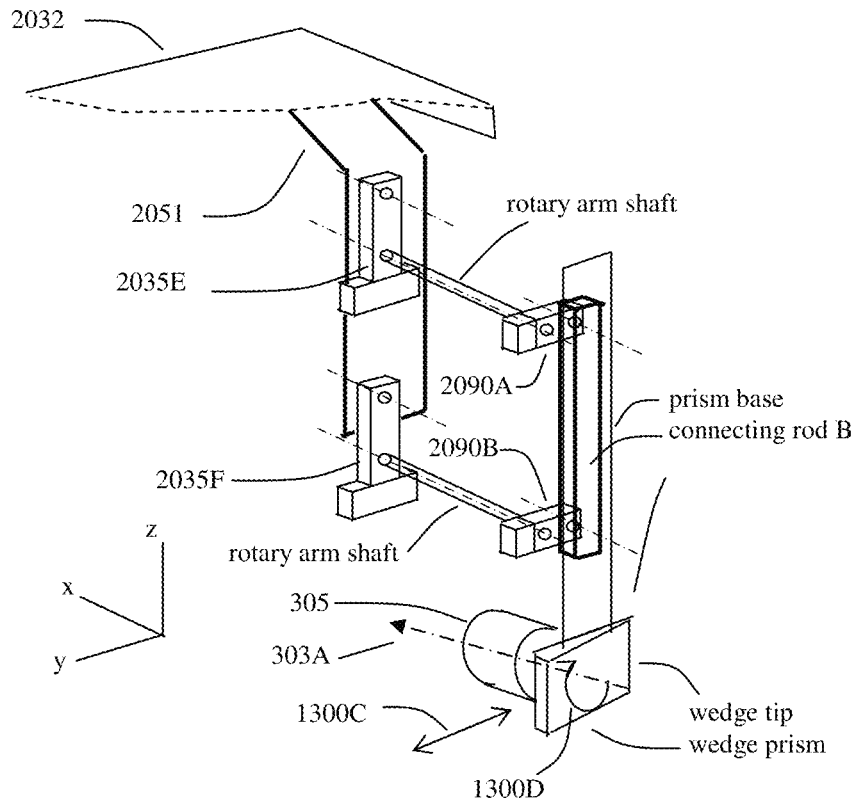
FIG. 11 illustrates the situation of 90-degree phase difference between the moving prism and the screen group in the "one-end one-side" layout.

The moving prism and the screen can also be positioned with a phase difference other than 180 degree. For example, FIG. 11 illustrates the situation of 90-degree phase difference. That is, when the screen moves to the top position (z+ maximal), the connecting rod B (and prism base and wedge prism) moves to maximal y− position. In this case, the projection beam and lens 305 should be placed according to this maximal y− position. The wedge prism is oriented with wedge tip pointing toward y− direction. The effective reciprocating direction of the thin wedge prism is in horizontal (y) direction, as indicated by 1300C.

In this 90-degree phase difference example, the procedure of category (3) balancing described previously needs to be applied in two different directions: in the direction of the main rotary arms (2035E, 2035F) and in the direction of the auxiliary arms (2090A, 2090B).

Figure 12:
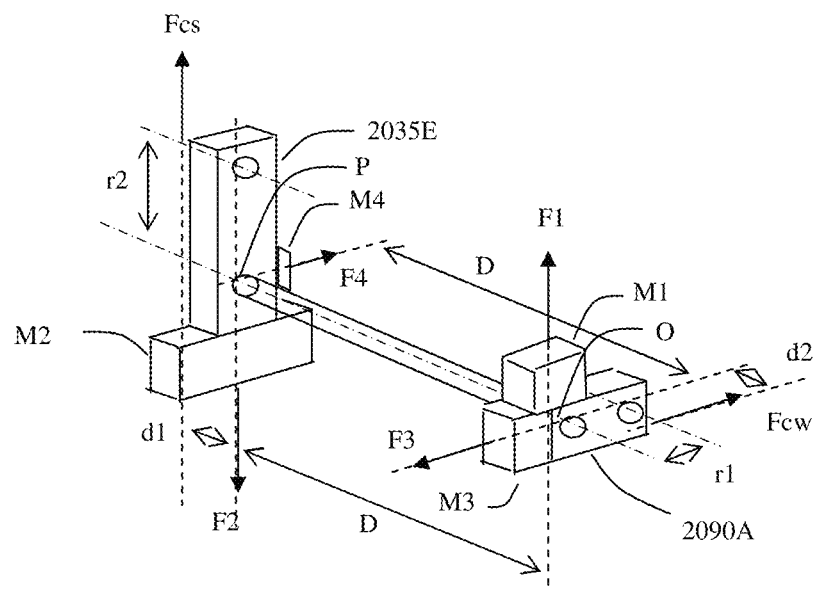
FIG. 12 illustrates balancing considerations of FIG. 11.

In the direction of the main rotary arms, the following two conditions must be satisfied: (referring to FIG. 12, which illustrates one rotary arm shaft connecting a main arm and an auxiliary arm)

Balancing centrifugal forces in radial direction:
$$F2 = F1 + Fcs \quad (15)$$

Balancing bending moments on shaft about P: Fcs
$$d1 = F1D \quad (16)$$

As before, Fcs represents the centrifugal force due to the motion of the screen group. F2 is the net centrifugal force of rotating arm 2035E with a counter weight M2 placed to the opposite direction of Fcs. F1 is the net centrifugal force of rotating arm 2090A with a counter weight M1 placed to the same direction of Fcs, in order to balance the bending moment.

In the direction of the auxiliary rotary arms, the following two conditions must be satisfied:

Balancing centrifugal forces in radial direction:
$$F3 = F4 + Fcw \quad (17)$$

Balancing bending moments on shaft about O: Fcw
$$d2 = F4D \quad (18)$$

Fcw represents the centrifugal force due to the motion of the wedge prism group. F3 is the net centrifugal force of rotating arm 2090A with a counter weight M3 placed to the opposite direction of Fcw. F4 is the net centrifugal force of rotating arm 2035E with a counter weight M4 placed to the same direction of Fcw, in order to balance the bending moment.

Using equations (15)-(18) and applying a similar procedure described previously, the amounts and locations of the 4 counter weight (M1, M2, M3 and M4) can be determined to satisfy the requirement of category (3a) and (3b) balancing.

In the case of FIG. 11 (90-degree phase difference between the main rotary arms and the auxiliary arms), the whole mechanism is actually a "parallel crank cross compound" mechanism. As a result, the rotations of all arms are synchronized. No gears or timing belt is needed. The whole mechanism can be driven at one main shaft using plastic pulleys and an o-ring belt. (See more explanations of "parallel crank cross compound" mechanism in section 2)

Figure 13:
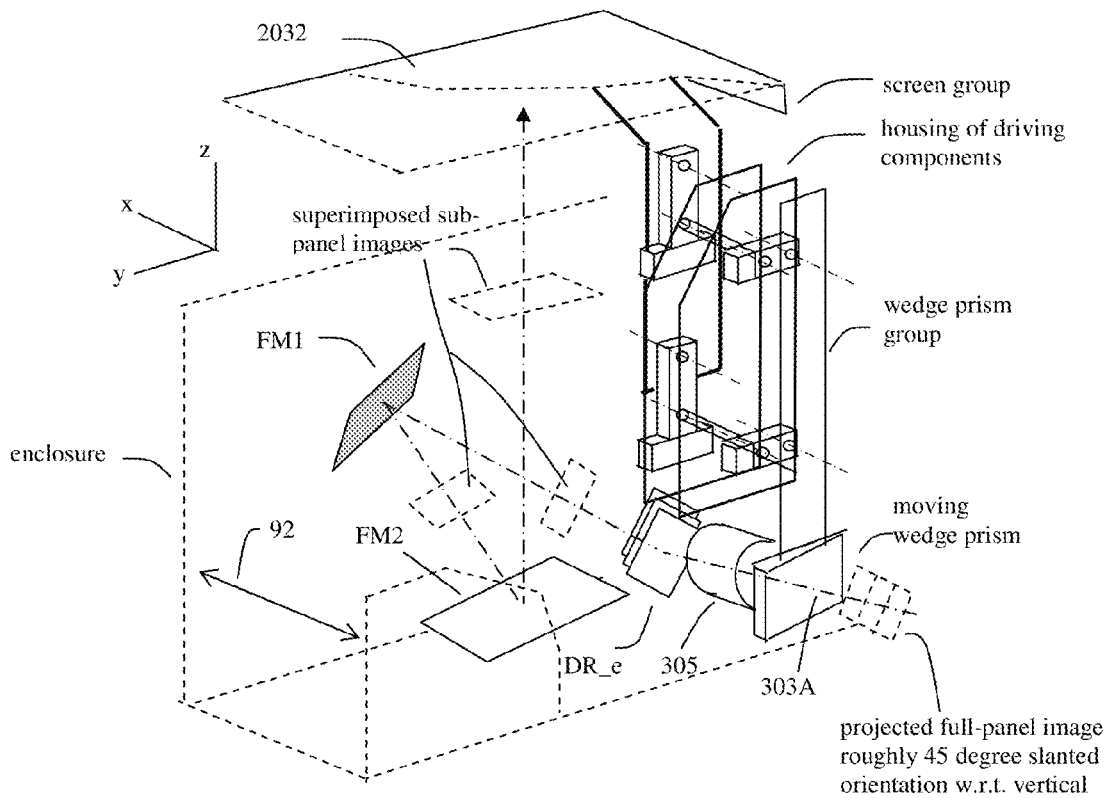
FIG. 13 illustrates the projection path of the system of FIG. 11.

FIG. 13 illustrates the projection path of the system, when a thin wedge prism rapid focusing system is used. The projection centerline 303A passes through the moving wedge prism and the projection lens 305. A set of dichroic reflector (DR_e) at the exit of the projection lens is needed for color image according to "Pattern Projection" technique (Tsao U.S. Pat. No. 6,961,045). DR_e folds the projection beam. Two folding mirrors (FM1, FM2) then send the projected image frame onto the moving screen 2032. Take note of the orientation of the projected full-panel image and of the folding mirrors. The whole projection path can be packed within an enclosure of a width 92 close to the width of the moving screen.

2. Slim System by One-Side Two-Ends Layout

The second preferred layout of components will now be described.

Refer to FIG. 15a, 15b, 15c: The Rotary-Reciprocating mechanism for slim form factor The mechanism has following features:

(1) "One-side two-end" support structure

In order to achieve minimum height (minimum form factor), the screen is driven at a location close to the screen surface. That is, as shown in FIG. 15a, the main moving shafts are placed near the height level of the screen. This also ease the balancing of the screen group itself (screen, screen support, main connecting rod) in the vertical direction, because the screen group is driven at locations near its vertical mass center. In addition, the screen and the support frame are built from lightweight materials (see details below). All these help to reduce the counter weights to be used on main rotary arms, thus helping to reduce size.

The screen is driven by 2 main rotary arms only on one side (on R side per FIG. 15a). This reduces the total width of the system. Also, this allows the L side to be completely without view-blocking structures, maximizing viewable angle. The screen and the screen support are attached to a main connecting rod. The two main rotary arms drive the main connecting rod at the two ends, as shown in the drawings. This "two-end" driving position maximizes viewable angles on the R side, because the rotating arms at two ends have minimal view-blocking effect. This two-end driving also limits overall length (from back end to front end) of the system. This "two-end" driving position also allows the mass of the screen group to be kept minimal. All these also help to reduce the counter weights to be used on main rotary arms, thus helping to reduce size.

(2) Main rotary arms and Aux. rotary arms are coupled as "parallel crank cross compound"

One main arm is coupled with one Aux. arm by one main shaft, but with a 90-degree phase difference between them. The main connecting rod connects the two main rotary arms via the two main moving shafts. The Aux. connecting rod connects the two Aux. rotary arms via the two Aux. moving shafts. All center distances are maintained to be the same (within practical assembly tolerance) as the center distance between the two main shafts. This is called "parallel crank cross compound" in the art of mechanical mechanism. The whole mechanism can be driven at one main shaft using plastic pulleys and an o-ring belt. The mechanism is simple and low-cost. Tests have shown that smooth and quiet rotation can be achieved by this arrangement.

(3) Balancing: The static and dynamic balancing requirement and procedure are similar to the cases described in section 1. Especially, the main rotary arms and the auxiliary arms have a phase difference of 90 degree. Therefore, category (3b) balancing needs to be done in two perpendicular directions as described previously, in order to minimize vibration. The procedure is basically the same as the situation of FIG. 12 and the corresponding descriptions.

(4) When the screen is positioned in the middle, the mechanism can be folded down to a slim form factor, as shown in FIGS. 15b and 15c.

Figure 16:
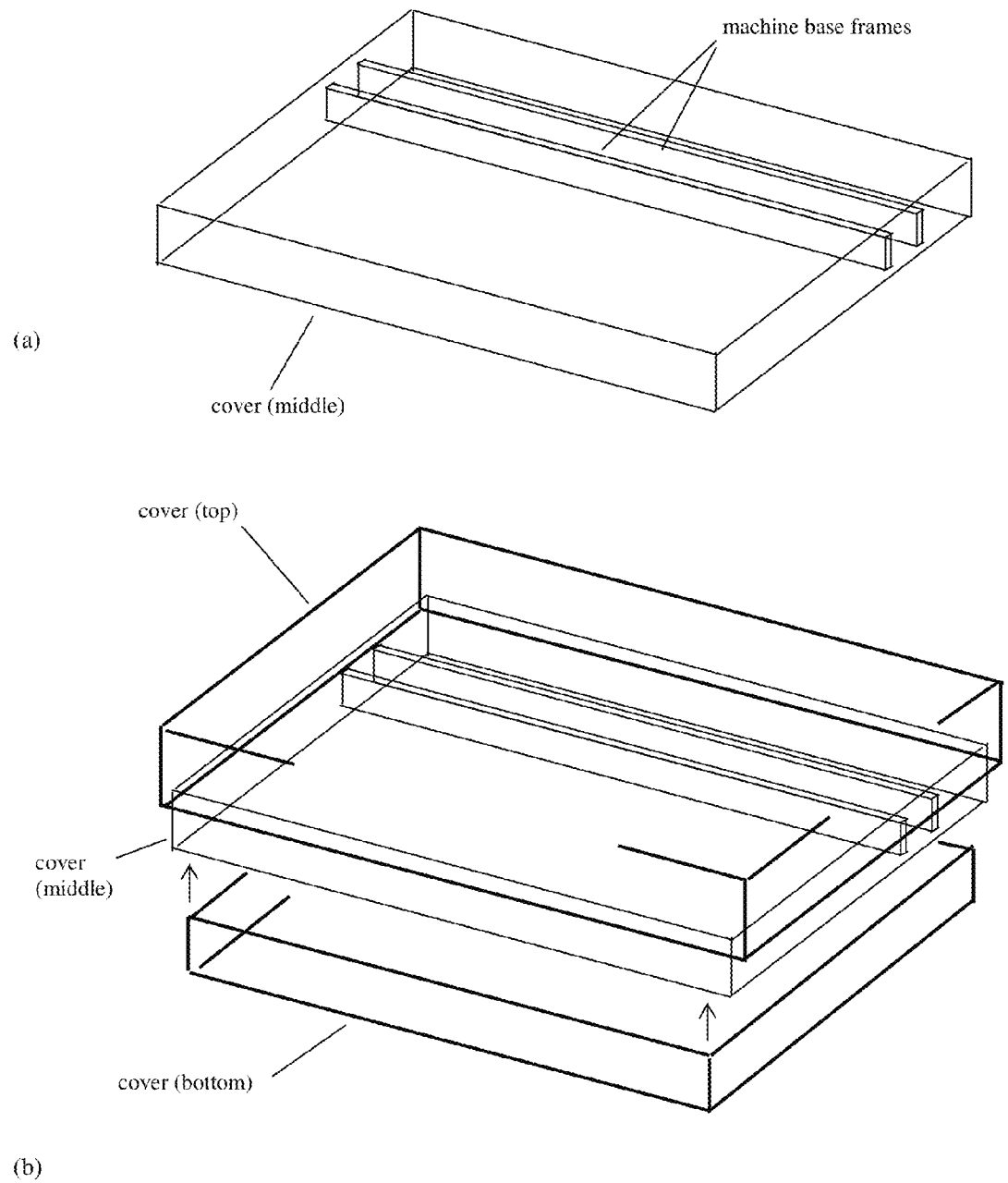
FIG. 16 illustrates a contractible cover for the system of FIG. 15.

Refer to FIG. 16a, 16b: Contractible cover

When the motion mechanism of FIG. 15a is set to minimum height (smallest form factor), the cover, which protects the screen and its driving mechanism, should be contracted also. In general, the cover is divided into 3 portions: middle, top and bottom. The middle cover has 4 sides but with the top and bottom open. The top cover has only the lower side open. The bottom cover has only the topside open. When in contracted (folded down) mode, the top cover slides down to cover the outside of the middle cover, and the bottom cover slides up to the inside of the middle cover. Reversing the inside/outside arrangement will have the same effect.

Figure 17:
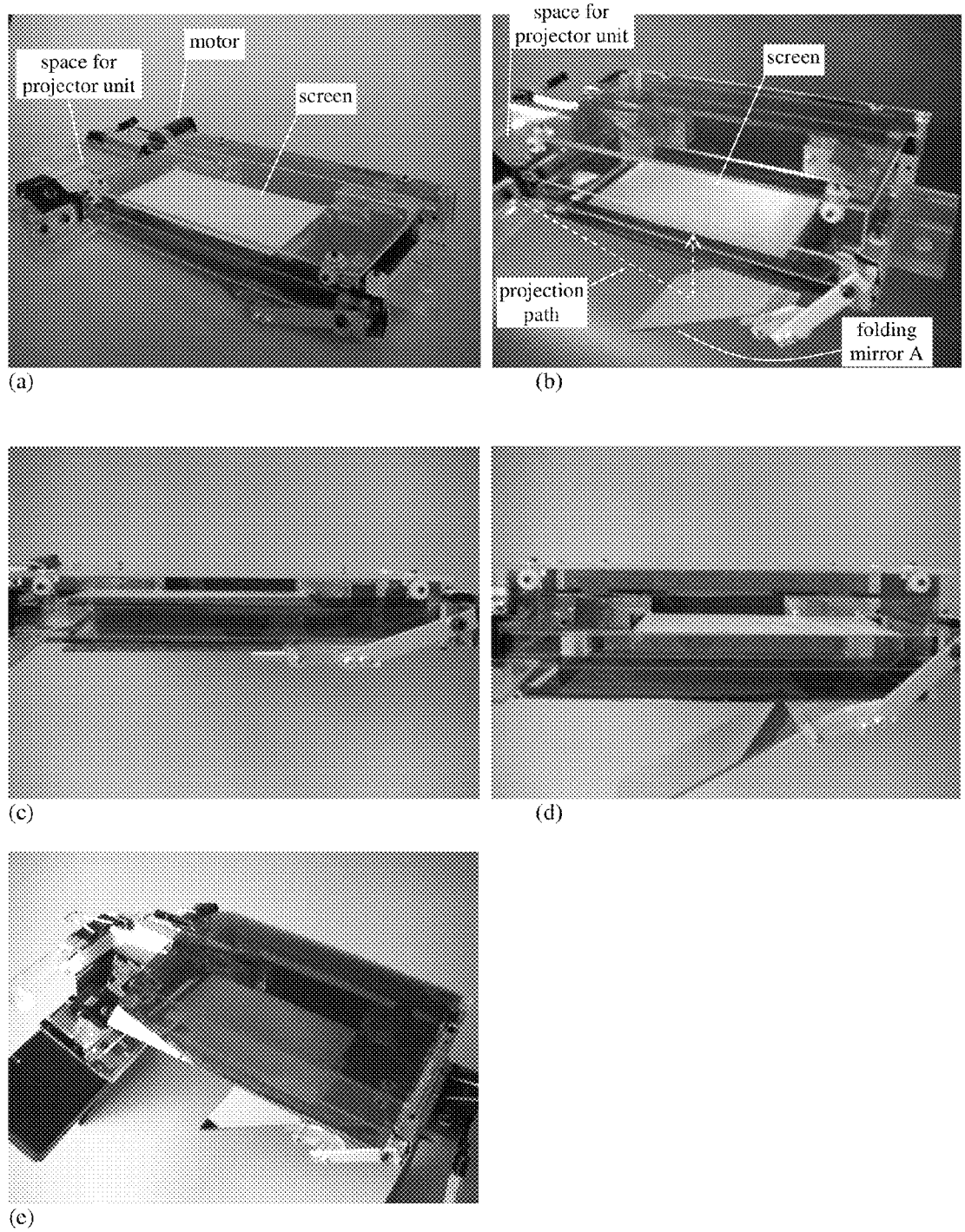
FIG. 17(a)-(d) shows photographs of a functional model based on the layout of FIG. 15.
FIG. 17(e) shows a photograph of a tinted flexible sheet of FIG. 24 covering over the model of FIG. 17.

FIG. 17a (perspective view) and 17c (side view) show photographs of a prototype with a cover in its contracted mode. FIG. 17b (perspective view) and 17d (side view) shows the extended mode.

Figure 18:
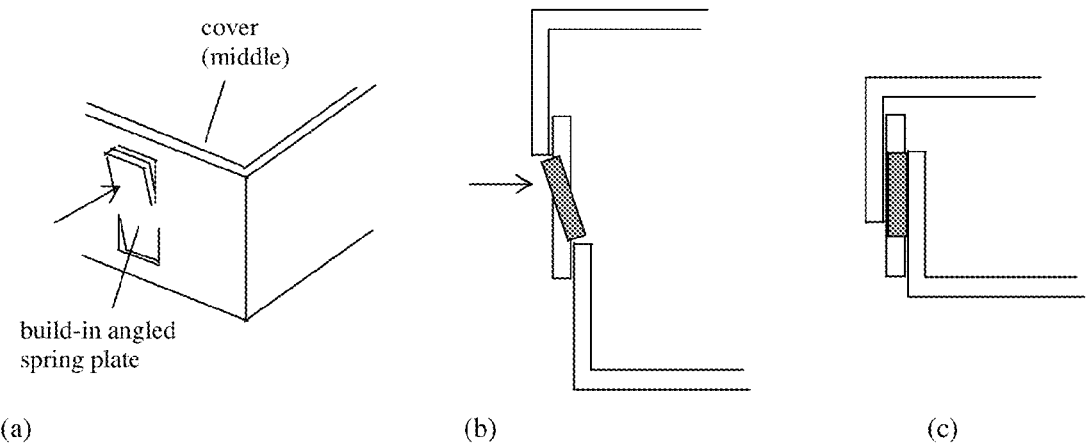
FIG. 18 and FIG. 19 illustrate a positioning and locking mechanism of a contractible cover in this invention.
Figure 19:
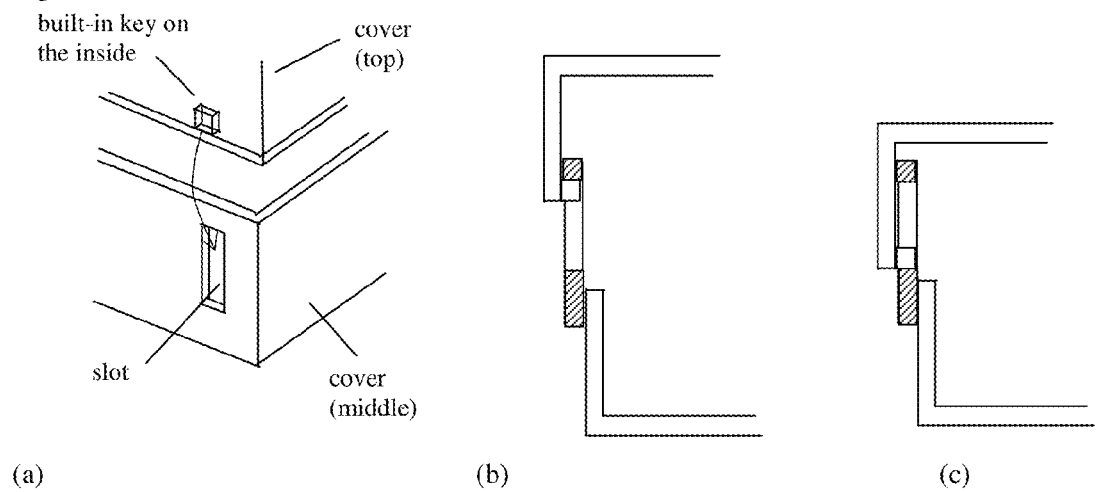

The cover can further include a few preferred features:

FIGS. 18a, 18b, 18c and 19a, 19b, 19c:

(1) When the top and bottom covers are extended, they need to be locked in positions. For example, this can be achieved by using a build-in spring plate at each of the four corners of the middle cover. When the covers are extended above and below the plate, the angled plate acts a stop to prevent the covers from sliding back (FIG. 18b). By pressing the spring plate in, the covers can be contracted. In addition, the top and bottom covers can not become detached from the middle cover. For example, this can be achieved by using build-in slots on the middle cover and build-in keys on the top and bottom covers. These build-in features can be easily made on plastic covers by process such as injection molding.

Figure 20:
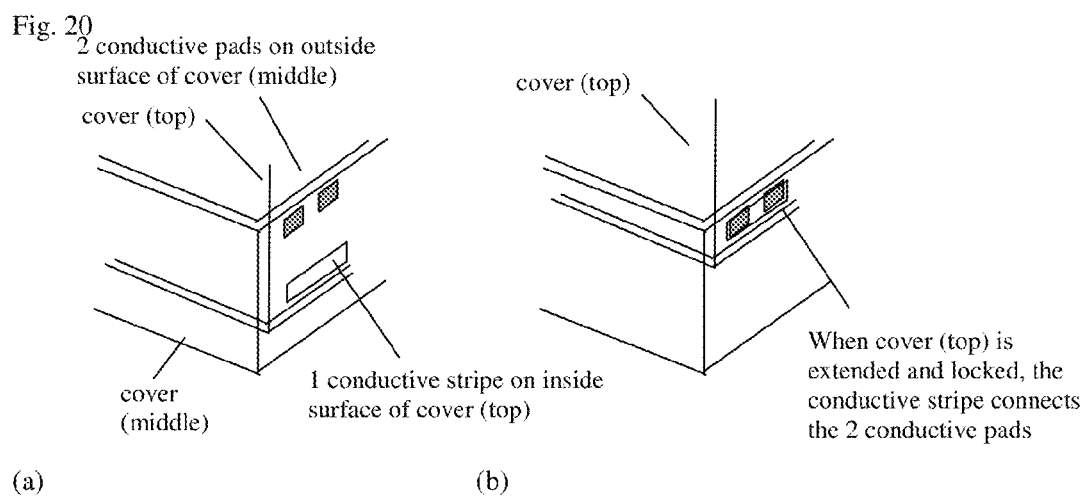
FIG. 20 illustrates a build-in safety switch in a contractible cover for safe-guarding motor switching.

FIG. 20a, 20b:

(2) It is preferred that the motor that drives the screen motion can be turned on only after the top and bottom covers are extended and locked in position. That is, a safety mechanism is preferred to avoid activating the screen motion when the covers do not provide enough space. This can be achieved by building series electric switches into the cover mechanism. For example, FIGS. 20a and 20b illustrate such a switch. Two switches of this kind can be used, one controlled by top cover, one by bottom cover. The two switches can be connected in series to the power source of the motor. If either the top cover or the bottom cover is off its position, then the motor will stop.

Projection Path:

FIGS. 17a and 17b illustrate the first preferred position of the projector unit. In order to reduce the size of the whole system, the projector unit is placed next to the display unit. This position places the projector at one end of the screen. A reflector (folding mirror A) folds the path of projection so that the projection beam reaches the screen from the backside. The folding mirror A is attached to an extension arm on a rotary joint. The extension arm is attached to the projector unit (or alternatively, to the display unit) on another rotary joint. In other words, most of the path of projection is "external" of the system package and cover. The purpose of this arrangement is to minimize the size of the whole system for portable products. The external reflector can be folded down when it is not used.

Figure 21:
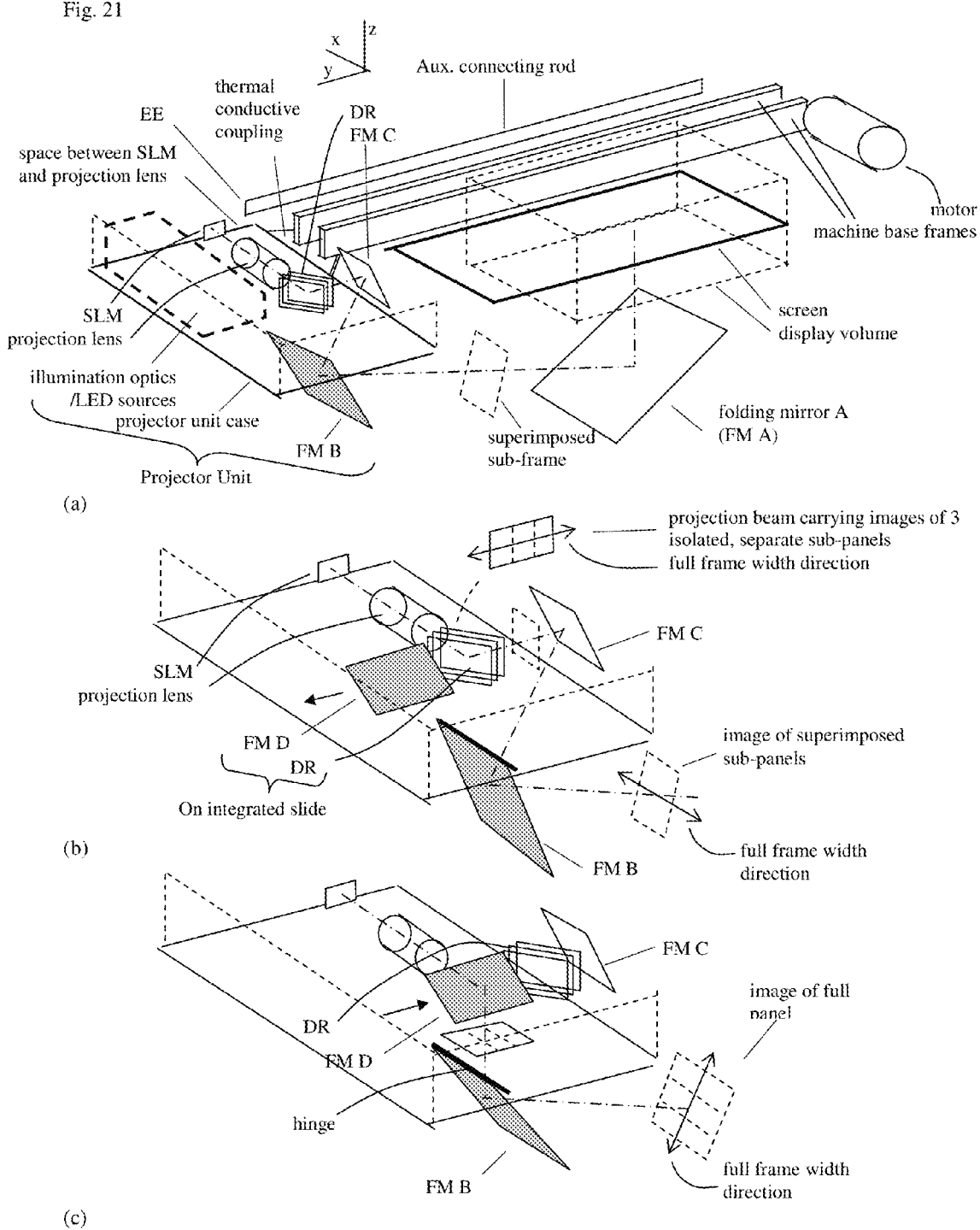
FIG. 21 illustrates projection path of the system of FIG. 15, with convertible mechanism for different display modes.

Under this projection path arrangement, the whole display system can further include the following features:

Refer to FIG. 21(a) (rotary arms and other components not shown for clarity)

(1) Machine base frame integrated or attached to the projector unit as extended heat sink: In general, LEDs are used as light source of the projector unit. In general practice in portable LED projector industry, the whole casing of the projector is attached to the heat sink of LEDs as heat sink. Here, the casing of the projector unit can be coupled (with thermal conductive coupling) to the machine base frame (which is made of metal, such as aluminum, in general) so that the whole machine frame can be used as extended heat sink.

(2) When a moving thin wedge prism is used (for rapid focusing adjustment), the prism can be mounted to one end (EE) of the Aux. connecting rod and placed in the space between the SLM and the projection lens. Because the Aux. connecting rod and the screen has a phase difference of 90 degree, this situation is similar to FIG. 13.

(3) Driving mechanism with motor and the projector unit can be placed at opposite ends.

Optical design for conversion between V3D mode and full-panel 2D mode:

Tsao U.S. patent application Ser. No. 13/271,701 describes conversions of illumination and projection optics for multiple mode operation, when the SLM is illuminated as a whole or as isolated, separate sub-panels. Here, the design of exit optics (that is, optics used after projection lens) is for projecting image frames to the screen at correct orientation.

FIG. 21(b): SLM has separate and isolated sub-panels. This is mainly for V3D mode. The dichroic reflector set (DR) superimposes sub-panel images into one. Reflectors FM C and FM B guide the projection beam to FM C. The image frame of superimposed sub-panels matches the aspect ratio of the display volume.

FIG. 21(c): In 2D mode, full panel image should be projected for best 2D image quality. The projected full frame needs to rotate 90 degree in order to match the orientation of the screen. Here, FM D replaces DR and reflects the beam downward to FM B, instead of horizontally to FM C. This way, the projected image frame reaches the screen with the preferred orientation.

FM B can be rotated about a hinge, so that it can be set to an appropriate angle or can be closed up. FM D and DR can be mounted on a slide so that they can be positioned according to display modes. FM D, FM C and DR can all be hidden within the slim projector unit case.

By "Pattern Illumination" technique, sub-panels on a SLM can also be defined as different but interlocking groups of pixels. In this case, in stead of an "aperture plate", a "pattern plate" is used. Light sources illuminate the pattern plate. The pattern plate is in turn used as a new light source and is projected onto the SLM. A pattern plate under illumination forms a light pattern* One example is using a 2D array of micro-lenses as a pattern plate to create a 2D array of tiny light spots as the light pattern. (See Tsao U.S. Pat. No. 6,961,045 for details) In this case, the projector unit may not need dichroic reflector set in exit optics. The optics of FIG. 21(c) (without DR) can be used for both V3D mode and 2D full panel mode, except that in 2D full-panel mode the SLM should be illuminated with (generally) uniform light, in stead of a light pattern. This can be achieved by adding a diffusive element (such as a diffusing glass) close to and right after the pattern plate, or by adding a lens to make the light pattern slightly defocused so that the light pattern becomes a generally uniform beam. In this way, the only movable element is the diffuser or the additional lens. All other optical components can be kept unchanged: Therefore, the precise alignment of light pattern to pixels is not disturbed.

The following table summarizes the conversion of optical components in different display modes under different illumination methods/designs.

TABLE 1

V3D-2D full panel conversion under different illumination designs

| Display Mode | Illumination | Exit optics | See description in: |
|---|---|---|---|
| Case 1 | | | |
| V3D | Regular 2D projector illumination | dichroic reflectors for recombination | Tsao US App. No. 13/271,701 |
| 2D full-panel | Regular 2D projector illumination | single plain reflector or no reflector | Tsao US App. No. 13/271,701 |
| Case 2 | | | |
| V3D | Pattern Illu. -- Aperture Plate (isolated sub-panels) + dichroic reflectors | dichroic reflectors for recombination | Tsao U.S. Pat. No. 6,961,045 |
| 2D full-panel | remove Aperture Plate replace dichroic reflectors with a plain reflector | single plain reflector or no reflector | Tsao US App. No. 13/271,701 |
| Case 3 | | | |
| V3D | Pattern Illu. -- Pattern plate (interlocking sub-panels) + dichroic reflectors | dichroic reflector at exit is not necessary | Tsao U.S. Pat. No. 6,961,045 |
| 2D full-panel | insert a diffusive (or defocusing) element into the optical path but and keep the rest unchanged | dichroic reflector at exit is not necessary | This current invention. |

If no moving wedge prism is used, then the projector unit can be positioned at different location relative to the display unit. For example, FIGS. 22(a) and 22(b) illustrate the 2nd preferred projection path arrangement.

Tint and Contrast Improvement:

The protective cover is basically transparent so that a V3D image can be viewed from almost all directions. To improve image contrast, a general practice is to use a gray tint in the transparent cover. However, for the current contractible, very slim cover design (FIG. 16, FIG. 17), most area of the top cover should be flat or should have very small curvature, in order to minimize the thickness of the system. This creates a problem of brightness reduction at shallow viewing angle. See explanation in FIG. 23. The top cover can be made into a curved shape to minimize this effect, at the expense of increasing system thickness.

An alternative, and preferred, approach is to keep a flat, clear top cover but add a detachable curved, flexible tinted sheet as an overlay. FIG. 24 describes the design. The flexible sheet can be a clear plastic sheet, such as 0.010" thick Vinyl, with a tint film, or a sheet of gray color. FIG. 17(e) shows a photo of a tinted flexible sheet covering over a prototype.

Shade and Black Background:

FIG. 25 illustrates a top shade and black background sheet that can further improve V3D image's visibility under high ambient lighting condition. The sheet is detachable. The function of the top shade is to block strong ambient light. The black background is to provide a black background along the line of sight, so that displayed images are not confused with bright objects at the background environment. Again, the sheet can be made of thin flexible plastics or even paper. In carrying mode, the sheet can be collapsed with the display system, or can be detached and folded for storage.

FIG. 26 illustrates details of the assembly of main aims+ main moving shafts+bearing blocks+main connecting rod. (Assembly on the Aux. arms and Aux. connecting rods etc. is similar.) For low cost and ease of assembly, sleeve bearings (plane bearings) are preferred for the moving shafts (i.e. on the connecting rod). The bearing blocks can be made directly from a low-wear bearing material, such as Acetron Acetal or Ertalyte TX, by drilling bearing holes on the block. The bearing blocks can be mounted to the connecting rod, by using screws or glue. A jig can hold the moving shafts at correct center distance and in parallel, while the bearing blocks and the connecting rod are mounted on. The bearing blocks+connecting rod unit can also be made as an integral part. In this case, the spacing between the two bearing holes should be maintained precisely.

Preferred Materials for the Translucent Screen Film

In FIG. 6, the screen 2032 includes a thin translucent film 2038 on a backing structure 2037. Any thin translucent diffusive film can be used as the screen film. Specifically, a micro-porous membrane film. has the properties of light-weight and good optical quality for the purpose of screen film. For example, Celgard 2400 single-layer polypropylene membrane, made by Celgard of Charloote N.C., has a porosity of 35% and a thickness of 25 micrometer (0.001"). Its diffusive property is close to the standard diffusive OPAL glass. It also has good tensile strength and does not deform significantly under load.

Ultra Light-Weighted Screen Group Structure

FIG. 27 (a):

Using screen film such as Celgard 2400, an ultra light-weighted screen group structure can be made. The screen backing structure 2701 is no longer of a shoebox cover shape of 2037. The new backing frame 2701 includes 3 beams forming a rectangular frame with the connecting rod. A narrow horizontal strip area 2702 forms the rim of the frame. The connecting rod and the backing frame, with the rim, can actually be fabricated as an integral part from a same plastic material by injection molding or other plastic forming processes. By reinforcing the joint area 2703 with extra thickness in curved shape, the structure can keep deformation to the minimal in all directions while keeping a minimal weight. The screen film can be taped or glues onto the rim, preferably with some tension. Such a screen group structure keeps the weight of the frame to the minimal. Most area of the screen contains only the thin screen film. Our tests and analysis have shown that as long as the size of the screen film is under 4"-5" diagonal, the maximal vertical deformation of the film due to either inertia or air drag will result in only a very small distortion of the V3D image.

FIG. 27(b):

For screen of larger sizes, a thin transparent plastic sheet with a preformed shape can be used as support structure underneath the screen film. The basic idea is to use the preformed shape to provide structure strength without using thick material, and at the same time the transparency and the shape pose minimal distortion to the projection beam.

Figure 27:
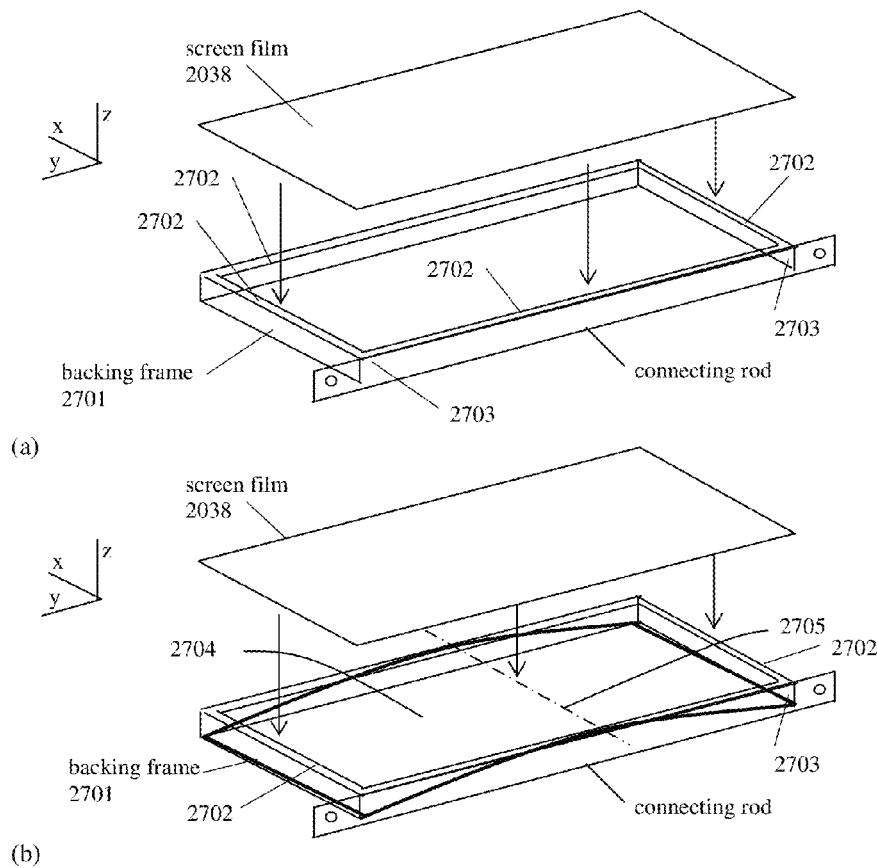
FIG. 27 illustrates ultra-light-weighted screen group structure design of this invention.

FIG. 27(b) is similar to FIG. 27(a) except that the structure further has a curved transparent sheet 2704 to provide support like an arch. The ridge of the arch, line 2705, is at the same horizontal level as the rim 2702. Therefore, the screen film has an additional support line in the middle. This allows screen film of larger size without significant deformation during screen motion.

For even larger screen sizes, the transparent support structure can take a wave shape to provide multiple support lines without significant effect on projected image. (See Sec. 4)

Keeping the mass of the screen group small is important. Smaller mass of the screen group requires smaller counter weight on the rotary arms and on the auxiliary arms. Therefore, the size of the mechanical mechanism can be kept smaller.

When Not Using Rapid Focusing Mechanism:

Vari-focusing mechanism can be omitted if the projection lens can provide enough depth of focus. In such cases, the connecting rod B or aux. connecting rod does not need to carry the moving thin wedge prism. In the cases of mechanisms of 90-degree phase difference between the main arms and the aux. arms, the function of the connecting rod B or aux. connecting rod is purely for connection in the "parallel crank cross compound" mechanism (FIG. 11 and FIG. 15*a*).

LED Light Source Driving Signal Pattern:

This applies to any projector-based V3D display system using LEDs as light source.

When LEDs are used as light source, especially when batteries are used as power source, it is preferred to drive each LED lamp by pulsed signals. This allows higher peak current, reduces load to power circuitry and extends battery life.

In 2D projection mode, color image is generated by field sequential technique, which illuminates the display panel by R, G, B colors in sequence. That is, the illumination of each color is pulsed.

Figure 14:
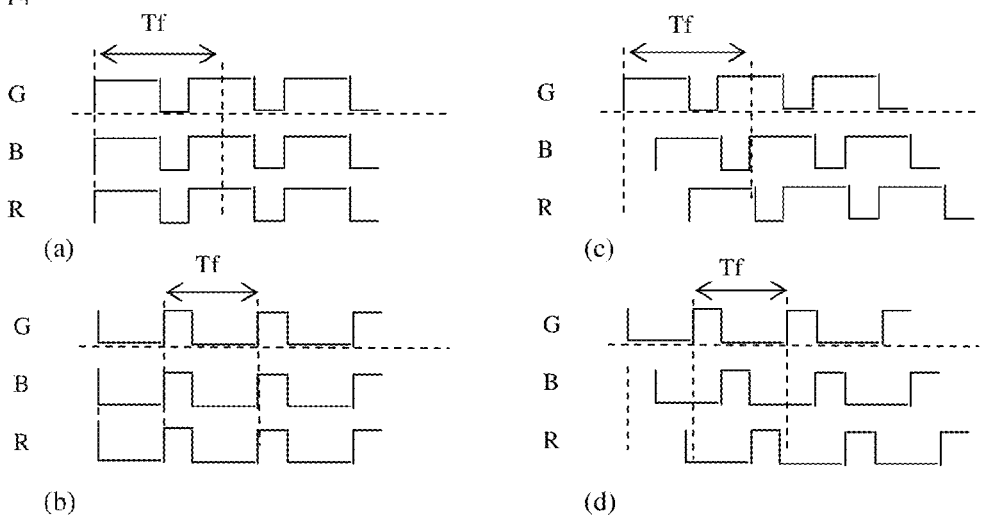
FIG. 14 illustrates "phased wave forms" for driving LED light source in this invention.

But in V3D mode, the above technique cannot be used, because each frame in a V3D image needs 3 primary colors simultaneously, or almost simultaneously. A straightforward approach is to drive R G B 3 LEDs by the same pulsed waveform. For example, FIG. 14(*a*) illustrates a waveform of ⅔ duty cycle. FIG. 14(*b*) illustrates a waveform of ⅓ duty cycle. However, the preferred way is to use a phase difference among R, G and B waves. For example, FIG. 14(*c*) uses the same ⅔ duty cycle waveform, but the 3 colors have a phase difference of ⅓ period of the wave. As a result, at any time, the load is only ⅔ of the peak load of FIG. 14(*a*). Similarly, in FIG. 14(*d*), at any time, the load is only ⅓ of FIG. 14(*b*): In these "phased waveforms", the 3 continuous pulses (R G B) should have a combined period shorter than the minimal frame duration Tf of the V3D display system, so that each single frame still contains R G and B colors.

3. Slim Systems in Product Configurations

The slim/compact systems described above can be a part of a stand-alone product. They can also be an accessory system to a computing host system, or be a product extension to a modularized projector system. In such cases, design for slimness and compactness is considered together with the host system or the modularized system.

As an Accessory V3D Display System to a Host Computing Systems

FIG. 28:

The block diagram shows a simplified modular configuration of the V3D Display system. When using only the Accessory V3D Display System, a host computing system connects to the Accessory V3D Display at connector B and C via an interface or communication module. The V3D Image Processing Module is the rendering engine, which converts 3D geometric primitives data (triangles, lines, points etc.) to be updated into "Vector" data (to be explained below). The Volume Buffer Unit includes memory that stores a whole volume of current image data to be display in the display volume. If the host computing system has proper capacity and flexibility, then V3D image processing (rendering) could be performed in the host system. In this case, the Accessory V3D Display does not need the V3D Image Processing module. The host system can output 3D "Vector" data to connector A, via a high-speed interface module. As for 2D image data, existing regular DMD control chipset can be used. A mode control unit takes command from User (by a switch) or from software and controls a switching circuit, such as a Mux/deMux unit (multiplexer/demultiplexer), to connect the DMD to the 2D image controller module or to the Volume Buffer Unit.

Figure 29:
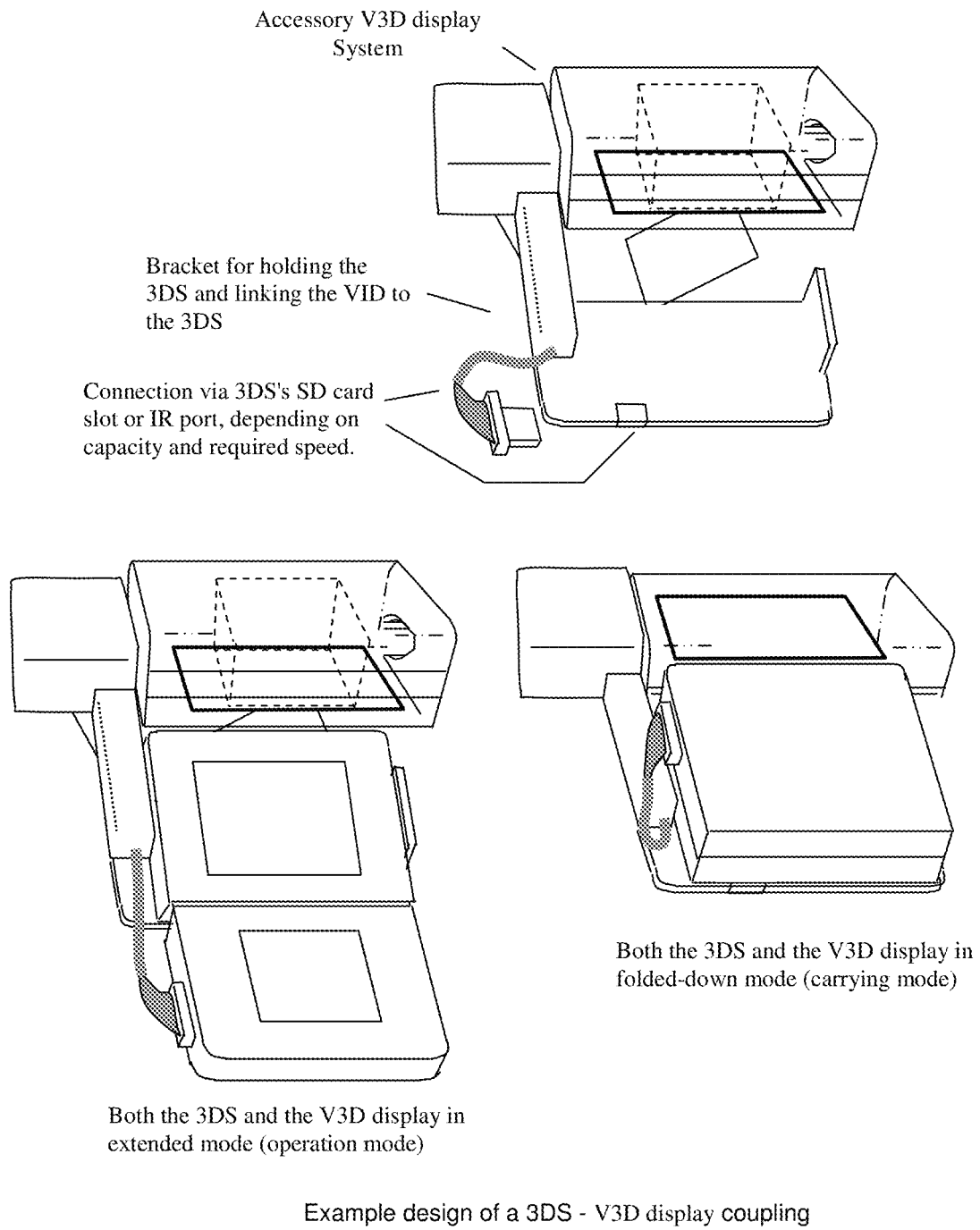
FIG. 29 illustrates an example of using a portable game device as host system for the Accessory V3D display system.

FIG. 29 illustrates an example of using a portable game device (a Nintendo 3DS) as host system, the Accessory V3D Display can be become a portable V3D gaming device. The Accessory V3D Display can use the controls of a 3DS system as the user interface and use 3DS's computing resources.

Smart cell phone, tablet computer, notebook computer, PC and other computing system can also be the host system and use the Accessory V3D Display as an add-on, via connection such as USB or WiFi etc.

As a Product Extension to Systems with Embedded Projector

Some portable devices, such as cell phones, tablet computers and notebook computers, have embedded pico-projectors installed. That is, the host computer and the 2D projector are already in the same system. For these types of product, in order to extend the functionality into V3D gaming/display, a cost-effective way is to design these kind of devices with a modularized product extension capability.

Figure 30:
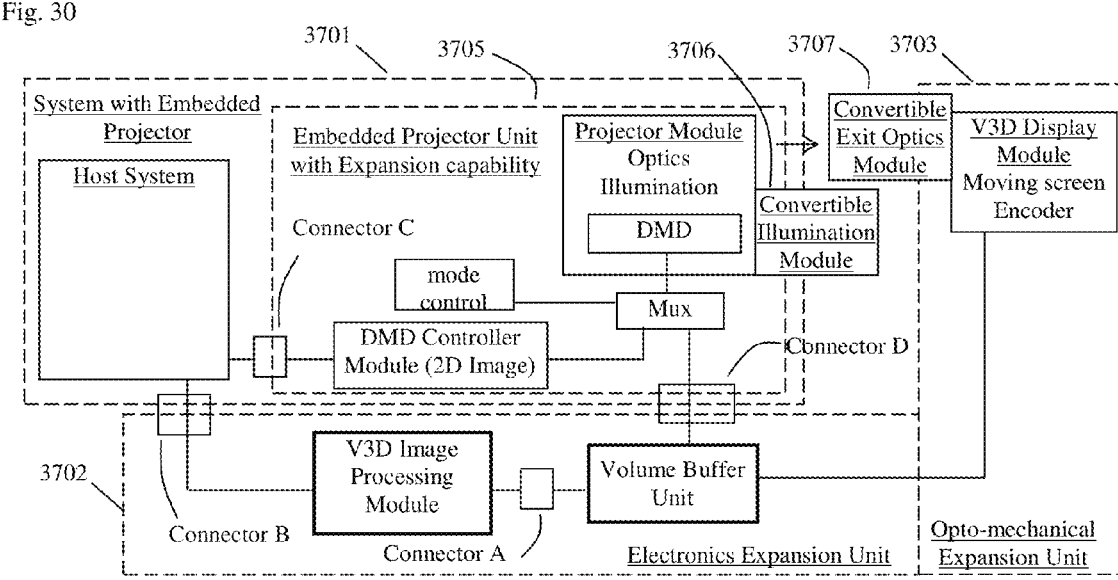
FIG. 30: Electronics block diagram of a system with embedded projector having a modularized product extension capability.

FIG. 30: Electronics block diagram of a system with embedded projector having a modularized product extension capability System 3701 is the device with embedded 2D projector. The embedded projector unit 3705 (using a DMD (DLP)-based projector as example) is basically similar to any 2D DLP projector, except for a convertible illuminations module 3706, which has the capability of converting the configuration of illumination optics between sub-panel illumination and 2D full-panel illumination. Details of such illumination conversion are described in Tsao U.S. application Ser. No. 13/271, 701 (US14). Alternatively, according to Tab. 1 case 1, the projector can also use regular illumination (i.e. full-panel illumination) for V3D projection, that is, omitting module 3706.

To extend the system's capability to V3D display, an Electronics Expansion Unit (EEU) 3702 and an Opto-Mechanical Expansion Unit (OMEU) 3703 are added to the system 3701. The EEU includes the electronics required for processing and storing V3D image data. The OMEU includes the moving screen unit and a Convertible Exit Optics Module 3707, which converts exit optics between 2D and V3D projection modes.

Figure 28:
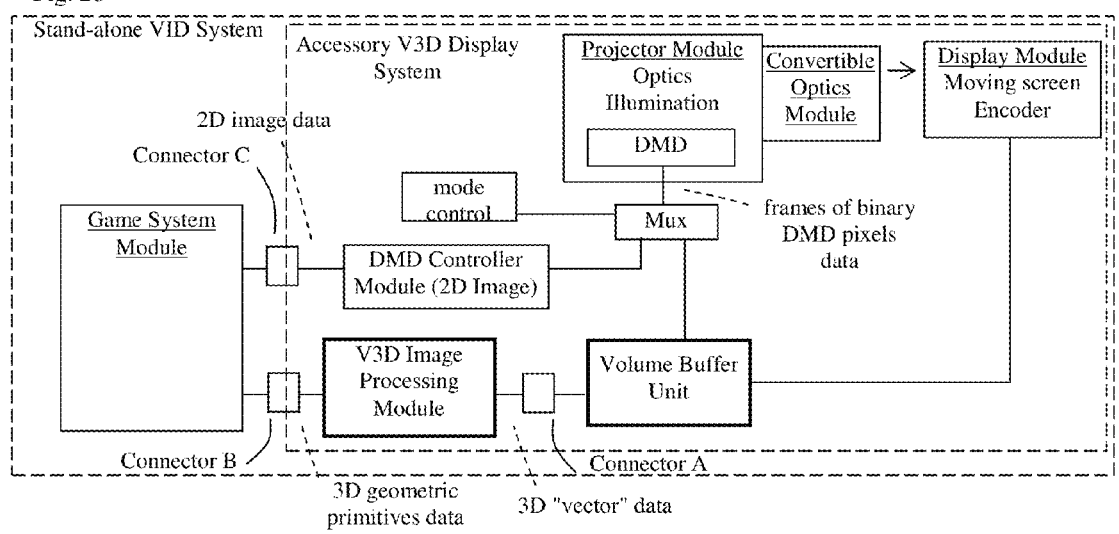
FIG. 28 illustrates a block diagram showing a simplified modular configuration of the V3D Display system.

The block diagram of FIG. 30 as a whole is basically the same as the block diagram of FIG. 28. But in FIG. 30, the EEU and the OMEU are modularized. These modules can be made as extension products. Customers interested only in 2D projection can purchase only the original system 3701 without paying for extra V3D functionality. If customers decide to expand their devices into V3D gaming and display, they can purchase the EEU and the OMEU as add-ons.

Figure 31:
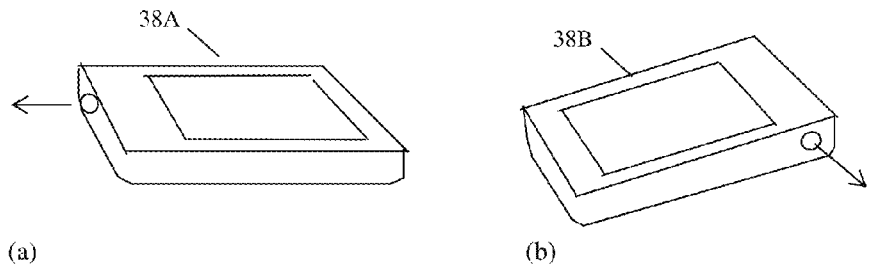
FIG. 31: Typical device configuration with an embedded micro- or pico-projector.
Figure 32:
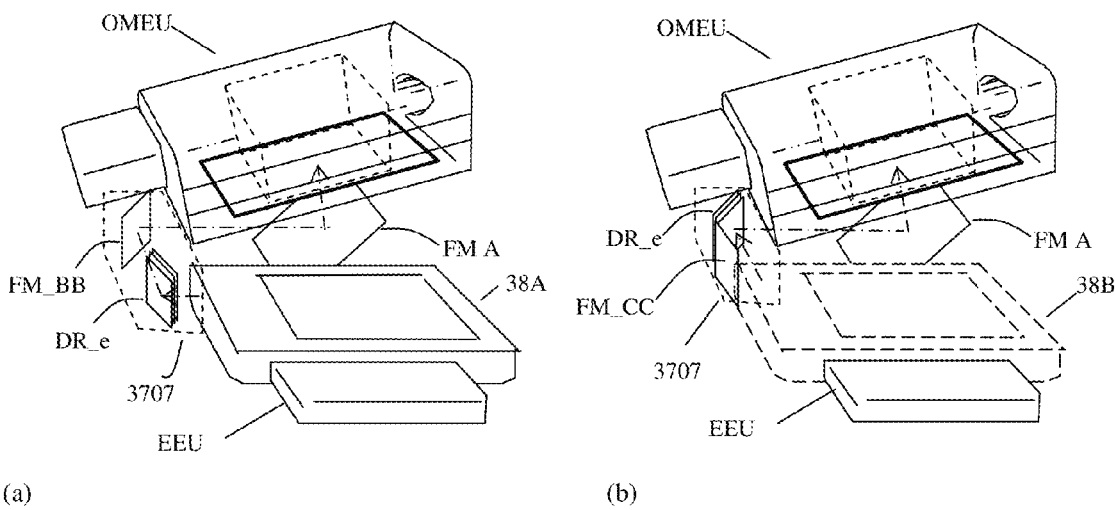
FIG. 32 illustrates examples of V3D display system as a product extension to a portable device with embedded projector.
Figure 32:
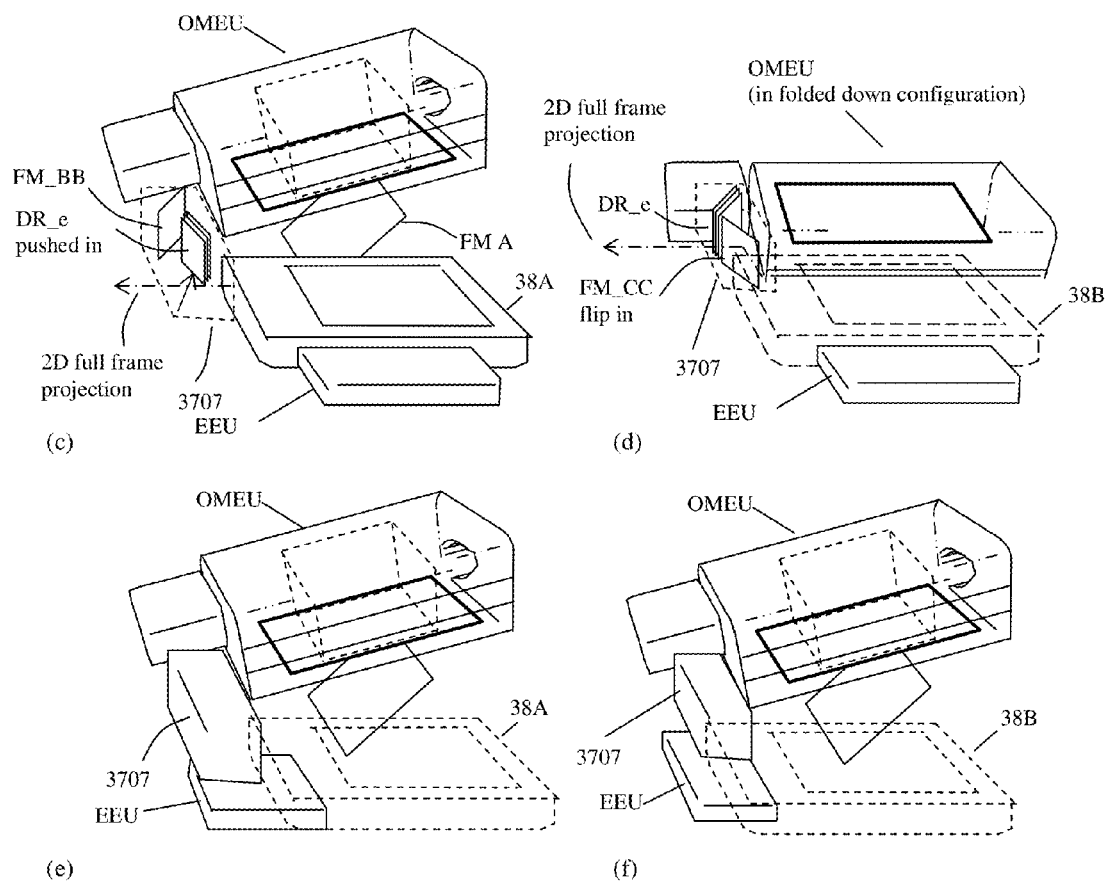

FIG. 32 illustrates examples on how the EEU and the OMEU can be added to the original system. In general, a portable device with an embedded projector places the projection output in two basic orientations: projection along a direction parallel to the length of the device (FIG. 31 (*a*)), or along a direction parallel to the width of the device (FIG. 31(*b*)). In both cases, it is convenient to place the projection lens close to a corner.

FIG. 32 (*a*): V3D product extension corresponding to original system of FIG. 31 (*a*). The Convertible Exit Optics Module 3707 includes a set of dichroic reflectors (DR_e) and a reflector FM_BB. The OMEU is attached to the original system 38A via a bracket or a frame (not shown). The EEU is inserted into an extension connector at the side of the original system.

FIG. 32 (*c*): The system of FIG. 32 (*a*) in 2D projection mode. The DR_e is pushed away to allow projection beam to come out of the system.

FIG. 32 (*b*): V3D product extension corresponding to original system of FIG. 31 (*b*). The Convertible Exit Optics Module 3707 basically uses only a set of dichroic reflectors (DR_e). A reflector FM_CC is pushed aside.

FIG. 32 (*d*): The system of FIG. 32 (*b*) in 2D projection mode. FM_CC is rotated into position to reflect projection beam out of the system. Further, the OMEU (i.e. the V3D moving screen display) is shown in folded down configuration in FIG. 32(*d*).

The EEU can also be mechanically attached to the OMEU so that the product extension becomes a single integral unit. FIG. 32 (*e*) illustrates such an arrangement for original system of FIG. 31 (*a*), FIG. 39 (*f*) for original system of FIG. 31 (*b*).

Besides build-in embedded projector, certain kind of systems (such as some cell-phones) use a detachable projector module. The product extension design described above also applies to such systems. The product extension design described above also applies to an original system that is just a 2D Projector. In such case, an external host system is needed in order to play interactive V3D games.

4. Compact Desktop Systems

In principle, driving a rotary reciprocating screen by two aims from one side, as illustrated in Part 1 FIG. 15*a*, can be used even when larger display volume is required. However, the increase of screen support weight can make vibration more significant. Increased weight also increases the need of larger counter weight mass, resulting in larger machine size and weight. Driving with rotary arms on both sides (e.g. 2 arms per side) allows a symmetrical design that can reduce vibration and counter weight need.

This invention resolves the issue of jumping/noise at mid-crossing by devising mechanisms and designs of the following features:

(1) Balanced screen and support structure that eliminates undesirable torque effect (2) Mechanical relief mechanisms that accommodate possible variation of center distance caused by inevitable dimensional or assembly error.

(3) Associated with (1) and (2), an integral balance and mechanical relief design of the screen and support structure.

(4) A moving screen mechanism that requires no long moving shafts, thereby providing more usable space under the screen, enabling the design of compact display systems.

(5) Synchronization mechanisms on both sides and driving at both sides.

The result is a compact, smooth and quiet moving screen system.

In addition, under the background of the aforementioned feature, designs of conversion means for multiple operation modes are described.

4.1 Desktop System Mechanisms

Figure 33:
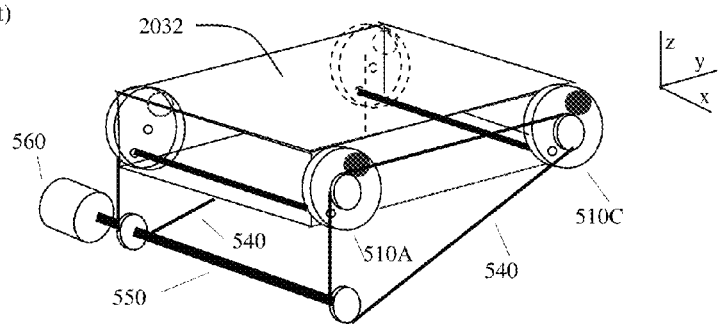
FIG. 33 illustrates an example setup for driving a rotary reciprocating mechanism at both sides.

First of all, it is preferred that the rotary reciprocating screen mechanism is driven at both sides. FIG. 33 illustrates an example setup. A motor 560 drives a common driving shaft 550, which in turn drives rotary arms (510A etc.) on both sides through timing belt 540. This driving mechanism also maintains the synchronization of motion of both sides.

Figure 34:
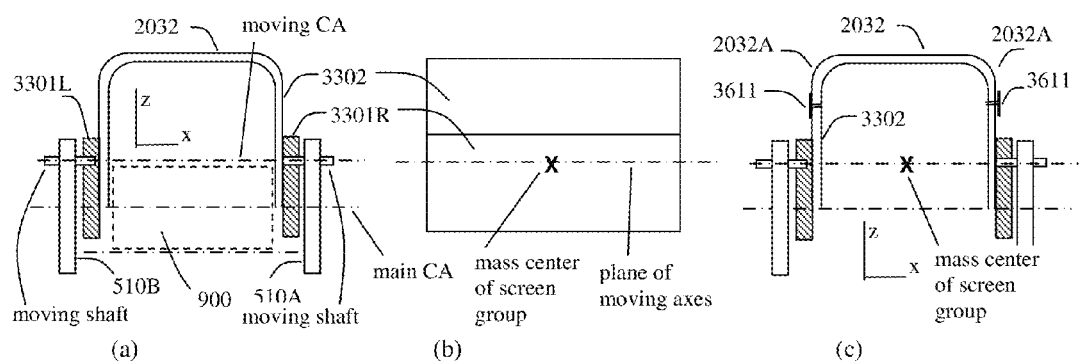
FIG. 34 illustrates a screen group configuration with the screen surface elevated above the plane of moving center axes (CA). It also has short moving axes and properly placed mass center.
Figure 35:
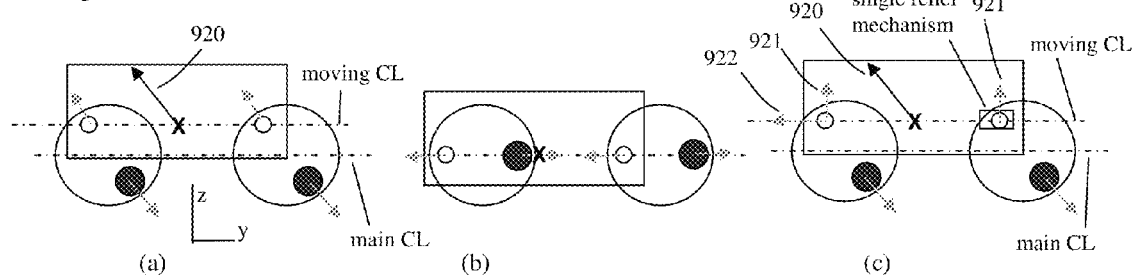
FIG. 35 illustrates problems of dynamic unbalance in the prior arts.

FIG. 34 (*a*) and (*b*):

It is also preferred that the screen surface is elevated above the plane of moving center axes (moving CA, which is the axis connecting the corresponding moving shafts one both sides), so that the display volume is not blocked by rotary arms. In this case, the screen group (including screen 2032, support frame 3302 and balancing structure 3301R and 3301L) itself should be balanced so that its mass center stays on the plane of moving center axes. This way, the undesirable torque effect of Iwahara's system can be eliminated, as shown in FIG. 35(*a*) and (*b*), force diagrams.

After the screen group is self-balanced, there are two preferred approaches to resolve the aforementioned "mid-crossing jumping" issue.

Approach 1: Parallel Cranks, Cross Compound mechanism (PCCC) on both sides

In this approach, both sides of the moving screen have a mechanism similar to FIG. 15*a*. A PCCC mechanism prevents positions of moving parts (cranks, or arms, and connecting rod) become indefinite at mid-crossing.

This approach can be effective but takes space on both sides. This approach also requires a tight dimensional tolerance in order to match the center distance between the moving shafts and between the main axes.

In order to reduce cost, larger dimensional tolerance is desired. In this case, a center distance relief mechanism can be used to allow slight variation of the center distance between the moving shafts during the rotation of the mechanism. In fact, tests show that, with such a center distance relief mechanism, using timing belts and gears only is enough to maintain the synchronization of rotary arms. This leads to Approach 2.

Approach 2: Using a Center Distance Relief Mechanism

First, when the rotary arms are synchronized with timing belts and gears only, a single relief mechanism (such as a slot or a linear bearing) on one end of the screen group, as illustrated in FIG. 35 (*c*), does not work well. (FIG. 35 (*c*) illustrates only two arms on one side. The other side has the same structure.) The reason is also illustrated in FIG. 35(*c*) by arrows showing force diagram. The centrifugal force 920 generated by the rotation of the screen group exerts forces on the moving shafts at the rotary arms. In the vertical direction, the forces can be spread evenly (921). But in the horizontal direction, the arm without the relief bearing must take all force (i.e. 922), because the single relief bearing does not take any force in the horizontal direction. Therefore, the force and the resulted torque on the two arms are different, resulting in non-smooth rotation.

Figure 36:
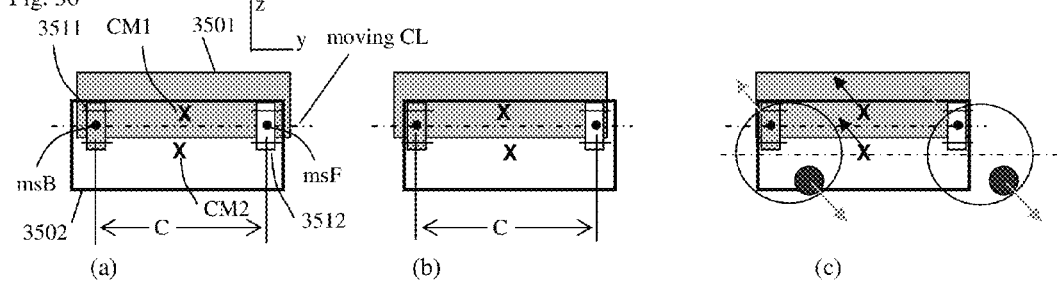
FIG. 36 illustrates the basic concept of "parallel relief and balancing" mechanism in this invention.

FIG. 36 (*a*), (*b*) and (*c*)

The solution is to make the screen group into two separate parts of equal mass (3501 (the gray part), 3502 (the white part)) and make the two parts slightly movable relative to each other by connecting the two parts with bearings allowing linear motion (3511, 3512). In addition, the back moving shaft (msB) is mounted (fixed or via a bearing) to the gray part

3501, and the front moving shaft (msF) is mounted (fixed or via a bearing) to the gray part 3502. As a result, as illustrated in (a), when part 3501 is moved lightly to the right of part 3502, center distance C is reduced. In (b), part 3501 is moved lightly to the left of part 3502, resulting in a larger center distance C. The mass center of the two parts (CM1, CM2) is positioned such that the combined mass center is still on the plane of moving axes. Because the front moving shaft and the back moving shaft are separately mounted to two different parts of the screen group of equal mass, the resulted centrifugal forces exerted on the two moving shafts (or on the two rotary arms) are equal, and the resulted torque are also roughly equal. This is shown in FIG. 36 (*c*). This makes the rotation smooth and quiet. For convenience, this mechanism for rotary reciprocating screen is called "parallel relief and balancing mechanism".

Two example implementations of the parallel relief and balancing mechanism design concept of FIG. 36 are described below.

Figure 37:
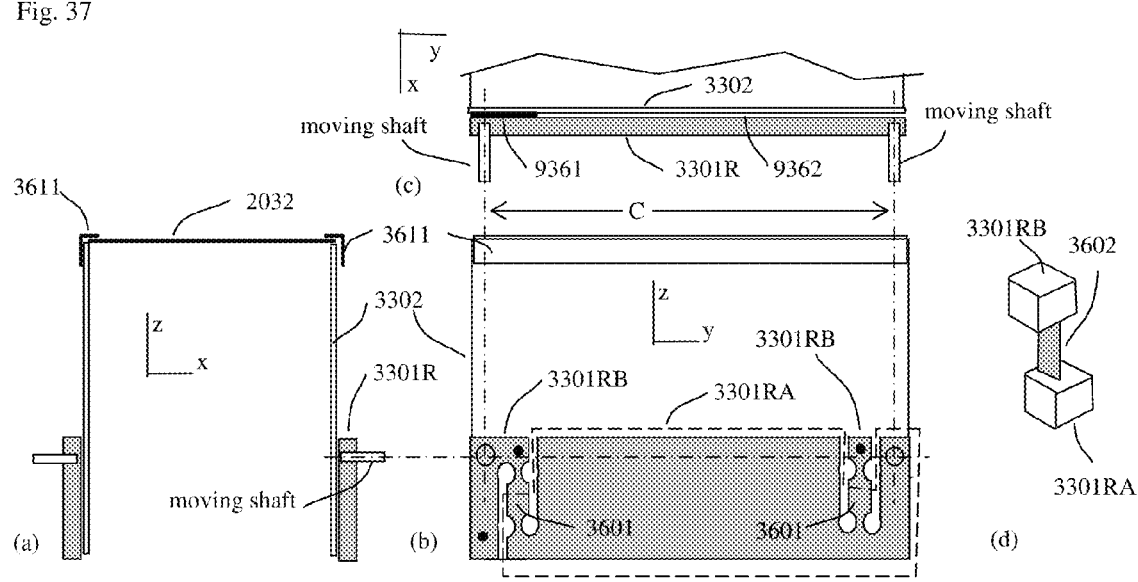
FIG. 37 illustrates the 1st example implementation of the concept of FIG. 36.

FIG. 37 (Example 1)

This design has an elevated screen similar to that of FIG. 34. Looking at the right side only, the balancing structure 3301 R includes a pair of flexural bearing 3601. In kinematics, the balancing structure has two portions. Portion A (3301 RA) (surrounded by dash lines) includes most of the volume and weight of the structure 3301R. Portion B (3301RB) is the rest of the structure 3301R. Portion B is fixed to screen support frame 3302. Portion B, support frame 3302 and the screen form the first part of the two parts of equal mass of the screen group. Portion A is the second part of the two parts of equal mass of the screen group. By using a shim 9361 between portion B and frame 3302, a thin gap 9362 is created between balancing structure 3301R and frame 3302. As a result, the whole structure allows a small relative translation between portion A and portion B, thus also between the first part of the screen group and the 2nd part of the screen group, by the function of the flexural bearings.

The flexural bearing can be of build-in type, as shown in FIG. 34(*b*). The whole balancing structure with the flexural bearing can be made of aluminum or engineering plastics. Alternatively, the flexural bearing can be made from separate leaf spring 3602, as shown in FIG. 34(*d*). Rubber spring is another possibility. In all cases, the variation of center distance C is kept small within the limit of elastic range.

Figure 38:
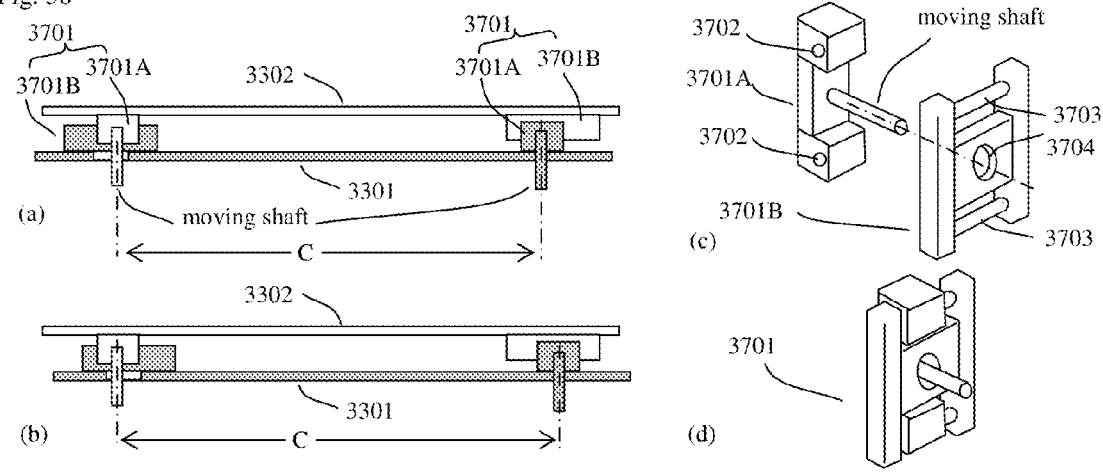
FIG. 38, FIG. 39 and FIG. 40 illustrate the 2nd example implementation of the concept of FIG. 36.

FIG. 38, 39, 40 (Example 2)

This design uses a set of linear bearing units 3701 between the balancing structure 3301 and the screen support frame 3302 to allow for relative displacement between the two parts. In (a), when structure 3301 is moved lightly to the left of frame 3302, center distance C is reduced. In (b), structure 3301 is moved lightly to the right of frame 3302, resulting in a larger center distance C.

FIG. 38 (*c*) illustrates an exploded view of the linear bearing unit. The unit has two parts (3701A and 3701B), which can be mounted onto two different parts of the screen group respectively. When assembled, linear bearings 3702 ride on rods 3703. FIG. 38 (*d*) illustrates the assembled bearing unit. The moving shaft is mounted to part B (3701B). Part A (3701A) has an opening 3704 to allow for displacement of the moving shaft.

Figure 39:
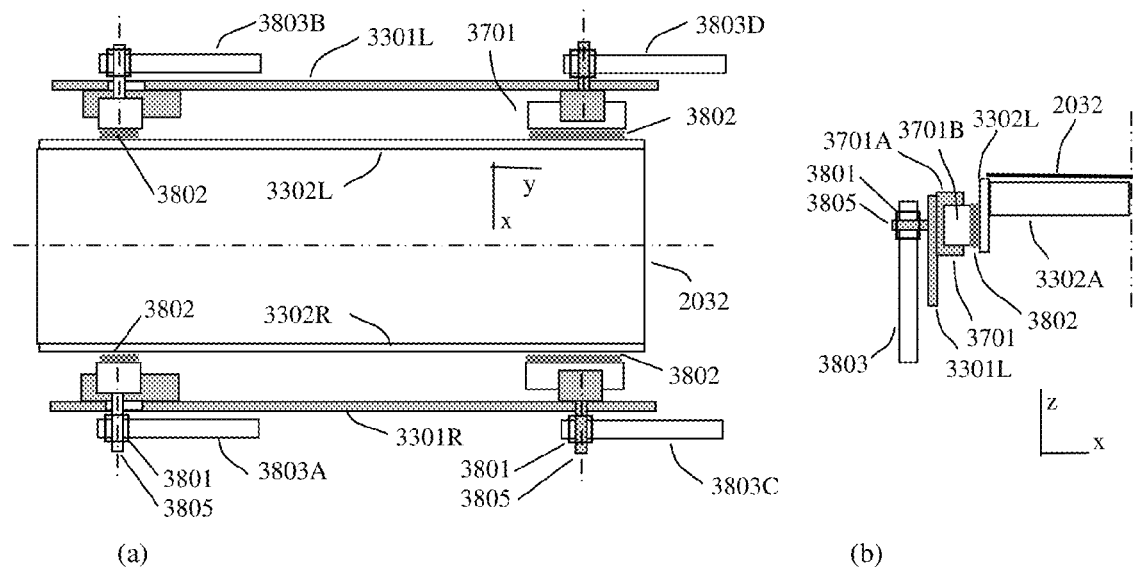

FIG. 39 (*a*) illustrates the top view of the screen group assembled to the rotary arms (3803A-D). FIG. 39 (*a*) illustrates (half of) the end view (symmetric). The screen group includes two separate parts of equal mass: the gray part and the white part. The white part includes screen 2032, screen support 3302A, and screen support frames 3302L and 3302R. The white part also includes part of the linear bearing units 3701 (37-1A or 3701B, depending on position). The gray part includes balancing structure 3301L and 3301R and part of the linear bearing units. In rotation, the white part exerts force to arms 3803A and 3803B, while the gray part exerts forces to arms 3803C and 3803D.

Although the driving mechanism of FIG. 33 drives both sides together and maintains synchronization between the two sides, in practice, deviation away from synchronization between the two sides is inevitable, because of mechanical tolerance from assembly and from gears and belts themselves. Therefore, a flexural structure is preferred between the two sides to accommodate this deviation from perfect synchronization. In FIG. 39, this is achieved by mounting the linear bearing units 3701 to the screen unit (including screen 2032, support 3302A and frames 3302L, 3302R) via a flexural cushion 3802, such as rubber cushions. Similarly, in FIG. 37 (Example 1), screen 2032 is mounted to screen support frame 3302 by a flexural tape 3611, which can be a rubber-like or plastic tape with glue or other mounting means. The key point is that the screen to the support frame assembly is not as a rigid body but as a flexural assembly to allow deviation from perfect synchronization between the left side and the right side, within tolerances of parts and assembly. FIG. 34 (*c*) shows a slightly different screen and support frame design (end view). The screen (with backing material) has a curved shape 2032A on the left and right edge, which increases stiffness of the screen/backing and reduces deformation during rotation. In this case, the flexural tape 3611 is attached at vertical edge of this curved backing and joins support frame 3302.

It is desirable to use a short, separate moving shaft on each rotary arm, instead of a long moving shaft connecting corresponding arms on different sides. This way, as shown in FIG. 34 (*a*), the space 900 enclosed by the track of the moving center axis (moving CA) becomes usable for projector unit and other components to be placed under the screen. Similar design is shown in FIG. 37 (*a*).

In FIG. 39, short moving shafts 3805 ride on bearings 3801 that are mounted to the rotary arms. Ball bearings or sleeve bearings can be used.

Figure 40:
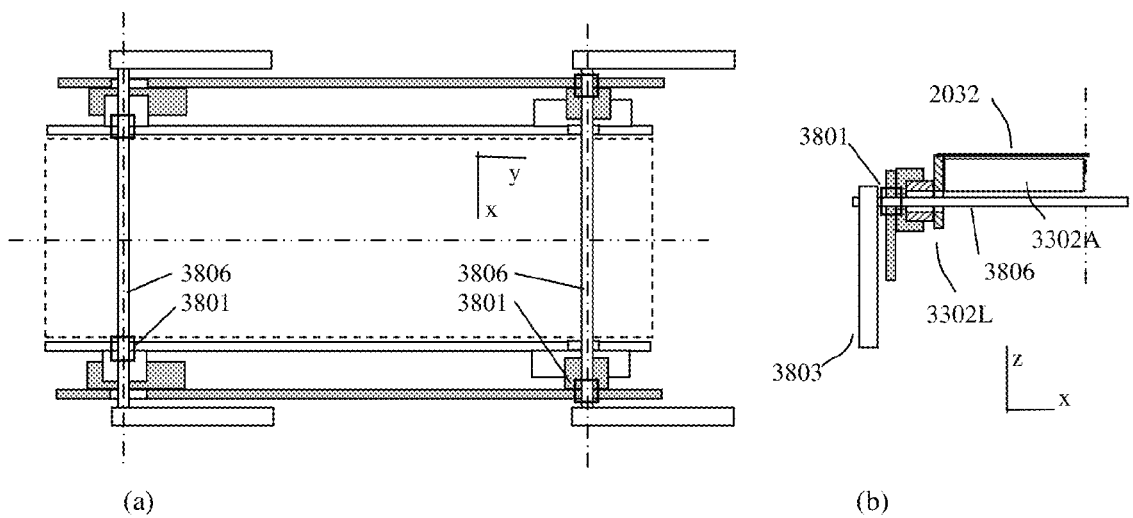

When the screen is not elevated above the plane of moving axes too much, then long moving shafts connecting corresponding arms on different sides can be used. This is shown in FIG. 40. In this case, the bearings 3801 are mounted to the screen group, instead of the rotary arms. The long moving shafts 3806 are fixed to the corresponding arms on different sides. In rotation, the screen group with the bearings rides on the two long moving shafts.

Section 1 described a "category (3b) balancing" useful in cases of driving the screen at one side. It should be noted that, although not necessary, this "category (3b) balancing" can be helpful in cases of 2-side driving. By balancing torques in the direction of bending the main axes, "category (3b) balancing" reduces internal stresses within the whole rotary-reciprocating screen mechanism. As a result, the mechanism and machine frames can be made of lighter and thinner parts, resulting in reduced total weight and material cost 4.2 Mode Adjustment Mechanisms FIG. 41 (*a*) illustrates a layout of subsystems in a compact desktop system. The screen group is similar to the design shown in FIG. 37 or FIG. 34. Therefore, the projector unit 2010 can be placed under the screen. Images are projected by the projection lens 305 through an exit optics unit 3109, folding mirror FM B, and folding mirror FM A onto the screen. Because the screen is elevated, the support frames (3302) and balancing structures (3301R, 3301L) are on both sides of the projector units during rotation. So the projection path is folded mainly parallel to y-z plane. Also, any manual adjustment, such as projection lens focus or operation mode switching, should be accessed from y+ (or y−) direction.

Changing operation mode includes adjusting exit optics configuration.

Figure 41:
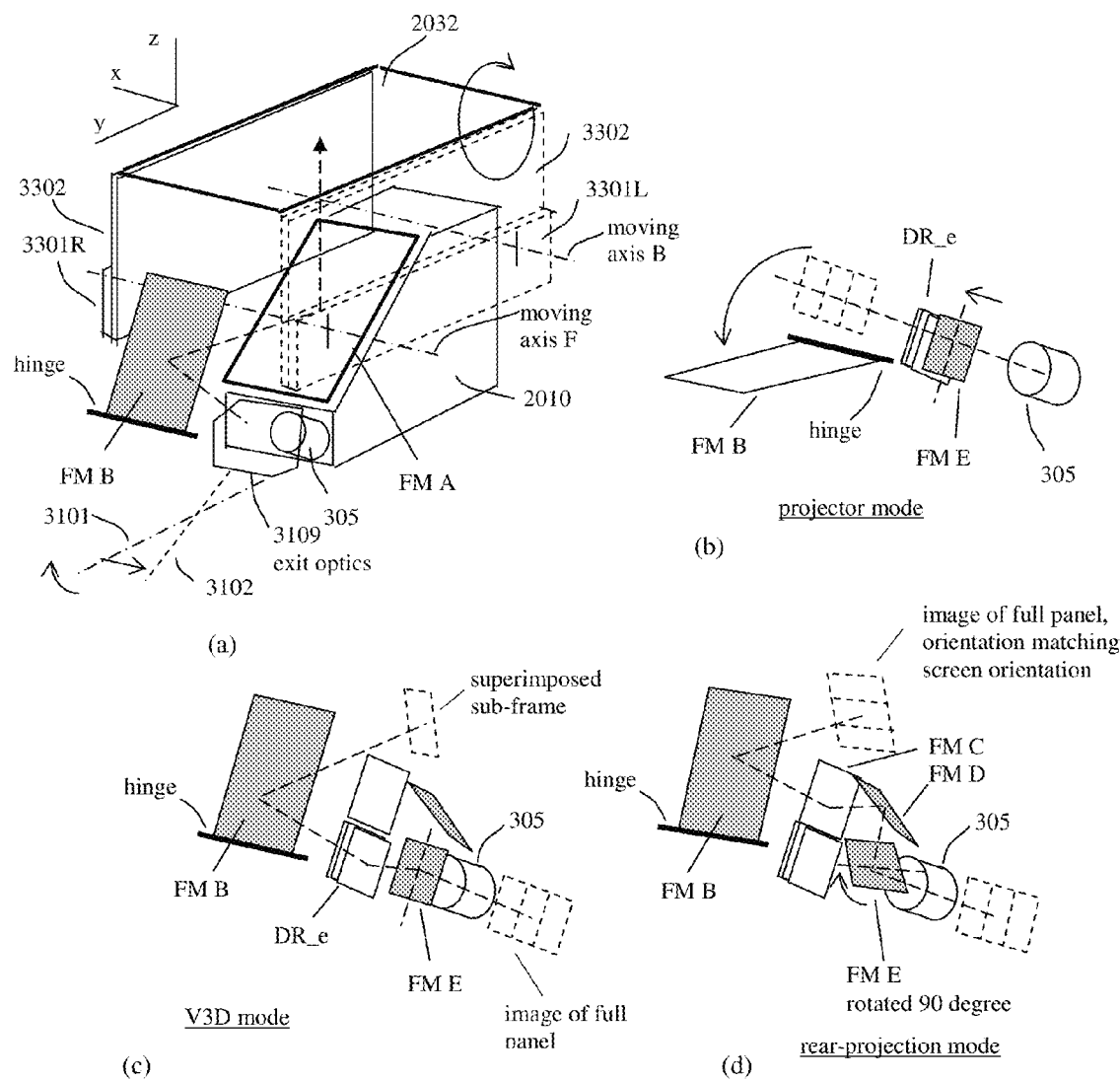
FIG. 41 illustrates a layout of subsystems in a compact desktop V3D display system with multiple display modes and its conversions to different modes in this invention.

FIG. 41 (c) illustrates a configuration of the exit optics unit in V3D mode. Mirror FM E reflects the projection beam to a set of dichroic reflectors (DR_e). So the sub-panel images frames are superimposed at an orientation matching the orientation of the screen.

FIG. 41 (d) illustrates a configuration of the exit optics unit in rear-projection mode (full-panel projection). This is rotating FM E by 90 degree, so that the projection beam is guided to FM B via reflectors FM D and FM C. This keeps the projected image as full-panel and rotated the orientation by 90 degree, matching the orientation of the screen. A rotary mechanism rotary about axis 3101, which can be accessed from y+ direction, can be applied to execute this rotation. A similar mechanism can be used to adjust projection lens focus.

FIG. 41 (b) illustrates a configuration of the exit optics unit in front-projection mode (full-panel projection). This includes pushing FM E to the side and flip FM B down, so that the projection beam can exit the whole system directly. FM B is on a hinge so that its angle can be adjusted as needed. To push FM E aside, a lever mechanism can be applied to reorient (rotate) axis 3101 into direction 3102 and thereby pushing the FM E to x+ direction.

4.3 Product Concept

The "product extension" concept and modularized design described in Sec. 3 can be applied here to the desktop system, assuming the original system (base system) as a 2D projector without a build-in host system.

Figure 42:
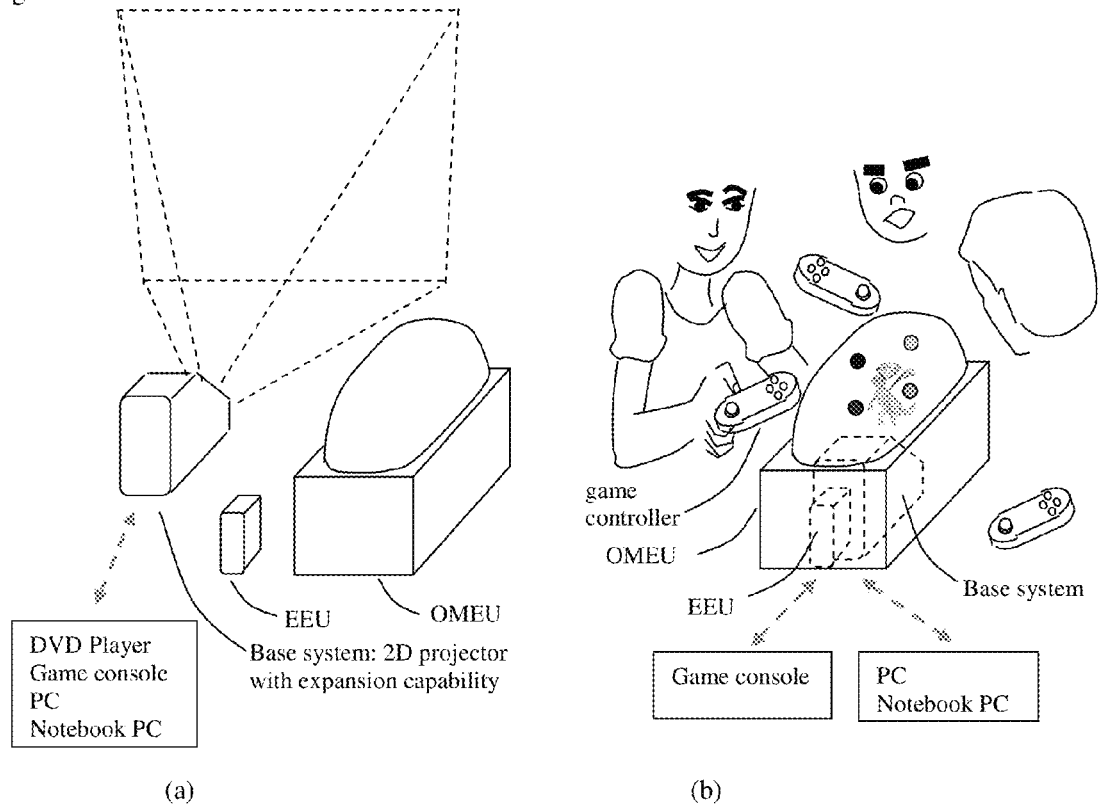
FIG. 42 illustrates the concept of a desktop "extendable" projector system with multiple operation/display modes in this invention

FIG. 42 (a): Customers can purchase a projector (base system) for multimedia or home theater applications, without paying for extra V3D functions. If customer decide to play V3D games, they can then purchase product extensions, the EEU and the OMEU (and game controllers), which turn the base system into a multiple mode projection system (FIG. 42 (b)). Such a system can use a game console or a PC (or other computing system) as the host system to play V3D games.

4.4 Large Screen Backing Structure

In FIG. 34 and FIG. 37, the screen 2302 relies mainly on the stiffness of the sheet material to keep its shape when under load in motion. For screen of larger sizes, if the thickness of the sheet is kept same, then load due to inertia of the sheet itself can deform the sheet significantly. However, increasing sheet thickness increases mass significantly, which is undesirable.

For screen of larger sizes, a thin transparent plastic sheet with a preformed shape can be used as support structure underneath the screen film. The basic idea is to use the preformed shape to provide structure strength without using thick material, and at the same time the transparency and the shape pose minimal distortion to the projection beam. The transparent support structure can take a wave shape to provide multiple support lines without significant effect on projected image.

Figure 43:
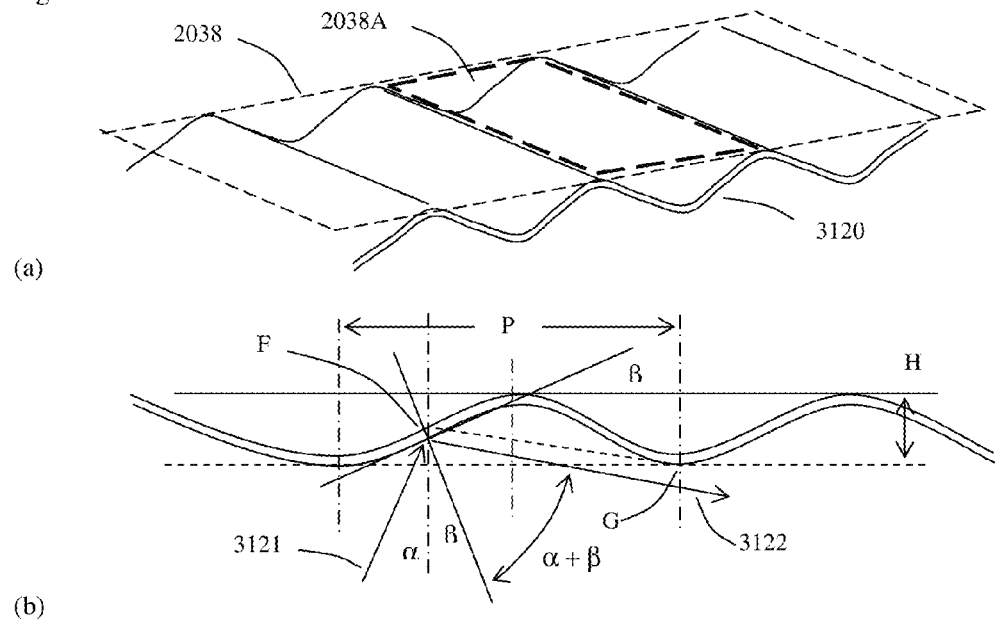
FIG. 43 illustrates a wave shape screen backing structure in this invention.

FIG. 43(a) illustrates a wave shape structure 3120 made of transparent thin plastic sheet used to support a thin screen film 2038. Every individual area, such as 2038A, supported by two adjacent ridges (peaks of wave) and rims at sides (not shown), has a small size with acceptable screen film deformation when in rotation. The whole screen film 2038 is of a large size.

FIG. 43(b): details of pitch (P) to height (H) ratio design for best optical property The issue: When rays of projection beam hit the wave structure, part of it will be reflected. If the rays reflected by one wave curve reach an adjacent wave curve and pass through it, ghost images could form on wrong locations on the screen film.

The solutions: Anti-reflection coating at the under side of the wave structure can be helpful. Alternatively, the pitch to height ratio of the wave structure can be designed, according to angle of projection beam, to prevent any reflection from hitting the wave structure.

In the drawing, 3121 is the outmost ray of the projection beam (i.e. the ray having the largest angle w.r.t. the vertical) (assuming projection is toward z-direction). In general, increasing P/H ratio can make reflected ray 3122 away from the valley (point G) of the adjacent wave. The reflected ray 3122 has an angle closest to horizon when ray 3121 hits the inflection point (F) of the wave curve. With a given angle a, setting a P/H ratio determines angle β, which determines the angle of ray 3122. By setting a safety distance between ray 3122 and point G, no reflection will hit adjacent wave curve.

5. Active Screen Slim System

Active Screen volumetric 3D display is described in details in Tsao U.S. Pat. No. 8,022,895. New details and improvements are described in the following aspects.

5.1 Active Screen Support and Mechanisms for Synchronization and Driving

Although descriptions in previous sections mainly involve projection-based volumetric 3D display, many features can be applied to Active Screen volumetric 3D display. For example, the mechanism for driving the screen can also be applied to drive an Active Screen, such as a light-weight OLED panel. The foldable design and the contractible covers (including locking and safety features) are also applicable. In the product concepts, except the front-projection mode, all other modes are also applicable to an Active Screen V3D display.

U.S. application Ser. No. 13/271,701 (US14) describes optional use of touch pad for interaction with images and position changing parallax barrier panel for as 3D display. These also apply to Active Screen V3D display.

Important: All the balancing and mechanical relief (center distance) techniques and mechanisms described in previous sections apply to active screen volumetric display as well. Mechanisms and methods for placing and mounting the moving screen also apply to Active Screen. In general, all techniques involving "screen" described previously (except techniques related to image projection) apply to "Active Screen" too.

Specifically, an Active Screen may use an emissive display panel, such as an OLED panel, which has a mass larger than a thin film of passive screen or a thin plastic support used in a projection-based V3D display. Preferably, the active display panel should be well supported to minimize stress caused by rotary reciprocating motion.

FIG. 44 illustrates an embodiment of supporting frame for the Active Screen. 4137 is a backing structure similar to 2037 of FIG. 6, except that under the top surface of the shallow shoebox cover is an integrated truss structure (framework) of I beams 4138. Therefore, the backing structure can have minimal deformation in all directions in rotary reciprocating motion. The Active Screen is attached to the backing structure, using flexure foam tape or compliant glue, which builds an additional layer of cushion.

It is preferred to support the Active Screen Unit (i.e. assembly of the Active Screen and its backing structure, including the connecting rods at 2 sides (4105L and 4105R) and bearing blocks (see below)) at both sides to minimize the effect of bending moment caused by supporting from only one side. This can be done by two driving configurations.

FIG. 45: Driving at one side, but using long moving shafts to support at two sides This configuration is similar to that of FIG. 15, except that long moving shafts (4106B and 4106F) are used to support the connecting rods (4105L, 4105R) at both L and R sides, via bearing blocks (4101A-D). By this configuration, all bending moments are transferred to the fixed joints between the main moving shafts and the rotary arms, while the Active Screen Unit itself is subjected to minimal bending. The balancing, especially category (3) balancing, can be done by the procedure mentioned in Sec. 1 and Sec. 2. The advantage of FIG. 45 configuration is that the L-side has minimal view-blocking components, just as in the case of FIG. 15.

Figure 46:
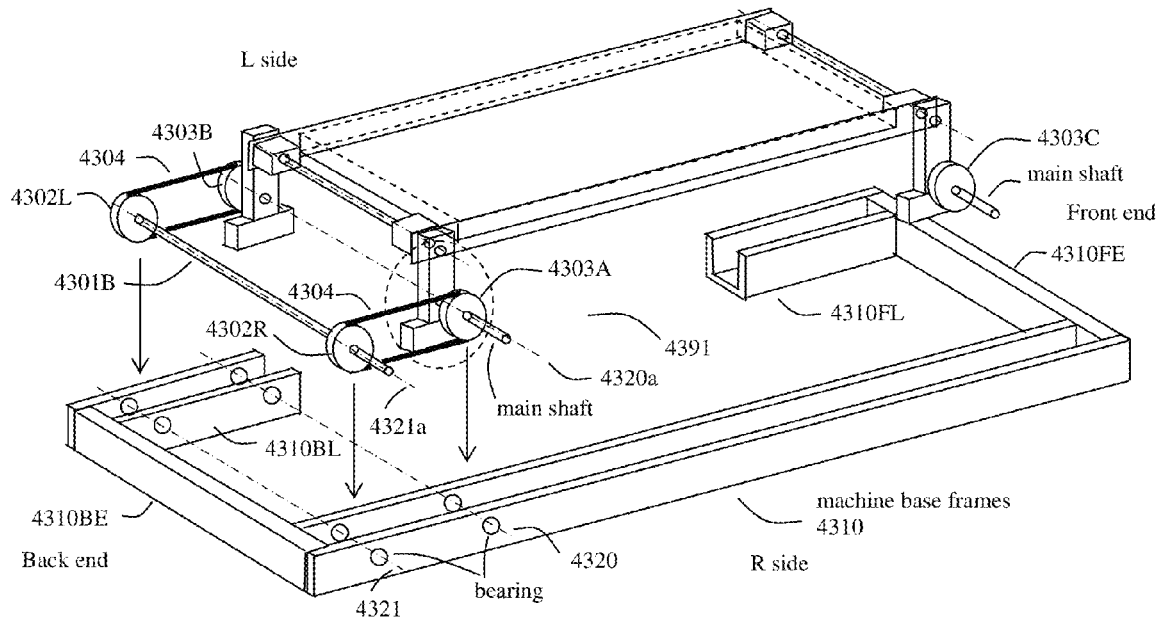
FIG. 46 illustrates the 2nd preferred driving configuration for the display surface group of FIG. 44: driving at two sides, but using a "C" shape machine frame to reduce view-blocking angle.

FIG. 46: Driving at both sides, using a system of synchronization belts and gears, in a "C shaped" machine base frame The challenges of driving at both sides in a slim configuration are to avoid view-blocking structures and to make synchronization mechanism slim as well. In these respects, the configuration of FIG. 3 works mainly for elevated screen. For non-elevated screen in a slim V3D display, the machine frames (shaft-gear-belt housing) at both sides can block part of the view. The synchronization mechanism (550, 540 etc.) of FIG. 33 works also mainly for desktop system with elevated screen, because timing belts on both sides of the machine will block part of the views if the screen is not elevated. Another issue is its overall size in z-direction.

FIG. 46 illustrates a preferred slim mechanism for driving a rotary reciprocating screen at both sides. For clarity, the moving parts are drawn separately above the machine base frame 4310. In addition, only details toward the back end are shown, because the mechanism toward the front end is basically the same. The right (R) side of the machine base frame 4310 is similar to the one shown in FIG. 15 (*a*). But, in addition, the structure extends to the left (L) side and forms a "C-shape", via beams 4310BE and 4310 FE. The opening space 4391 of the "C" is for the purpose of minimizing view-blocking structure on the left side. Therefore, L side frames 4310BL and 4310 FL are just long enough to house bearings for main shafts on axis 4320.

In order to avoid view-blocking components on the L side, using timing belt or "parallel crank cross compound" mechanism (e.g. FIG. 15(*a*)) for front-to-back synchronization is not desirable for a slim system. Therefore, L-R synchronization is maintained by a common shaft (4301B) with a set of timing gears (4302R, 4302L, 4303A, 4303B) and belts (4304). (The mechanism toward the front end is similar.) When the moving components are assembled onto the machine base frame, axis 4320*a* corresponds to axis 4320, and axis 4321*a* to axis 4321. That is, the common axis 4321 is on the same horizontal level as the axis 4320 of the main shafts. In this configuration, by further using small diameter gears, the overall size in the z-direction can be minimized. Besides timing belts, gear trains can also be used. In this way, L-R synchronization can be maintained. As for the synchronization between the front rotary arms and the back rotary arms, "parallel crank cross compound" mechanism on auxiliary arms can be used, as before (e.g. FIG. 15(*a*)), on the R side. Alternatively, one additional timing belt and two additional gears (one on front main shaft and one on back main shaft) can be used for the synchronization, on the R-side.

Driving: drive at one common shaft, such 4301B.

5.2 Data Interface

Tsao U.S. Pat. No. 8,022,895 describes a multiple slot light emitter/receiver data linking system for data transmission to and communication with the moving Active Screen. Such a system is difficult to use on a slim system because of the dividing light shields used.

Figure 48:
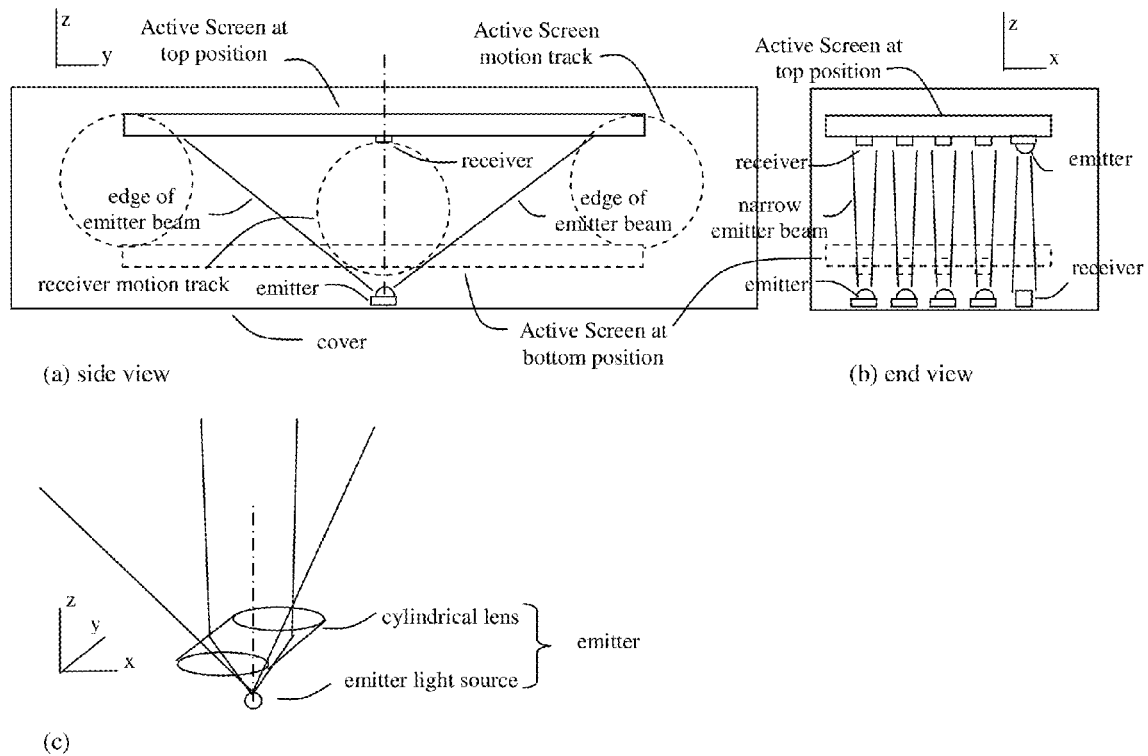
FIG. 48 illustrates a preferred multi-channel light emitter/receiver data linking system for a slim V3D display system of Active Screen.
Figure 49:
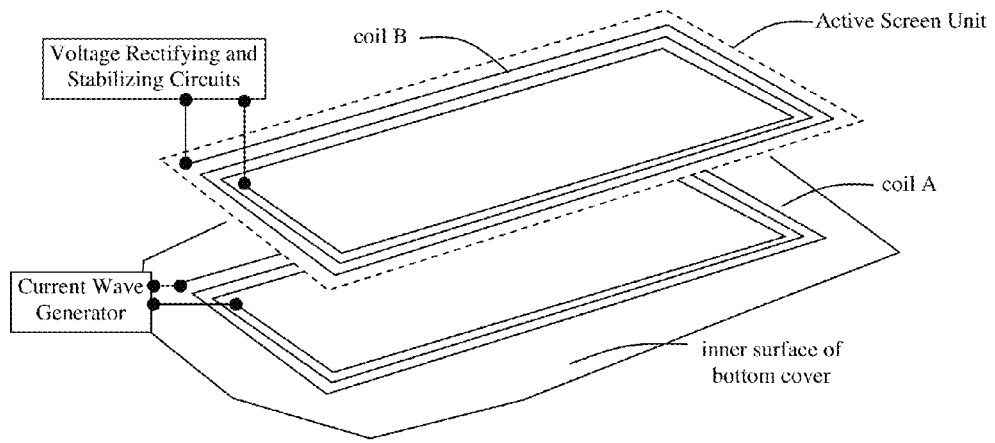
FIG. 49 illustrates a system of power transmission by mutual induction between a coil on the moving active screen and a stationary supply coil.

FIG. 48 illustrates a preferred multi-channel light emitter/receiver data linking system for a slim V3D display system of Active Screen. Because the slim system does not have space to allow for light shields, no such shield is used. Instead, in the x-direction, the light beam from the emitter is shaped into a narrow beam, by using a cylindrical lens. In the y-direction, a wide diverging angle is maintained. The stationary emitter (and receiver) array is placed along the x-direction on the inner surface of the bottom cover. The receiver (and emitter) array on the Active Screen is placed underneath the Active Screen support frame, also long the x-direction. This way, in the y-direction, emitter-receiver link can always be maintained, regardless of screen position (FIG. 48 (*a*)). In the x-direction, the narrow beams prevent cross-talk among different channels. For best result, the areas around the emitters/receivers on the bottom cover and underneath the Active Screen Unit should be covered with an anti-reflection or light absorbing material to prevent unnecessary reflection of emitter beams. In addition, the preferred emitter wavelength should be in the invisible range, such as infrared (IR) range.

5.3 Electronics and Placements

Figure 47:
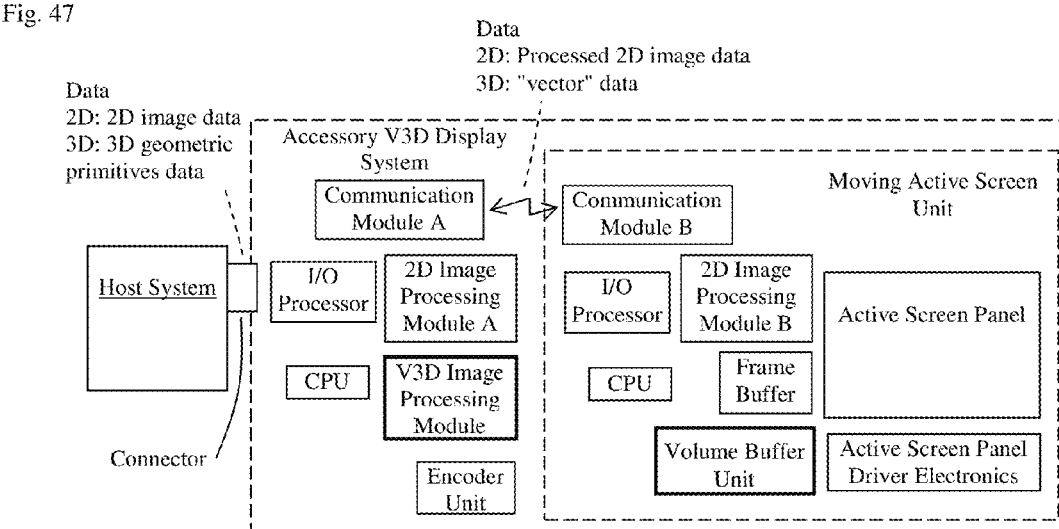
FIG. 47 illustrates a block diagram of the electronics of the Active Screen slim V3D display system.

FIG. 47 illustrates a block diagram of the electronics of the Active Screen slim V3D display system, in terms of major electronic modules. It is assumed that the system is to be used as a display accessory to a host system.

The Active Screen Panel Driver Electronics drives the Active Screen Panel. Tsao U.S. Pat. No. 8,022,895 describes a "shot by shot" "Vector Writing" method for fast data writing to the Active Screen Panel to create V3D images. It also describes general and some specific designs of driver electronics capable of operating by "shot by shot" method.

The Volume Buffer Unit includes memory for storing all "image shots" ("Vector" data) to be displayed in one rotation of the Active Screen (2 volumes, one down sweep and one up sweep). The Encoder Unit detects and tracks the position of the Active Screen. In response to signals generated by the Encoder Unit, data of "image shots" are read out in sequence and displayed one the Active Screen Panel.

It should be noted that the down sweep volume and the up sweep volume cover slightly different space in the combined display volume, when the Active Screen moves in rotary reciprocating motion. Therefore, the Volume Buffer Unit includes memory buffers for 2 volumes. In this case, when a V3D animation or motion sequence is to be displayed, successive volumes of images should be written alternately into the two volume buffers, in order to ensure the display of correct motion sequence.

The system also needs to be able to display 2D images (2D mode). In this 2D mode, the electronics and processing is basically similar to regular 2D display panel. For example, the 2D Image Processing Module (A and B) can include a CODEC LSI for image compression/decompression. A frame buffer stores one frame of 2D image. In 2D mode, the Active Screen Panel Driver Electronics works either in raster scanning fashion or in interlaced scanning fashion, instead of "Vector Writing". The control signals for addressing row and column electrodes of the Active Screen Panel are switched to raster (or interlaced).

The Communication Module can use IR (as described in section 5.2) or wireless signals or other signals. In V3D mode, once an initial image is loaded and displayed, only change of the image needs to be transmitted across the two Communication Modules. This minimizes data load on the Communication Modules.

Modules included in the "Moving Active Screen Unit" block are physically placed on the moving Active Screen Unit. In FIG. 45 (*a*) and (*c*), most of the modules is packaged into a pack 4201 and attached to the right side of the right connection rod. This location moves the mass center of the whole Active Screen Unit toward R side and helps balancing. The connection between the Active Screen and the pack is made by flexure ribbon or foil connection 4202.

5.4 Power Transmission

One way of power transmission to the moving Active Screen Unit is to apply the principle of mutual induction of coils. (Ref. Halliday and Resnick, Fundamentals of Physics, 2nd ed., pp. 602-603)

FIG. 49:

Coil A is on the inner surface of the bottom cover. Coil B is underneath the Active Screen Unit. Coil B does not need to be on the back of the Active Screen Panel. It can also be at the under side of the backing structure. The Current Wave Generator, drawing power from a battery or a power supply, creates a periodical wave of current through Coil A. By mutual induction, a time-varying voltage is generated between the two terminals of Coil B. A circuitry (which should rotate with the Active Screen) can be used to rectify and stabilize the voltage into a DC voltage, which can be used to power the Active Screen panel and the electronics that rotate with the panel. This transmission system works in 2D mode or in V3D mode.

By using such a power transmission system, there is no need of direct electric contact between the moving Active Screen and the stationary components.

6. Encoder Unit

Figure 61:
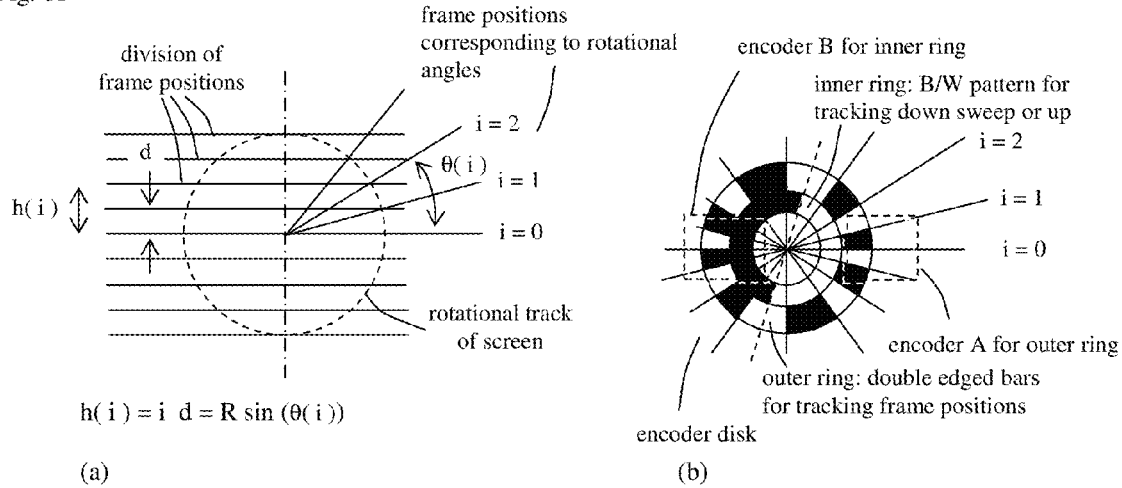
FIG. 61 illustrates the principle and design of the Encoder Unit used for tracking screen's vertical position by using a rotational encoder disk.

FIG. 61 illustrates the principle and design of the Encoder Unit used for tracking screen's vertical position by using a rotational encoder disk. FIG. 61 (*a*) analyzes the geometry and graphically shows the relation between the vertical position (h(i)) and rotational position (θ(i)), which is used to determine the positions of bars on the encoder disk.

FIG. 61 (*b*) illustrates the encoder disk. The encoder disk has an outer ring and an inner ring, each tracked by a separate encoder chip. Tracking the inner ring determines if the screen is in up sweep or in down sweep. Tracking the outer ring tracks screen's vertical position (i.e. frame index). The bars in the outer ring are double-edged bars. That is, either a black-to-white transition or a white-to-black transition will advance a frame position. An edge detector circuitry can be used to detect such transition from the signal obtained by the encoder sensor. This way, the encoder bars can be printed with dense pitch, thereby reducing the whole size of the encoder disk, which is useful for slim V3D display systems.

The Encoder Unit can be applied to slim V3D display or desktop V3D display, projection based or Active Screen based.

7. Image Presentation Techniques 7.1 Occlusion

In general, V3D images appear "transparent" due to the image formation method. However, because of accommodation and convergence of human vision, this transparency does not really confuse viewer's understanding of spatial information. The extent of this "transparency" depends on relative brightness of different parts of an image. Software can set proper color and brightness of different parts of a scene in advance or adjusted them according to situation during game play to minimize any possible confusion.

Figure 50:
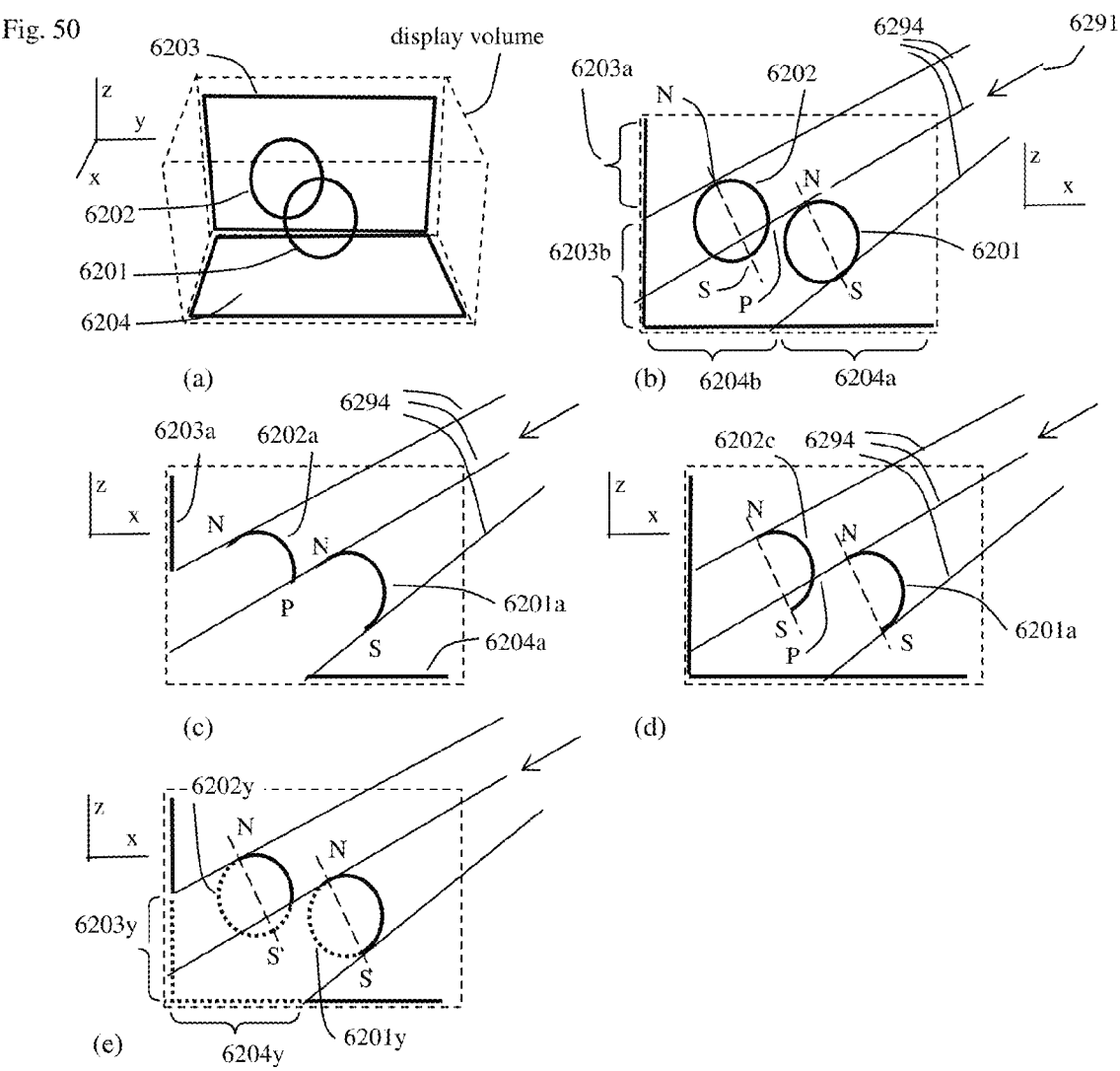

The removal (or suppression) of occluded voxels can be handled by 3 types of removal/suppression schemes. These can be explained using the example shown in FIG. 50 (*a*). 2 spheres (6201, 6202) are located in the display volume in front of a background plane 6203 and a floor plane 6204. FIG. 50 (*b*) illustrates the side view, in horizontal direction. 6291 indicates the viewing direction and 6294 are lines of sight. For simplicity and clarity of explanation, only 2D geometry is considered in FIG. 50 (*b*). The actual 3D scene can be handled by applying the same principle at multiple x-z slices similar to FIG. 50 (*b*). The lines of sight 6294 are drawn to pass strategic positions in order to show parts that are occluded.

Scheme 1: The whole scene (whole display volume) is processed as a unit and all occluded parts are removed. For example, part 6203*b* on the background plane 6203 is blocked by the two spheres and is removed. For another example, on sphere 6202, the part from P to S to N is removed because it is blocked by sphere 6201 and by the front side of sphere 6202. The result is shown in FIG. 50 (*c*). This scheme is basically similar to traditional computer graphics.

Scheme 2: The issue in Scheme 1 is that when the user changes line of sight, he or she can see "cracks" in the scene due to the removal of Gird elements in the background or in the object at back. One way to accommodate this effect is Scheme 2. In Scheme 2, each individual object is handled separately for removal of occluded Grid Elements, as if there is no other object around. Therefore, the portion from S to P in sphere 6202 is kept. The same principle is applied to background plane and floor plane, therefore occluded parts on them are not removed.

Scheme 3: Another way is Scheme 3. In Scheme 3, the whole scene is processed as a unit. But the occluded parts are not removed but dimmed in brightness.

FIG. 50 (*c*)-(*d*) illustrates the handling in vertical directions. FIG. 51 (*a*) illustrates a top view of the example of FIG. 50 (*a*), for discussion of handling in horizontal direction. The 3 schemes described above are still applicable, except that the situation is slightly complicated because the two eyes now see the scene from different viewing angles. For applying all 3 schemes, a single view angle can be selected and all line of sight set to be parallel to one another. FIG. 51 (*b*) illustrates this situation when Scheme 1 is applied. 6295R and 6295L are actual lines of sight 6296 are the parallel line of sight used for processing. Inevitably, "cracks" can be seen by one the eyes at edge of object. For example, area 6299 is not rendered and could appear as a "crack" to the right (R) eye (but not to the L eye). Area 6298 could appear as a crack to the L eye. FIG. 51 (*c*) illustrates a remedy to FIG. 51 (*b*). The basic approach applies 3 principles:

(1) Areas visible by both eyes are kept;
(2) Areas invisible to both eyes are removed;
(3) Areas visible only to one eye are dimmed but not removed (e.g. 6203*e*, 6203*f*, and 6262*e*).

7.2 Displaying Black/Dark Object:

One issue related to occlusion is how to display black/dark color image in front of a brighter background. In such situations, if an approximate viewing direction is known, voxels occluded by the black/dark foreground image can be dimmed or completely removed, so that the foreground image appears black/dark.

In addition, we must remember that no visible black object is really "true black". There are two main reasons that our eyes can see a black object. First, the black object is set against a brighter background. This enables us to see the outline of the object. Second, there has to be non black traces on the surface of the object, either dust or non smooth surface texture or reflections, in order for us to see the shape of the object within the outline.

FIG. 52 (*a*) illustrates an example similar to FIG. 51 (*a*), except that one part (6401) of sphere 6201 has a color of black. If all voxels of all images in the display volume are rendered, then the black part will appear as a color from the background, instead of black. FIG. 52 (*b*) is similar to FIG. 51 (*b*) except that the black part is mostly not rendered except some non-black traces (6401*a*) taking a small fraction of area As a result, the black part appears mainly black with the non-black traces showing the shape of the spherical surface. In other words, the black part "borrows" the black color from the background and creates an illusion of a black sphere in the foreground.

Figure 53:
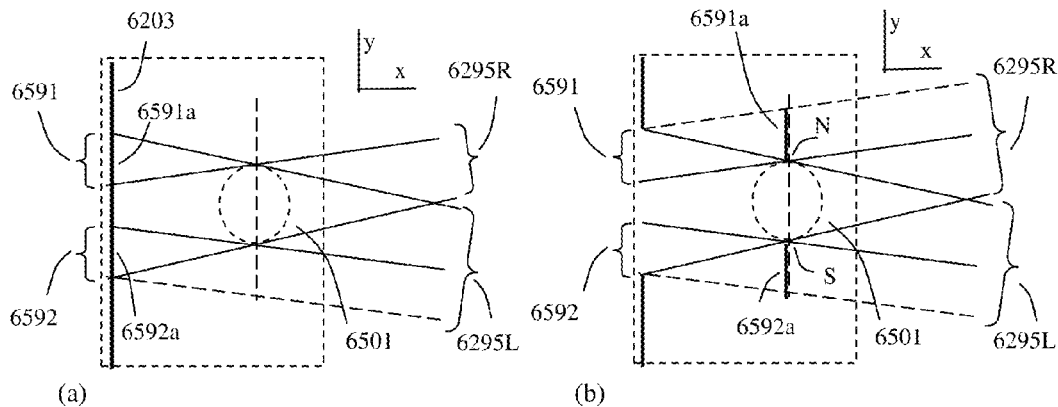

FIG. 53 (*a*) illustrates an example wherein a black sphere 6501 is placed in front of a background image plane. Due to the effect of two viewing angles of two eyes, area 6591 is occluded only to L eye, and area 6592 only to R eye. Therefore, only removing occluded parts in the back ground plane is not enough to precisely define the edge position of the black sphere. As a result, the illusion of black object does not appear convincing. FIG. 53 (*b*) illustrates the solution. The areas visible only to one eye in the background are removed. The removed image 6591*a* and 6592*a* are brought to front along the lines of sight to a plane near the black object 6501, for example, to the plane NS. As a result, the edges of the black object are now well defined by these non-black areas and the "black cracks" at the background planes are all blocked by these repositioned areas. Further, because the reposition areas (6591*a* and 6592*a*) have images matching those at the background, they appear to be part of the background, by illusion, when viewed from the designed angle.

Figure 54:
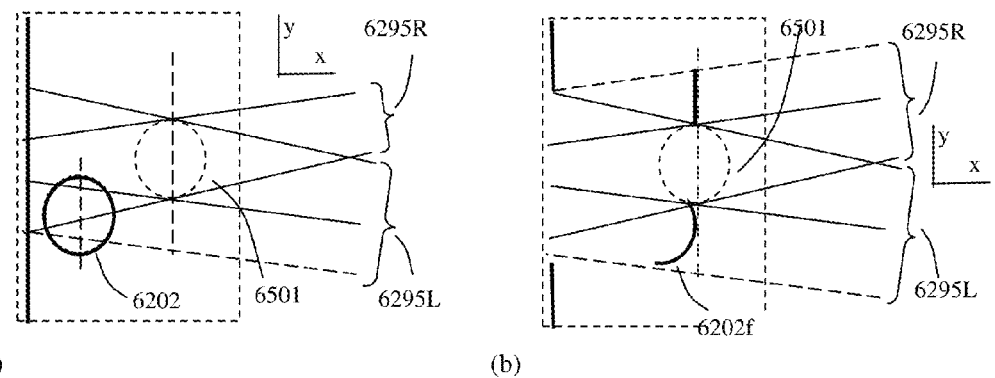

This "parallel shifting" of background image to the side of a black object at foreground can be applied to other objects at back too. This is illustrated in FIG. 54. 6202*f* is the part of the object 6202 that is brought to the front.

Figure 55:
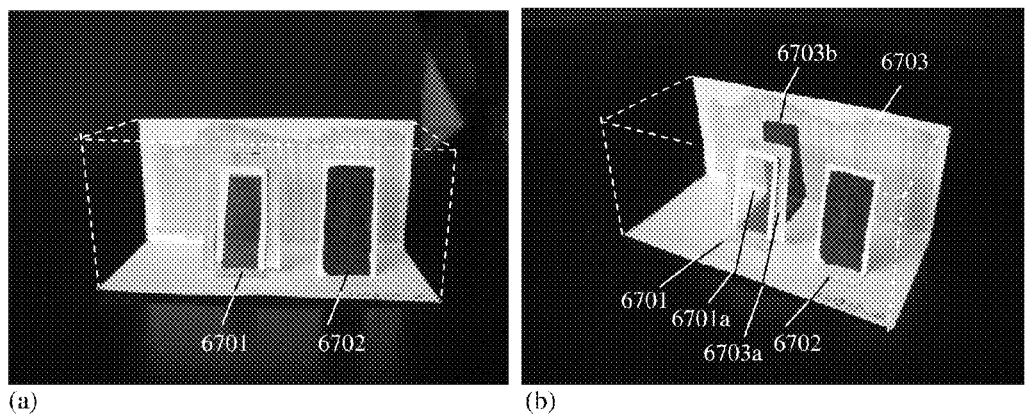

FIG. 55 shows the photographs of a paper model illustrating the above method. The purpose is to display a black rectangle (6701) in front of a light color background 6703. FIG. 55 (*b*) shows a photograph shot from right of designed view angle to show the model construction. Rectangle 6701 is made of an opening 6701*a* (i.e. no image) surrounded by edges of white lines, representing non-black traces on the rectangle edges. Beyond the white traces is the "parallel shifted" background 6703*a*, which has the same light color as the background plane 6703. At back on the background plane is the black background 6703*b* (i.e. light color removed) to be used for the color of the rectangle. 6702 is a rectangle painted with black, to be used as a reference for comparison. FIG. 55 (*a*) shows the front view. 6701 looks just similar to 6702, like a black rectangle, although the black color actually comes from the background 6703*b*.

FIG. 56 (*a*) shows a second paper model example, a paper doll 6801 with black hair 6802: FIG. 56 (*b*) shows a view from the right of the designed view angle. The black hair is actually an opening (i.e. no image) 6801*a* with the outline of the hair. Outside the hair outline is the "parallel shifted" background area 6803*a*. At back on the background plane is the black area 6803*b* (i.e. background image removed).

In the above methods, the position of eyes needs to be determined first. This can be done by several different methods. Method 1 is to preset the viewing direction by user using software at the beginning of play. Method 2 includes Method 1, but in addition, also uses the gyro system (orientation sensors) on the handheld device to sense the change of the orientation of the system and makes necessary adjustment (Many handheld devices now has orientation sensors) Method 3 is using the camera on the handheld device (especially camera facing the user) to track user's eyes or head position. (Many handheld systems have a inwardly facing camera)

General procedure: (Each step can be optional and skipped depending on situation and preferred visual effect)
  Set eye positions
  Remove voxels hidden from both eyes in every individual object, processing the object as if it is the only one object in the scene
  Remove voxels hidden from both eyes in the scene
  Dimmed voxels hidden form only one of the two eyes in the scene
  Handle black/dark parts of the remaining image by "parallel shifting" background images, if necessary.

It should be noted that the aforementioned image presentation methods can be applied to any type of volumetric 3D display, including Active Screen V3D displays, moving screen display of other motion type such as rotating screen, and V3D displays using 2-stage excitation materials.

8. Related Technologies: as3D PCPB as Add-on

Tsao U.S. application Ser. No. 13/271,701 describes an auto-stereoscopic 3D display by a "Position-Changing Parallax Barriers" technique. This technology was conceived in order to allow the V3D display to have an as3D display mode, so that it can play as3D games. The V3D display uses a translucent and diffusive (Lambertian) rear-projection screen. Existing as 3D techniques (parallax barriers, lenticular lens, directional back lighting on LCD or directional illumination using projection) are difficult to apply to a diffusive projection screen.

FIG. 57:

This technology features a "Position-Changing parallax barriers" (PCPB) panel in front of the screen and use sequential frames to display images. A "Position-Changing" parallax barrier panel is capable of switching between a transparent state and an opaque state in selective areas of the panel. Therefore, the positions of array of viewing apertures and barriers can change on the panel. The parallax barrier panel presents a set of barrier-states in sequence repeatedly. In each barrier-state, the viewing apertures cover a different area of the panel. But in combination, all viewing apertures presented in all barrier-states cover full area of the panel.

A set of field frames is displayed on the screen in sequence corresponding to the sequence of the barrier-states presented by the parallax barrier panel. When viewed through the parallax barrier panel by left eye, these field frames appear as a full-frame left eye image that is visible only to left eye. When viewed by right eye, these field frames appear as a full-frame right eye image that is visible only to right eye. The left eye image and the right eye image form an auto-stereoscopic image.

The technology has the following unique features:
  The barriers can be narrow or wide.
  When wide barriers are used, the requirement on alignment precision is less strict than that of existing parallax barrier techniques.
  When barriers change positions at a frequency above the critical fusion frequency of vision, they become invisible and do not block the view.
  This approach can be used with all kinds of 2D displays, including rear projection on a simple diffusive screen, a LCD or an OLED. It allows a wide range of distance between the barrier panel and the image display (from under 1 mm to several cm). Therefore, the barrier panel does not need to be closely attached to the screen. That is, the PCPB panel can be used as an add-on to different 2D display devices.

Figure 58:
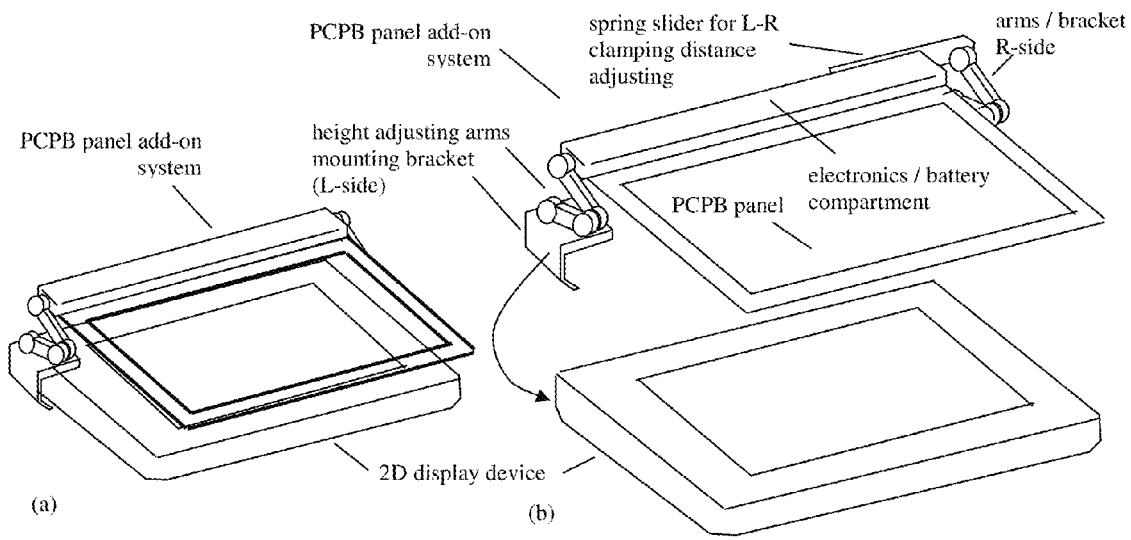
FIG. 58 and FIG. 59 illustrate the Position Changing Parallax Barrier (PCPB) panel as an add-on to a 2D display device, with an adjustable mounting frame and brackets system, and two type of signal coupling approaches: by signal wire or by photo sensor coupling.

FIG. 58(*a*), (*b*): The PCPB panel as an add-on to a 2D display device.

Figure 59:
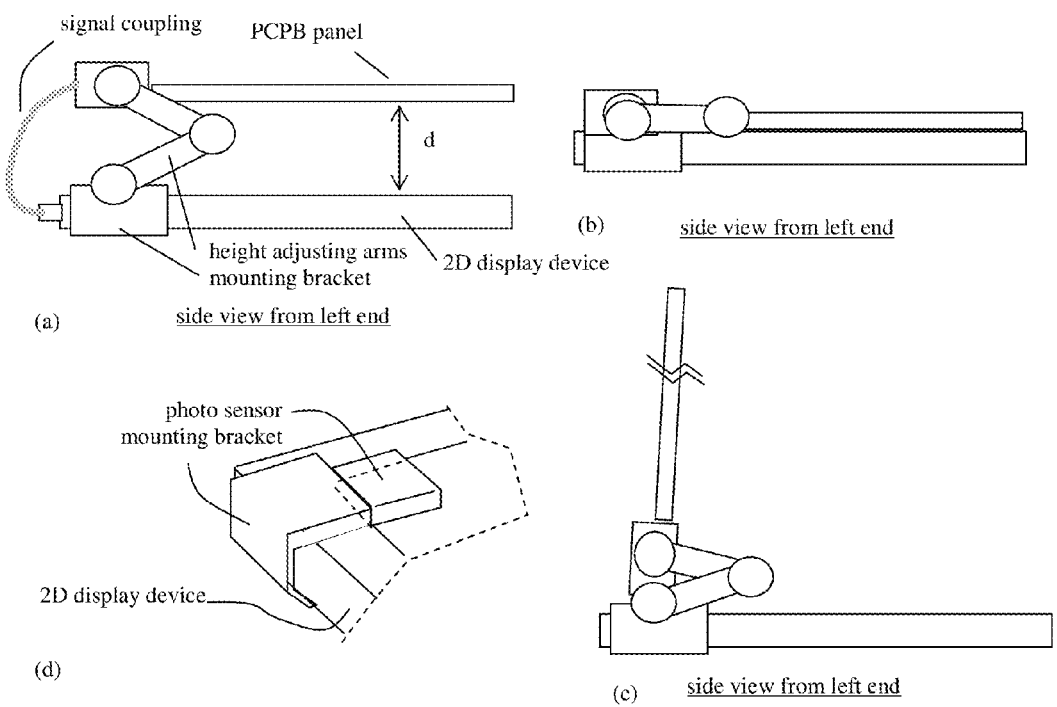

FIG. 59(*a*), (*b*), (*c*) (viewing from one end):

A set of arms at the left (L) and right (R) ends allows user to adjust the distance d between the PCPB panel and the 2D display, because different user may have different preferred viewing distance, which affects d. The arms also allow user to flip up the PCPB panel when as 3D images are not used (FIG. 59(c)). In rest mode, the PCPB panel can be closed down (FIG. 59(b)).

Signal coupling between the PCPB panel and the 2D display can be through a wire/cable. For example, many portable devices, such as iPhone or PSP, have a USB port. Signal coupling enables the PCPB panel to change barrier-state in synchronization with the change of field frames displayed on the 2D display. A USB port may also provide power to the PCPB panel.

FIG. 59(d): Alternative Signal Coupling Means

Instead of using cable, signal coupling can also use optical link, such as IR or visible light. In case the 2D display device does not have a suitable connector or IR port, the display screen itself can be used as a signal emitter for synchronization purpose. FIG. 59(d) shows that the PCPB panel system has a photo sensor, which is positioned next to the mounting bracket and connected to the electronics compartment through wires inside the bracket and arms. The photo sensor (facing down) covers a small area at the upper-left corner of the 2D display screen.

Figure 60:
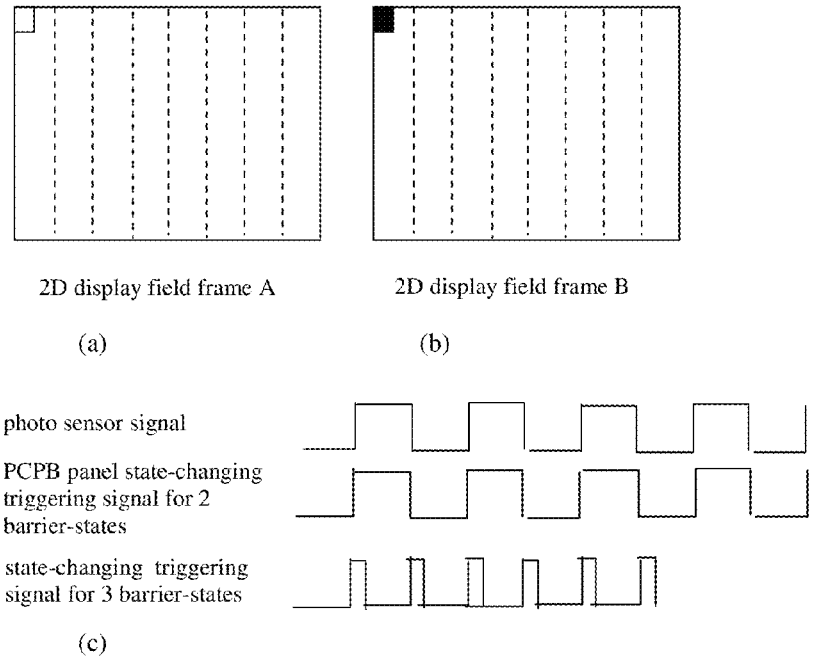
FIG. 60 illustrates working principle of the photo sensor coupling approach of FIG. 59 (d).

FIG. 60(a), (b), (c):

Each field frame displayed on the 2D display will display, at the upper-left corner in the small area covered by the photo sensor, a graphical (optical) signal pattern. For example, field frame A will have a white square pattern and field frame B will have a black square pattern. The photo sensor can pick up this signal pattern (FIG. 60(a)) and generate a signal wave (FIG. 60(b)) that triggers the change of barrier state of the PCPB panel. For a PCPB panel using 3 barrier states, an up-and-down edge detector can be used to detect locations of edges of changing signal of the photo sensor and the resulted signal (FIG. 60(c)) can be used to trigger the change of barrier states.

In this way, the PCPB panel add-on can basically work with any 2D display device, such as a smart phone or a tablet computer, as long as the device has proper software. There is no need of any electrical connection between the 2D display device and the PCPB panel, and no need of any hardware change on the 2D display device.

The invention claimed is:

1. System of volumetric 3D display with characteristics of compact form factor, wide viewing angle and low noise and vibration comprising the following features:
  a display surface group moves in rotary reciprocating motion, said display surface group including a display surface, a backing structure and a frame structure, by the rotary reciprocating motion the display surface group revolving about an axis and sweeping across a volume while keeping said display surface always facing a fixed direction;
  said display surface is supported by said backing structure and said backing structure is supported at only one side by said frame structure, thereby allowing wide viewing angle to the display surface;
  a pair of main rotary arms drives said frame structure also from only one side of said display surface group, two moving shafts connecting said frame structure to said main rotary aims so that synchronized rotation of the main rotary arms generates said rotary reciprocating motion;
  mass center of said display surface group is set at the middle point between said two moving shafts and placed close to said pair of main rotary aims, thereby inducing low noise and vibration.

2. System of claim 1, wherein
  said pair of main rotary arms are located at one end of said display surface group, said end of the display surface group being defined as either the front end or the rear end along the direction of lateral motion of said display surface;
  rotational dynamic forces are balanced in two directions, in the radial direction of rotation, all centrifugal forces being balanced about the rotation axis of each said main rotary arm, and in the axial direction of the rotation axis of each said main rotary arm, the sum of moments of all centrifugal forces about any point on the rotation axis of each said main rotary arm being zero.

3. System of claim 2, further comprises a pair of auxiliary rotary arms and connecting rod, each of the auxiliary rotary arms corresponding to and rotating co-axially with one of said main rotary aim respectively, the auxiliary arms and the connecting rod forming a parallel crank compound mechanism together with said main rotary arms and their co-axial shafts, thereby synchronizing rotations of the two main rotary arms.

4. System of claim 2, wherein
  rotations of said pair of main rotary arms are synchronized by a mechanism of timing belts and gears.

5. System of claim 1, wherein
  said main rotary arms are located respectively at the front end and the rear end along the direction of lateral motion of said display surface group;
  said two moving shafts are positioned close to the plane of said display surface;
  rotational dynamic forces are balanced in two directions, in the radial direction of rotation, all centrifugal forces being balanced about the rotation axis of each said main rotary arm, and in the axial direction of the rotation axis of each said main rotary arm, the sum of moments of all centrifugal forces about any point on the rotation axis of each said main rotary arm being zero.

6. System of claim 5, further comprises a pair of auxiliary rotary arms, each of the auxiliary rotary arms corresponding to and rotating co-axially with one of said main rotary arm respectively, the auxiliary arms forming a parallel crank compound mechanism together with said main rotary arms and their co-axial shafts, thereby synchronizing rotations of the two main rotary arms.

7. System of claim 5, wherein
  rotations of said pair of main rotary arms are synchronized by a mechanism of timing belts and gears.

8. System of claim 5, further comprising a contractible cover with a safety switch.

9. System of claim 1, wherein
  said backing structure comprises a frame of thin beams with narrow rims at top edges;
  said display surface comprises a thin screen film attached to said narrow rims.

10. System of claim 9, said backing structure further comprises a transparent structure of wavy or curved shape in order to support said display surface at multiple location without affecting image quality.

11. System of volumetric 3D display with characteristics of compact form factor, wide viewing angle and low noise and vibration comprising the following features:
  a display surface group moves in rotary reciprocating motion, said display surface group including a display surface, a backing structure and a frame structure, by the rotary reciprocating motion the display surface group revolving about an axis and sweeping across a volume while keeping said display surface always facing a fixed direction;

said display surface is supported by said backing structure and said backing structure is supported at two sides by said frame structure;

two sets of main rotary antis drive said frame structure from said two sides respectively, said frame structure connecting to said main rotary arms on the two sides via moving shafts located on two moving center axes so that synchronized rotation of the main rotary arms generates said rotary reciprocating motion;

said display surface is elevated above plane of moving center axes, said plane of moving center axes being the plane including said two moving center axes, thereby allowing wide viewing angle to the display surface;

mass center of said display surface group is set at the middle point between said two moving center axes and placed on said plane of moving center axes, thereby inducing low noise and vibration.

12. System of claim 11, further comprising two sets of auxiliary rotary arms and connecting rod, each of the auxiliary rotary arms corresponding to and rotating co-axially with one of said main rotary arm respectively, each set of the auxiliary arms and the connecting rod forming a parallel crank compound mechanism together with corresponding main rotary arms and co-axial shafts on each side, thereby synchronizing rotations of the main rotary arms on each side.

13. System of claim 11, wherein said display surface group comprises two independent portions of equal mass, the two portions being connected by a set of coupling mechanism that allows for small linear relative displacement between the two portions;

mass centers of said two independent portions are positioned such that the combined center of mass of the two portions is set at the middle point between said two moving center axes and placed on said plane of moving center axes;

said main rotary arms on one of said two center moving axes but on opposite sides of the display surface group chive the first portion of said two portions, and said main rotary arms on the other said center moving axes drive the second portion of said two portions, thereby allowing small relative displacement between the two moving center axes and equalizing dynamic loading to the two moving center axes.

14. System of claim 13, wherein said coupling mechanism that allows for small linear relative displacement includes flexural bearings or linear bearings.

15. System of claim 11, wherein said moving shafts are short shafts and each said main rotary arm corresponds to one said short moving shaft respectively, thereby allowing space between said two sides usable for other components of the system.

16. System of claim 15, further comprising flexural couplings on said display surface group to allow for synchronization error between said two sides.

17. System of claim 16, wherein said backing structure comprises curved edges that connect to said frame structure at the left side and the right side of the display surface group through said flexural couplings, thereby increasing stiffness of said display surface on said backing structure during rotation.

18. System of claim 15, at each of said two sides, rotational dynamic forces are balanced in two directions, in the radial direction of rotation, all centrifugal forces being balanced about the rotation axis of each said main rotary arm, and in the axial direction of the rotation axis of each said main rotary arm, the sum of moments of all centrifugal forces about any point on the rotation axis of each said main rotary arm being zero.

19. System of claim 11, said backing structure comprises a transparent structure of wavy or curved shape in order to support said display surface at multiple location without affecting image quality.

* * * * *